United States Patent
Ginter et al.

(10) Patent No.: US 7,779,119 B2
(45) Date of Patent: Aug. 17, 2010

(54) EVENT MONITORING AND MANAGEMENT

(75) Inventors: Andrew Ginter, Calgary (CA); Tom Hutchinson, Calgary (CA); Rui Manuel Martins Lopes, Airdrie (CA); Brad McMillan, Calgary (CA); Brett Jensen, Calgary (CA)

(73) Assignee: Industrial Defender, Inc., Foxborough, MA (US)

( * ) Notice: Subject to any disclaimer, the term of this patent is extended or adjusted under 35 U.S.C. 154(b) by 165 days.

(21) Appl. No.: 11/807,699

(22) Filed: May 30, 2007

(65) Prior Publication Data
US 2010/0064039 A9    Mar. 11, 2010

Related U.S. Application Data

(62) Division of application No. 10/815,222, filed on Mar. 31, 2004, now Pat. No. 7,246,156.

(60) Provisional application No. 60/477,088, filed on Jun. 9, 2003.

(51) Int. Cl.
*G06F 13/00* (2006.01)
(52) U.S. Cl. .................. 709/224; 709/219; 719/318
(58) Field of Classification Search ............. 709/217, 709/219, 223, 224; 719/318
See application file for complete search history.

(56) References Cited

U.S. PATENT DOCUMENTS

| | | | |
|---|---|---|---|
| 6,279,113 B1 | 8/2001 | Vaidya | |
| 6,304,975 B1 | 10/2001 | Shipley | |
| 6,367,034 B1* | 4/2002 | Novik et al. | 714/39 |
| 6,377,955 B1 | 4/2002 | Hartmann et al. | |
| 6,550,012 B1 | 4/2003 | Villa et al. | |
| 6,574,666 B1 | 6/2003 | Dutta et al. | |
| 6,832,332 B2* | 12/2004 | Marino et al. | 714/15 |
| 7,058,710 B2* | 6/2006 | McCall et al. | 709/224 |
| 7,134,141 B2* | 11/2006 | Crosbie et al. | 726/23 |
| 7,296,070 B2* | 11/2007 | Sweeney et al. | 709/224 |
| 2001/0044840 A1* | 11/2001 | Carleton | 709/223 |
| 2005/0182969 A1 | 8/2005 | Ginter et al. | |
| 2005/0183143 A1* | 8/2005 | Anderholm et al. | 726/22 |

FOREIGN PATENT DOCUMENTS

| | | |
|---|---|---|
| WO | WO 01/80480 A1 | 10/2001 |
| WO | WO 02/21800 A1 | 3/2002 |
| WO | WO 02/44871 A2 | 6/2002 |

\* cited by examiner

*Primary Examiner*—Viet Vu
(74) *Attorney, Agent, or Firm*—Muirhead and Saturnelli, LLC

(57) ABSTRACT

Described are techniques used in monitoring the performance, security and health of a system used in an industrial application. Agents included in the industrial network report data to an appliance or server. The appliance stores the data and determines when an alarm condition has occurred. Notifications are sent upon detecting an alarm condition. The alarm thresholds may be user defined. A threat thermostat controller determines a threat level used to control the connectivity of a network used in the industrial application.

34 Claims, 16 Drawing Sheets

| Current level/state | ACK | input | next level/state | action |
|---|---|---|---|---|
| LEVEL 1 (NORMAL) | N/A | 0-100 | LEVEL 1 | NONE |
| LEVEL 1 | N/A | 101-200 | LEVEL 2 | ALARM CONDITION |
| LEVEL 2 | NO | 0-100 | LEVEL 2 | ALARM CONDITION |
| LEVEL 2 | YES | 0-100 | LEVEL 1 | CLEAR ALARM |
| LEVEL 2 | N/A | 201-300 | LEVEL 3 | ALARM CONDITION |
| .. | .. | .. | .. | .. |

FIGURE 10

| State | Name | Color | Ack Required | &ACK | &Range level | &Range > | &Range == | &Range < |
|---|---|---|---|---|---|---|---|---|
| 0 | Error | Blue | 0 | 0 | 0 | 2 | 0 | 0 |
| 1 | Normal Acked | Green | 0 | 1 | 0 | 4 | 1 | 0 |
| 2 | Normal Unack | Green Flashing | 1 | 1 | 0 | 4 | 2 | 0 |
| 3 | Warning Acked | Yellow | 0 | 3 | 1 | 6 | 3 | 2 |
| 4 | Warning Unack | Yellow Flashing | 1 | 3 | 1 | 6 | 4 | 2 |
| 5 | Alert Acked | Red | 0 | 5 | 2 | 5 | 5 | 4 |
| 6 | Alert Unacked | Red Flashing | 1 | 5 | 2 | 6 | 6 | 4 |

Alarm limits vector: 2  200  100  0

FIGURE 11

EVENT MONITORING AND MANAGEMENT

CROSS REFERENCE TO RELATED APPLICATIONS

This application is a divisional of U.S. patent application Ser. No. 10/815,222 filed Mar. 31, 2004, now U.S. Pat. No. 7,246,156, which is incorporated by reference herein, and which claims benefit of U.S. Provisional Patent Application No. 60/477,088, filed on Jun. 9, 2003, which is incorporated by reference herein.

BACKGROUND

1. Technical Field

This application generally relates to a network, and more particularly to event monitoring and management therein.

2. Description of Related Art

Computer systems may be used in performing a variety of different tasks. For example, an industrial network of computer systems and components may be used in controlling and/or monitoring industrial systems. Such industrial systems can be used in connection with manufacturing, power generation, energy distribution, waste handling, transportation, telecommunications, water treatment, and the like. The industrial network may be connected and accessible via other networks, both directly and indirectly, including a corporate network and the Internet. The industrial network may thus be susceptible to both internal and external cyber-attacks. As a preventive measure from external cyber-attacks, firewalls or other security measures may be taken to separate the industrial network from other networks. However, the industrial network is still vulnerable since such security measures are not foolproof in the prevention of external attacks by viruses, worms, Trojans and other forms of malicious code as well as computer hacking, intrusions, insider attacks, errors, and omissions that may occur. Additionally, an infected laptop, for example, can bypass the firewall by connecting to the industrial network using a modem, direct connection, or by a virtual private network (VPN). The laptop may then introduce worms or other forms of malicious code into the industrial network. It should be noted that an industrial network may be susceptible to other types of security threats besides those related to the computer systems and network.

Thus, it may be desirable to monitor events of the industrial network and accordingly raise alerts. It may be desirable that such monitoring and reporting be performed efficiently minimizing the resources of the industrial network consumed. It may further be desirable to have the industrial network perform a threat assessment and respond in accordance with the threat assessment. In performing the assessment, it may also be desirable to take into account a wide variety of conditions relating to performance, health and security information about the industrial network, such as may be obtained using the monitoring data, as well as other factors reflecting conditions external to the industrial network.

SUMMARY OF THE INVENTION

In accordance with one aspect of the invention is a method for controlling connectivity in a network comprising: receiving one or more inputs; determining a threat level indicator in accordance with said one or more inputs; and selecting, for use in said network, a firewall configuration in accordance with said threat level indicator. The firewall configuration may be selected from a plurality of firewall configurations each associated with a different threat level indicator. A first firewall configuration associated with a first threat level indicator may provide for more restrictive connectivity of said network than a second firewall configuration associated with a second threat level indicator when said first threat level indicator is a higher threat level than said second threat level indicator. A firewall configuration associated with a highest threat level indicator may provide for disconnecting said network from all other less-trusted networks. The disconnecting may include physically disconnecting said network from other networks. The network may be reconnected to said less trusted networks when a current threat level is a level other than said highest threat level indicator. The method may also include automatically loading said firewall configuration as a current firewall configuration in use in said network. The one or more inputs may include at least one of: a manual input, a metric about a system in said network, a metric about said network, a derived value determined using a plurality of weighted metrics including one metric about said network, a derived value determined using a plurality of metrics, and an external source from said network. If the manual input is specified, the manual input may determine the threat level indicator overriding all other indicators. The plurality of weighted metrics may include a metric about at least one of: a network intrusion detection, a network intrusion prevention, a number of failed login attempts, a number of users with a high level of privileges. The high level of privileges may correspond to one of: administrator privileges and root user privileges. The selecting additionally may select one or more of the following: an antivirus configuration, an intrusion prevention configuration, and an intrusion detection configuration.

In accordance with another aspect of the invention is a computer program product for controlling connectivity in a network comprising code that: receives one or more inputs; determines a threat level indicator in accordance with said one or more inputs; and selects, for use in said network, a firewall configuration in accordance with said threat level indicator. The firewall configuration may be selected from a plurality of firewall configurations each associated with a different threat level indicator. A first firewall configuration associated with a first threat level indicator may provide for more restrictive connectivity of said network than a second firewall configuration associated with a second threat level indicator when said first threat level indicator is a higher threat level than said second threat level indicator. A firewall configuration associated with a highest threat level indicator may provide for disconnecting said network from all other less-trusted networks. The code that disconnects may include physically disconnecting said network from other networks. The network may be reconnected to said less trusted networks when a current threat level is a level other than said highest threat level indicator. The computer program product may also include code that automatically loads said firewall configuration as a current firewall configuration in use in said network. The one or more inputs may include at least one of: a manual input, a metric about a system in said network, a metric about said network, a derived value determined using a plurality of weighted metrics including one metric about said network, a derived value determined using a plurality of metrics, and an external source from said network. If the manual input is specified, the manual input may determine the threat level indicator overriding all other indicators. The plurality of weighted metrics may include a metric about at least one of: a network intrusion detection, a network intrusion prevention, a number of failed login attempts, a number of users with a high level of privileges. The high level of privileges may correspond to one of: administrator privileges and root user privileges. The code that selects may additionally selects one or more of the following: an antivirus configuration, an intrusion prevention configuration, and an intrusion detection configuration.

In accordance with another aspect of the invention is a method of event reporting by an agent comprising: receiving data; determining if said data indicates a first occurrence of an event of interest associated with a metric since a previous periodic reporting; reporting said first occurrence of an event if said determining determines said data indicates said first occurrence; and reporting a summary including said metric in a periodic report at a first point in time. The reporting of said first occurrence and said reporting of said summary may be performed without a request for a report. Data for said reporting of said first occurrence and said reporting of said summary may be performed by said agent communicating data at an application level to a reporting destination using a one-way communication connection. The reporting of said first occurrence and said summary may also include: opening a communication connection; sending data to said reporting destination; and closing said communication connection, said agent only sending data to said reporting destination without reading any communication from said communication connection. The communication connection may be a TCP or UDP socket. The periodic report may include a summary of a selected set of one or more data sources and associated values for a time interval since a last periodic report was sent to a reporting destination. The selected set of one or more metrics may be a first level of reporting information and said periodic report may include a second level of reporting information used to perform one at least one of the following: determine a cause of a problem, and take a corrective action to a problem. The reporting of said first occurrence and said summary may include transmitting messages from said agent to a reporting destination, each of said messages being a fixed maximum size. A time interval at which said periodic report is sent by said agent and data included in each of said messages may be determined in accordance with at least one of: resources available on a computer system and a network in which said agent is included. The agent may execute on a first computer system and reports data to another computer system. The method may also include: monitoring a log file; and extracting said second level of reporting information from said log file, wherein said log file includes log information about a computer system upon which said agent is executing. The agent may transmit an XML communication to said reporting destination using said communication connection. A threshold may be specified for an amount of data that said agent can report in a fixed reporting interval, said threshold being equal to or greater than a fixed maximum size for each summary report sent by said agent. A report sent for any of said reporting may include an encrypted checksum preventing modifications of said report while said report is being communicated from an agent to a receiver in a network. The reporting may be performed by an agent that sends a report, said report including one of: a timestamp which increases with time duration, and a sequence number which increases with time duration, used by a receiver of said report. The receiver may use said one of said timestamp or said sequence number in authenticating a report received by said receiver as being sent by said agent, said receiver processing received reports having said one of a timestamp or sequence number which is greater than another one of a timestamp or sequence number associated with a last report received from said agent. The second level of reporting information may identify at least one source associated with an attack, wherein said source is one of: a user, a machine, and an application, said percentage indicating a percentage of events associated with said at least one source for a type of attack.

In accordance with another aspect of the invention is a method of event reporting by an agent comprising: receiving data; determining if said data corresponds to an event of interest associated with at least one security metric; and sending a report to a reporting destination, said report including said at least one security metric for a fixed time interval, wherein said report is sent from said agent communicating data at an application level to said reporting destination using a one-way communication connection. The agent may only sends data on said one-way communication connection to said reporting destination without reading any communication from said communication connection. The report may include at least one performance metric in accordance with said data received.

In accordance with another aspect of the invention is a method of event reporting by an agent comprising: receiving data; determining if said data indicates a security event of interest; and reporting a summary including information on a plurality of occurrences of said security event of interest occurring within a fixed time interval, said summary being sent at a predetermined time interval. The reporting of the summary may be performed without a request for a report. The reporting of said summary may be performed by said agent communicating data at an application level to a reporting destination using a one-way communication connection. The reporting of said summary may further include: opening a communication connection; sending data to a said reporting destination; and closing said communication connection, said agent only sending data to said reporting destination without reading any communication from said communication connection. The communication connection may be a TCP or UDP socket. The agent may transmit an XML communication to said reporting destination using said communication connection. The reporting of said summary may include transmitting periodic messages from said agent to a reporting destination, each of said message having a fixed maximum size.

In accordance with another aspect of the invention is a computer program product for event reporting by an agent comprising code that: receives data; determines if said data indicates a first occurrence of an event of interest associated with a metric since a previous periodic reporting; reports said first occurrence of an event if said code that determines that said data indicates said first occurrence; and reports a summary including said metric in a periodic report at a first point in time. The code that reports said first occurrence and said code that reports said summary may be performed without a request for a report. Data for the code that reports said first occurrence and said code that reports said summary may be performed by said agent communicating data at an application level to a reporting destination using a one-way communication connection. At least one of said code that reports said first occurrence and said code that reports said summary may further comprise code that: opens a communication connection; sends data to said reporting destination; and closes said communication connection, said agent only sending data to said reporting destination without reading any communication from said communication connection. The communication connection may be a TCP or UDP socket. The periodic report may include a summary of a selected set of one or more data sources and associated values for a time interval since a last periodic report was sent to a reporting destination. The selected set of one or more metrics may be a first level of reporting information and said periodic report may include a second level of reporting information used to perform one at least one of the following: determine a cause of a problem, and take a corrective action to a problem. The code that reports said first occurrence and said code that reports said summary may include code that transmits messages from said agent to a reporting destination, each of said messages being a fixed maximum size. A time interval at which said periodic report is sent by said agent and data included in each of said messages may be determined in accordance with at least one of: resources available on a computer system and a network in which said agent is included. The agent may execute on a first computer system and reports data to another computer system. The computer program product may further comprise code that: monitors a log file; and extracts said second level of reporting information from said log file, wherein said log file includes log information about a computer system upon which said agent is executing. The agent may transmit an XML communication to said reporting destination using said communication connection. A threshold may be specified for an amount of data that said agent can report in a fixed reporting interval, said threshold being equal to or greater than a fixed maximum size for each summary report sent by said agent. A report sent for any of said code that reports may use an encrypted checksum preventing modifications of said report while said report is being communicated from an agent to a receiver in a network. The code that reports may be performed by an agent that sends a report, said report including one of: a timestamp which increases with time duration, and a sequence number which increases with time duration, used by a receiver of said report. The receiver may use said one of said timestamp or said sequence number in authenticating a report received by said receiver as being sent by said agent, said receiver processing received reports having said one of a timestamp or sequence number which is greater than another one of a timestamp or sequence number associated with a last report received from said agent. The second level of reporting information may identify at least one source associated with an attack, wherein said source is one of: a user, a machine, and an application, said percentage indicating a percentage of events associated with said at least one source for a type of attack.

In accordance with another aspect of the invention is a computer program product for event reporting by an agent comprising code that: receives data; determines if said data corresponds to an event of interest associated with at least one security metric; and sends a report to a reporting destination, said report including said at least one security metric for a fixed time interval, wherein said report is sent from said agent communicating data at an application level to said reporting destination using a one-way communication connection. The agent may only send data on said one-way communication connection to said reporting destination without reading any communication from said communication connection. The report may include at least one performance metric in accordance with said data received.

In accordance with another aspect of the invention is a computer program product for event reporting by an agent comprising code that: receives data; determines if said data indicates a security event of interest; and reports a summary including information on a plurality of occurrences of said security event of interest occurring within a fixed time interval, said summary being sent at a predetermined time interval. The code that reports said summary is performed without a request for a report. Data for said code that reports said summary may be performed by said agent communicating data at an application level to a reporting destination using a one-way communication connection. The code that reports said summary may further comprises code that: opens a communication connection; sends data to a said reporting destination; and closes said communication connection, said agent only sending data to said reporting destination without reading any communication from said communication connection. The communication connection may be a TCP or UDP socket. The agent that transmits an XML communication to said reporting destination may use said communication connection. The code that reports said summary may include code that transmits periodic messages from said agent to a reporting destination, each of said message having a fixed maximum size.

In accordance with another aspect of the invention is a method of event notification comprising: receiving a first report of a condition; sending a first notification message about said first report of said condition; sending a second notification message about said condition at a first notification interval; receiving subsequent reports at fixed time intervals; sending a subsequent notification message at a second notification interval if said condition is still ongoing during said second notification interval, wherein said second notification interval has a length which is a multiple of said first notification interval. The first report may be sent from a reporting agent on a first computer system reporting about one of: said first computer system and a network including said first computer system, and said notification messages are sent from a notification server on a second computer system. Notification messages may be sent to a notification point at successive notification intervals wherein each of said successive notification intervals increases approximately exponentially with respect to an immediately prior notification interval. The condition may be associated with an alarm condition and an alarm condition may be set when a current level of a metric is not in accordance with a predetermined threshold value. Each of said notification messages may include a first level of information about said condition and a second level of information used to perform at least one of the following: determine a cause of said condition, and take a corrective action for said condition. An option may be included in a reporting agent to enable and disable reporting of said second level of information to a notification server from said agent sending said first report. An option may be used to enable and disable condition notification messages including said second level of information. An alarm condition may be associated with a first level alarm and an alarm state of said first level may be maintained when a current level of a metric is in accordance with said predetermined threshold value until an acknowledgement of said alarm state at said first level is received by said notification server. The alarm condition may transition to a second level alarm when said current level is not in accordance with said predetermined threshold and another threshold associated with a second level, and said second level alarm is maintained when a current level of a metric is in accordance with one of: said predetermined threshold and said other threshold until acknowledgement of said second level alarm is received by said notification server. Reports may be sent from a reporting agent executing on a computer system in an industrial network to an appliance included in said industrial network and each of said reports includes events occurring within said industrial network. An alarm condition may be determined in accordance with a plurality of weighted metrics, said plurality of weighted metrics including at least one metric about: a network intrusion detection, a network intrusion prevention, a number of failed login attempts, a number of users with a level of privileges greater than a level associated with a user-level account.

In accordance with another aspect of the invention is a method of event notification comprising: receiving a first report of a condition at a reporting destination; and sending a notification message from said reporting destination to a notification destination, said notification message including a summary of information about events occurring in a fixed time interval, said summary identifying at least one of: a source and a target associated with an attack occurring within said fixed time interval, and a percentage of events associated with said at least one of said source and said target. The summary may identify at least one source associated with an attack, wherein said source is one of: a user, a machine, and an application, said percentage indicating a percentage of events associated with said at least one source for a type of attack. The summary may identify at least one target associated with an attack, wherein said target is one of: a user, a machine, an application, and a port, said percentage indicating a percentage of events associated with said at least one target for a type of attack. The summary may identify a portion of a type of attack represents with respect to all attacks in said fixed time interval.

In accordance with another aspect of the invention is a method of event notification comprising: receiving report of a potential cyber-attack condition at fixed time intervals; and sending a notification message about said conditions when said conditions exceed a notification threshold. A notification threshold may be determined using an alarm condition in accordance with a plurality of weighted metrics, said plurality of weighted metrics including at least one metric about: a network intrusion detection, a network intrusion prevention, a number of failed login attempts, a number of users with a level of privileges greater than a level associated with a user-level account. The notification message may include a summary of information about events occurring in a fixed time interval, said summary identifying at least one of: a source and a target associated with an attack occurring within said fixed time interval, and a percentage of events associated with said at least one of said source and said target. The summary may identify at least one source associated with an attack, wherein said source is one of: a user, a machine, and an application, said percentage indicating a percentage of events associated with said at least one source for a type of attack. The summary may identify at least one target associated with an attack, wherein said target is one of: a user, a machine, an application, and a port, said percentage indicating a percentage of events associated with said at least one target for a type of attack. The summary may identify a portion of a type of attack represents with respect to all attacks in said fixed time interval.

In accordance with another aspect of the invention is a computer program product for event notification comprising code that: receives a first report of a condition; sends a first notification message about said first report of said condition; sends a second notification message about said condition at a first notification interval; receives subsequent reports at fixed time intervals; and sends a subsequent notification message at a second notification interval if said condition is still ongoing during said second notification interval, wherein said second notification interval has a length which is a multiple of said first notification interval. The first report may be sent from a reporting agent on a first computer system reporting about one of: said first computer system and a network including said first computer system, and said notification messages are sent from a notification server on a second computer system. Notification messages may be sent to a notification point at successive notification intervals wherein each of said successive notification intervals increases approximately exponentially with respect to an immediately prior notification interval. The condition may be associated with an alarm condition and an alarm condition is set when a current level of a metric is not in accordance with a predetermined threshold value. Each of the notification messages may include a first, level of information about said condition and a second level of information used to perform at least one of the following: determine a cause of said condition, and take a corrective action for said condition. An option may be included in a reporting agent to enable and disable reporting of said second level of information to a notification server from said agent sending said first report. An option may be used to enable and disable condition notification messages including said second level of information. An alarm condition may be associated with a first level alarm and an alarm state of said first level is maintained when a current level of a metric is in accordance with said predetermined threshold value until an acknowledgement of said alarm state at said first level is received by said notification server. The alarm condition may transition to a second level alarm when said current level is not in accordance with said predetermined threshold and another threshold associated with a second level, and said second level alarm may be maintained when a current level of a metric is in accordance with one of: said predetermined threshold and said other threshold until acknowledgement of said second level alarm is received by said notification server. Reports may be sent from a reporting agent executing on a computer system in an industrial network to an appliance included in said industrial network and each of said reports includes events occurring within said industrial network. An alarm condition may be determined in accordance with a plurality of weighted metrics, said plurality of weighted metrics including at least one metric about: a network intrusion detection, a network intrusion prevention, a number of failed login attempts, a number of users with a level of privileges greater than a level associated with a user-level account.

In accordance with another aspect of the invention is a computer program product for event notification comprising code that: receives a first report of a condition at a reporting destination; and sends a notification message from said reporting destination to a notification destination, said notification message including a summary of information about events occurring in a fixed time interval, said summary identifying at least one of: a source and a target associated with an attack occurring within said fixed time interval, and a percentage of events associated with said at least one of said source and said target. The summary may identify at least one source associated with an attack, wherein said source is one of: a user, a machine, and an application, said percentage indicating a percentage of events associated with said at least one source for a type of attack. The summary may identify at least one target associated with an attack, wherein said target is one of: a user, a machine, an application, and a port, said percentage indicating a percentage of events associated with said at least one target for a type of attack. The summary may identify a portion of a type of attack represents with respect to all attacks in said fixed time interval.

In accordance with another aspect of the invention is a computer program product for event notification comprising code that: receives report of a potential cyber-attack condition at fixed time intervals; and sends a notification message about said conditions when said conditions exceed a notification threshold. A notification threshold may be determined using an alarm condition in accordance with a plurality of weighted metrics, said plurality of weighted metrics including at least one metric about: a network intrusion detection, a network intrusion prevention, a number of failed login attempts, a number of users with a level of privileges greater than a level associated with a user-level account. The notification message may include a summary of information about events occurring in a fixed time interval, said summary identifying at least one of: a source and a target associated with an attack occurring within said fixed time interval, and a percentage of events associated with said at least one of said source and said target. The summary may identify at least one source associated with an attack, wherein said source is one of: a user, a machine, and an application, said percentage indicating a percentage of events associated with said at least one source for a type of attack. The summary may identify at least one target associated with an attack, wherein said target is one of: a user, a machine, an application, and a port, said percentage indicating a percentage of events associated with said at least one target for a type of attack. The summary may identify a portion of a type of attack represents with respect to all attacks in said fixed time interval.

In accordance with another aspect of the invention is a method for monitoring an industrial network comprising: reporting first data about a first computer system by a first agent executing on said first computer system in said industrial network, said first computer system performing at least one of: monitoring or controlling a physical process of said industrial network, said first data including information about software used in connection with said physical process. The method may also include reporting second data about communications on a connection between said industrial network and another network by a second agent executing on a second computer system. The second data reported by said second agent may be included in an appliance to which said first data is sent. The first agent may report on at least one of: critical file monitoring, log file for said first computer system, hardware and operating system of said first computer system, password and login, a specific application executing on said computer system wherein said application is in accordance with a particular industrial application of said industrial network. A plurality of agents may execute on said first computer system monitoring said first computer system. The plurality of agents may include a master agent and other agents performing a predetermined set of monitoring tasks, said master agent controlling execution of said other agents. The plurality of agents may report data at predetermined intervals to one of: an appliance and said second computer system. The method may also include performing, by at least one of said plurality of agents: obtaining data from a data source; parsing said data; performing pattern matching on said parsed data to determine events of interest; recording any events of interest; reporting any events of interest in accordance with occurrences of selected events in a time interval; creating a message including said summary at predetermined time intervals; and encrypting at least one of: said message and a checksum of said message. The first data may include at least one of the following metrics: a number of open listen connections and a number of abnormal process terminations. When a number of open listen connections falls below a first level, an event corresponding to a component failure may be determined. When a number of open listen connections is above a second level, an event corresponding to a new component or unauthorized component may be determined. The second agent may report on network activity in accordance with a set of rules, said rules including at least one rule indicating that events in a business network are flagged as suspicious in said industrial network. The events may include at least one of: an event associated with a web browser, and an event associated with e-mail. The second agent may report on an address binding of a physical device identifier to a network address if the physical device identifier of a component was not previously known, or said network address in the address binding is a reassignment of said network address within a predetermined time period since said network address was last included in an address binding. The second agent may report second data about a firewall, and said second data may include at least one of: a change to a saved firewall configuration corresponding to a predetermined threat level, a change to a current set of firewall configuration rules currently controlling operations between said industrial network and said other network. Log files associated with said firewall may be stored remotely at a location on said second computer system with log files for said second computer system activity. The second data may include at least one threat assessment from a source external to said industrial network. The second data may include at least one of: a threat level indicator from a corporate network connected to said industrial network, a threat level indicator from a public network source, and a threat level indicator that is manually input. The method may also include: receiving at least said first data by a receiver; authenticating said first data as being sent by said first agent; and processing, in response to said authenticating, said first data by said receiver. The authenticating may include at least one of: verifying use of said first agent's encryption key, and checking validity of a message checksum, and using a timestamp or sequence number to detect invalid reports received by said receiver as being sent from said first agent. The reporting may be performed in accordance with a threshold size indicates an amount of data that said first agent is permitted to transmit in a fixed periodic reporting interval.

In accordance with another aspect of the invention is a computer program product for monitoring an industrial network comprising code that: reports first data about a first computer system by a first agent executing on said first computer system in said industrial network, said first computer system performing at least one of: monitoring or controlling a physical process of said industrial network, said first data including information about software used in connection with said physical process. The computer program product may also include code that reports second data about communications on a connection between said industrial network and another network by a second agent executing on a second computer system. The second data reported by said second agent may be included in an appliance to which said first data is sent. The first agent may report on at least one of: critical file monitoring, log file for said first computer system, hardware and operating system of said first computer system, password and login, a specific application executing on said computer system wherein said application is in accordance with a particular industrial application of said industrial network. A plurality of agents may execute on said first computer system monitoring said first computer system. The plurality of agents may include a master agent and other agents performing a predetermined set of monitoring tasks, said master agent controlling execution of said other agents. The plurality of agents may report data at predetermined intervals to one of: an appliance and said second computer system. The computer program product may also include code for performing, by at least one of said plurality of agents: obtaining data from a data source; parsing said data; performing pattern matching on said parsed data to determine events of interest; recording any events of interest; reporting any events of interest in accordance with occurrences of selected events in a time interval; creating a message including said summary at predetermined time intervals; and encrypting at least one of: said message and a checksum of said message. The first data may include at least one of the following metrics: a number of open listen connections and a number of abnormal process terminations. When a number of open listen connections falls below a first level, an event corresponding to a component failure may be determined. When a number of open listen connections is above a second level, an event corresponding to a new component or unauthorized component may be determined. The second agent may report on network activity in accordance with a set of rules, said rules including at least one rule indicating that events in a business network are flagged as suspicious in said industrial network. The events may include at least one of: an event associated with a web browser, and an event associated with e-mail. The second agent may report on an address binding of a physical device identifier to a network address if the physical device identifier of a component was not previously known, or said network address in the address binding is a reassignment of said network address within a predetermined time period since said network address was last included in an address binding. The second agent may report second data about a firewall, and said second data includes at least one of: a change to a saved firewall configuration corresponding to a predetermined threat level, a change to a current set of firewall configuration rules currently controlling operations between said industrial network and said other network. Log files associated with said firewall may be stored remotely at a location on said second computer system with log files for said second computer system activity. The second data may include at least one threat assessment from a source external to said industrial network. The second data may include at least one of: a threat level indicator from a corporate network connected to said industrial network, a threat level indicator from a public network source, and a threat level indicator that is manually input. The computer program product may also include code that: receives at least said first data by a receiver; authenticates said first data as being sent by said first agent; and processes, in response to said code that authenticates, said first data by said receiver. The code that authenticates may include at least one of: code that verifies use of said first agent's encryption key and checks validity of a message checksum, and code that uses a timestamp or sequence number to detect invalid reports received by said receiver as being sent from said first agent. The code that reports may use a threshold size indicating an amount of data that said first agent is permitted to transmit in a fixed periodic reporting interval.

In accordance with another aspect of the invention is a method for detecting undesirable messages in a network comprising: receiving a message in said network; determining if said message is undesirable in accordance with at least one rule defining an acceptable message in said network; and reporting said message as undesirable if said message is not determined to be in accordance with said at least one rule. The method may also include: defining another rule for use in said determining if an additional message type is determined to be acceptable in said network.

In accordance with another aspect of the invention is a computer program product for detecting undesirable messages in a network comprising code that: receives a message in said network; determines if said message is undesirable in accordance with at least one rule defining an acceptable message in said network; and reports said message as undesirable if said message is not determined to be in accordance with said at least one rule. The computer program product may also include code that: defines another rule for use in said determining if an additional message type is determined to be acceptable in said network.

In accordance with another aspect of the invention is a method for performing periodic filesystem integrity checks comprising: receiving two or more sets of filesystem entries, each set representing a grouping of one or more filesystem entries; selecting a zero or more entries from each set; and performing integrity checking for each selected entry from each set during a reporting period. Each of said two or more sets may correspond to a predetermined classification level. If a first classification level is more important than a second classification level, said first classification level may include less entries than said second classification level. A number of entries from each set may be determined in accordance with a level of importance associated with said set.

In accordance with another aspect of the invention is a computer program product for performing periodic filesystem integrity checks comprising code that: receives two or more sets of filesystem entries, each set representing a grouping of one or more filesystem entries; selects a zero or more entries from each set; and performs integrity checking for each selected entry from each set during a reporting period. Each of said two or more sets may correspond to a predetermined classification level. If a first classification level is more important than a second classification level, said first classification level may include less entries than said second classification level. A number of entries from each set may be determined in accordance with a level of importance associated with said set.

BRIEF DESCRIPTION OF THE DRAWINGS

Features and advantages of the present invention will become more apparent from the following detailed description of exemplary embodiments thereof taken in conjunction with the accompanying drawings in which:

FIGS. 10-11 are examples of embodiments of an alarm state table that may be used by RTAP;

DETAILED DESCRIPTION OF
EMBODIMENT(S)

Figure 1:
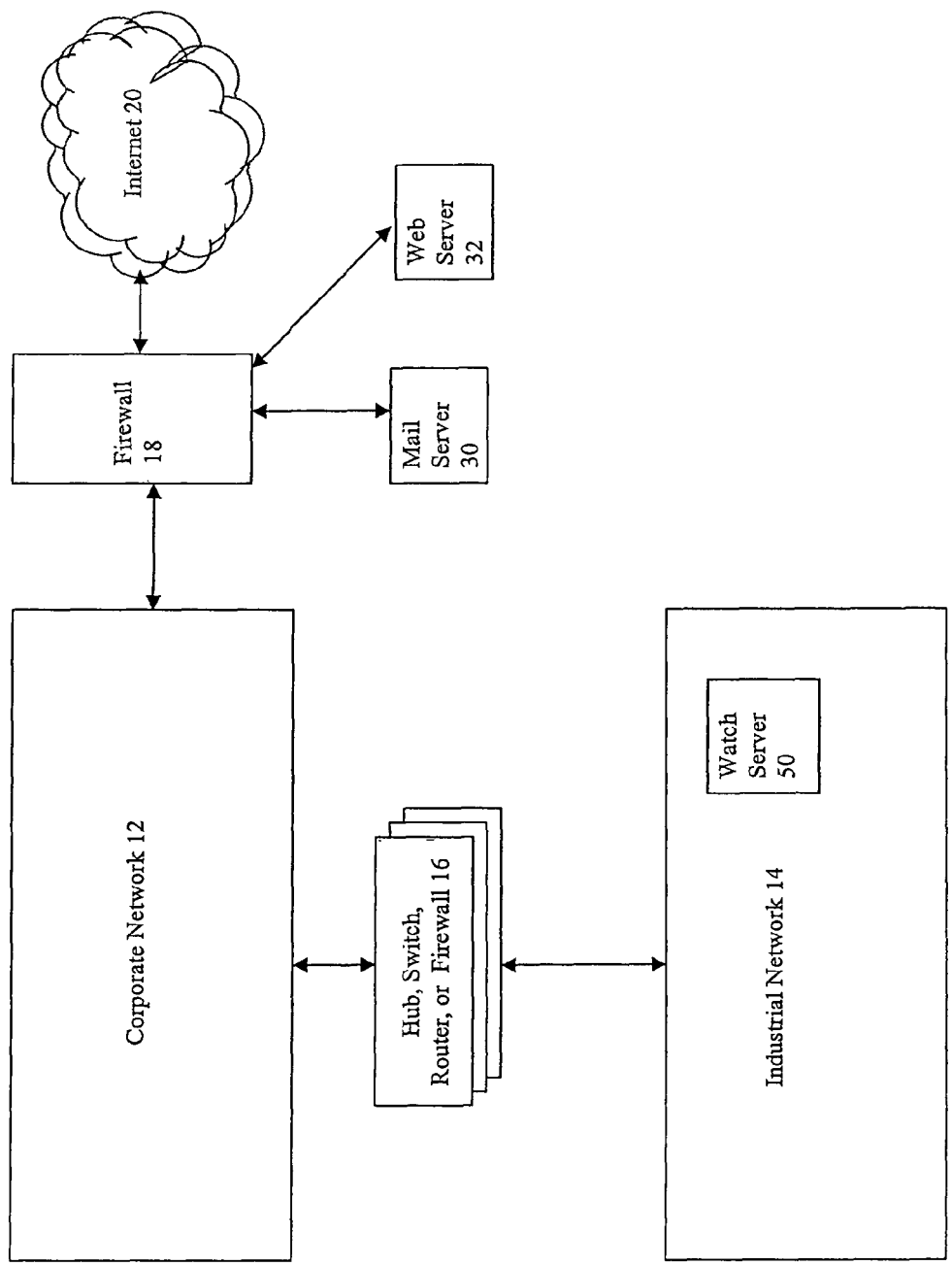
FIG. 1 is an example of an embodiment of a system described herein.

Referring now to FIG. 1, shown is an example of an embodiment 10 of the system that may be used in connection with techniques described herein. The system 10 may be part of an infrastructure used in connection with, for example, manufacturing, power generation, energy distribution, waste handling, transportation, telecommunications, water treatment, and the like. Included in the system 10 is a corporate network 12 connected through a hub, switch, router and/or firewall 16 to an industrial network 14. The corporate network 12 may be connected to one or more external networks such as the Internet 20 through a firewall 18 and/or other devices. Also connected to the corporate network 12, either directly or via the firewall 18, may be a mail server 30, a web server 32 and/or any one or more other hardware and/or software components.

It should be noted that although the system 10 of FIG. 1 includes a firewall 18 and may also include one or more other firewalls or security measures, the corporate network as well as the industrial network may be susceptible to cyber attacks and other types of security threats, both malicious and accidental. As will be described in following paragraphs, different computer systems that may be included within an embodiment of the industrial network 14 must operate in accordance with an extremely high rate of failsafe performance due to the critical applications and tasks that the industrial network may be used in connection with. In other words, there is a very low tolerance for failure of components included in the industrial network 14. Loss of control and failure within the industrial network 14 may result in much more catastrophic conditions than a failure that may occur within the corporate network 12. For example, a catastrophic failure within the corporate network 12 may force a back-up retrieval of information. However, in the event that the industrial network 14 is being used in connection with supplying power or controlling a system such as train switching, failure may result in a catastrophic loss in terms of both human and economic dimensions.

In connection with the system 10, it should also be noted that external threats such as may be encountered from an external hacker coming through the Internet 20 to access the industrial network 14 may only account for part of the security threats. A large number of cyber attacks and other threats may come from within the system 10 itself such as, for example, within the corporate network 12 or from within the industrial network 14. For example, a disgruntled employee may attempt to perform a malicious attack from within the industrial network 14 as well as within the corporate network 12 in an attempt to cause operation failure of one or more components of the industrial network 14. As another example, someone may connect to the industrial network or the corporate network 12 using a laptop that might be infected, for example, with a form of malicious codes such as a Trojan, a virus, a worm, and the like. This malicious code may be introduced within the system 10 on the corporate network 12 or within the industrial network 14 independent of the firewall 18 and/or firewall 16 functioning. Such types of internal threats may not be caught or prevented by the firewall or other security measures developed for preventing primarily external threats. Thus, an embodiment of the system 10 may ideally include and utilize other techniques in connection with controlling, supervising, and securing operation of the components within the system 10 in a failsafe manner.

The corporate network 12 may include components generally used in office and corporate activities such as, for example, systems used by individuals in performing accounting functions, and other administrative tasks. The web server 32 may be used, for example, in servicing requests made to a website associated with the corporate network 12. Incoming e-mail from the internet 20 to the corporate network 12 may be handled by the e-mail server 30. It should be noted that an embodiment of the system 10 may include other components than as described herein in accordance with a particular functionality of each embodiment.

The corporate network 12 may be connected to the industrial network 14 through the hub, switch, router, or firewall 16. It should be noted that the corporate network 12 may be connected to the industrial network 14 by one or more of the foregoing mentioned in connection with element 16. In other words, the element 16 in FIG. 1 may represent a layering or hierarchical arrangement of hardware and/or software used in connecting the corporate network 12 to the industrial network 14. The different arrangements of 16 included in an embodiment may vary in accordance with a desired degree of security in accordance with the particular use of the components within the industrial network 14.

Included in the industrial network 14 in this embodiment is a Watch server 50. The Watch server 50 may be characterized as performing a variety of different monitoring, detection, and notification tasks in connection with the industrial network 14 and connection to the corporate network. The Watch server 50 is described in more detail elsewhere herein.

Components included in an embodiment of the system 10 may be connected to each other and to external systems and components using any one or more different types of communication medium(s). The communication mediums may be any one of a variety of networks or other type of communication connections as known to those skilled in the art. The communication medium may be a network connection, bus, and/or other type of data link, such as a hardwire or other connections known in the art. For example, the communication medium may be the Internet, an intranet, network or other non-network connection(s) which facilitate access of data and communication between the different components.

It should be noted that an embodiment may also include as element 16 other types of connectivity-based hardware and/or software as known to those of ordinary skill in the art to connect the two networks, the corporate network 12 and the industrial network 14. For example, the element 16 may also be a dial-up modem connection, a connection for wireless access points, and the like.

The different components included in the system 10 of FIG. 1 may all be located at the same physical site, may be located at different physical locations, or some combination thereof. The physical location of one or more of the components may dictate the type of communication medium that may be used in providing connections between the different components. For example, some or all of the connections by which the different components may be connected through a communication medium may pass through other communication devices and/or switching equipment that may exist, such as a phone line, a repeater, a multiplexer, or even a satellite.

Figure 2:
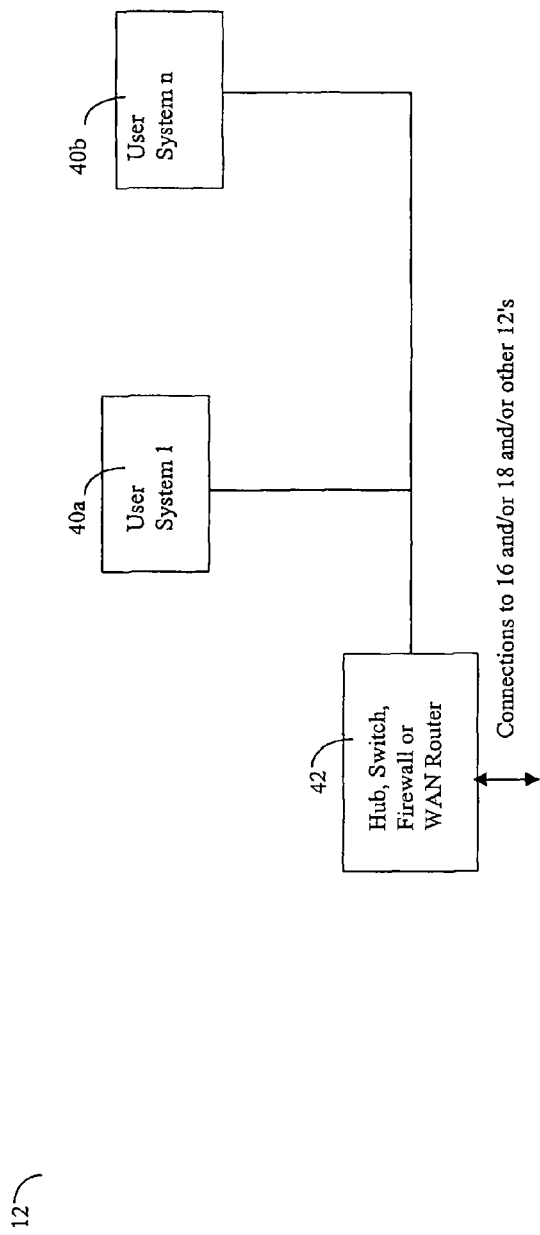
FIG. 2 is an example of an embodiment of components that may be included in a corporate network of the system of FIG. 1.

Referring now to FIG. 2, shown is an example of an embodiment of components that may be included within a corporate network 12. Included in this embodiment 12 of FIG. 2 are user systems 40a-40b, and a hub, switch, firewall, or WAN router 42. The component 42 may be used in connecting this particular corporate network to one or more other corporate networks, to the firewall 18, and also to any other components included in 16 previously described in connection with FIG. 1.

Each of the user systems 40a-40b may include any one of a variety of different types of computer systems and components. Generally, in connection with computer systems included within the corporate network 12 as well as in connection with other components described herein, the processors may be any one of a variety of commercially available single or multi-processor systems such as, for example, an Intel-based processor, an IBM mainframe, or other type of processor able to support the incoming traffic and tasks in accordance with each particular embodiment and application. Each of the different components, such as the hub, switch, firewall, and/or router 42, may be any one of a variety of different components which are commercially available and may also be of a proprietary design.

Each of the user systems 40a-40b may include one or more data storage devices varying in number and type in accordance with each particular system. For example, a data storage device may include a single device, such as a disk drive, as well as a plurality of devices in a more complex configuration, such as with a storage area network (SAN), and the like. Data may be stored, for example, on magnetic, optical, silicon-based, or non-silicon-based media. The particular arrangement and configuration may vary in accordance with the parameters and requirements associated with each embodiment and system.

Each of the user systems 40a-40b, as well as other computer systems described in following paragraphs, may also include one or more I/O devices such as, for example, a keyboard, a mouse, a display device such as a monitor, and the like. Each of these components within a computer system may communicate via any one or more of a variety of different communication connections in accordance with the particular components included therein.

It should be noted that a corporate network may include other components besides user systems such as, for example, a network printer available for use by each user system.

Figure 3:
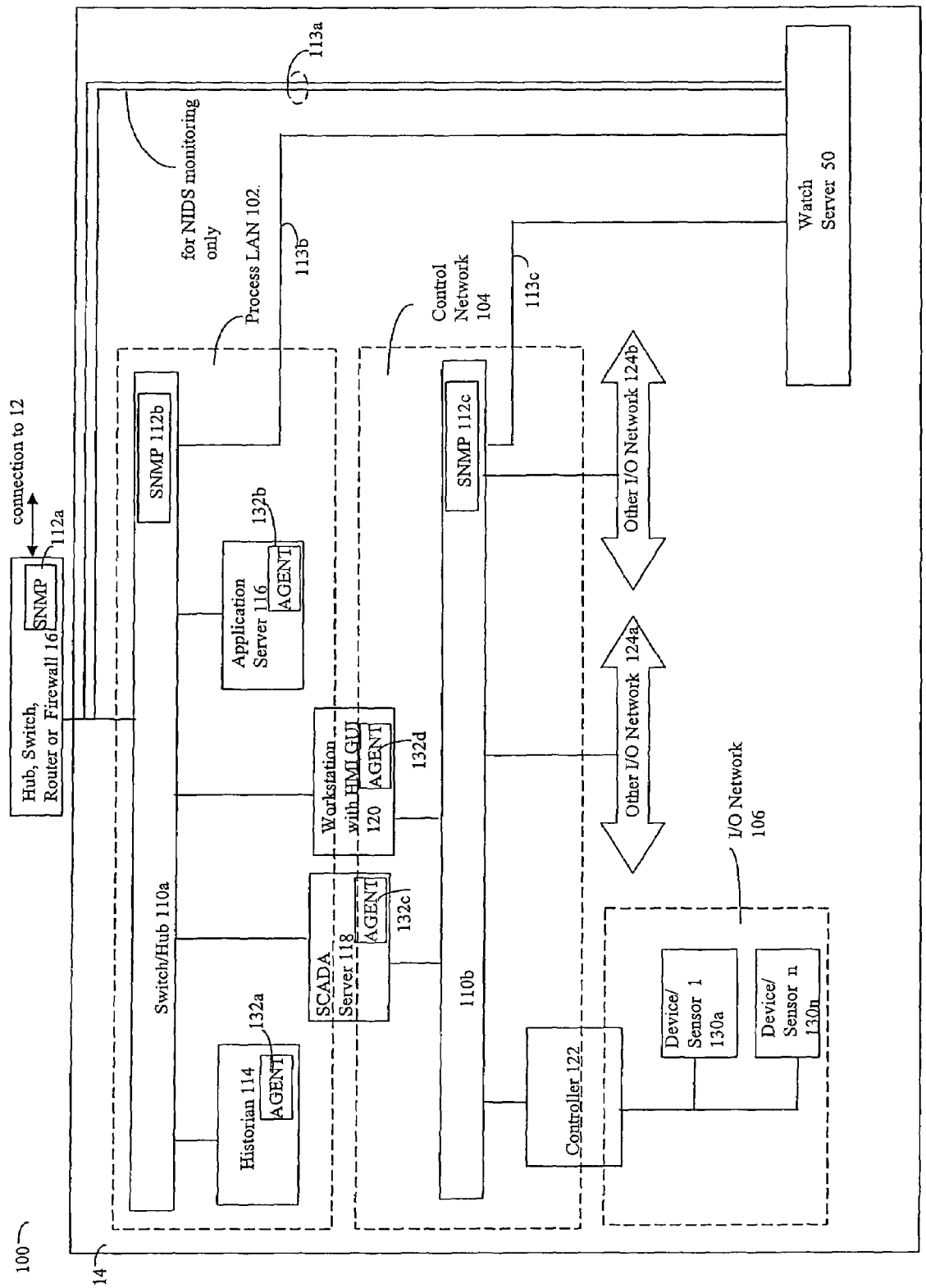
FIG. 3 is a more detailed example of an embodiment of components that may be included in an industrial network of the system of FIG. 1.

Referring now to FIG. 3, shown is a more detailed example of an embodiment 100 of components previously described in connection with the system 10 of FIG. 1. Included in the industrial network 14 in one embodiment may be a process LAN 102, a control network 104, an I/O network 106, one or more other I/O networks 124a and 124b, and a Watch server 50. In this example, the industrial network 14 may be connected to the corporate network 12 by the hub, switch, router, or firewall 16. It should be noted that the industrial network 14 may include other components than as described herein as well as multiple instances of components described herein. In one embodiment, component 16 may be an integrated security appliance such as, for example, the Fortinet Fortigate appliance.

The process LAN 102 may be characterized as performing tasks in connection with data management, integration, display, and the like. The control network 104 may be used in connection with controlling the one or more devices within the I/O network 106 as well as one or more other I/O networks 124a and 124b. The Watch server 50 may be characterized as performing a variety of different monitoring, detection, and notification tasks in connection with the industrial network 14 and connection to the corporate network. The Watch server 50 and other components included within an embodiment of 14 described in more detail in the following paragraphs may be used in connection with the operation of the industrial network 14 in order to provide for proper operation of the industrial network 14 and component 16 and security threat management.

The process LAN 102 of FIG. 3 includes a switch or hub 110a connected to component 16 and one or more other components within the process LAN 102. Components included in this example of the process LAN 102 are a historian 114 and an application server 116. The historian 114 may be used, for example, in storing a history of the different monitoring data that may be gathered by other components included within the network 14. The historian 114, for example, may serve as a data archive for the different types of data gathered over time within the network 14. The application server 116 may be used to execute an application that performs, for example, process optimization using sensor and other data. The application server 116 may communicate results to the SCADA server for use in controlling the operations of the network 14.

The SCADA (Supervisory Control and Data Acquisition) server 118 may be used in remotely monitoring and controlling different components within the control network 104 and the I/O network 106. Note also that the SCADA server included in FIG. 2 generally refers to a control system, such as a distributed control system (DCS). Additionally, the SCADA server 118 may also be responsible for controlling and monitoring components included in other I/O networks 124a and 124a. For example, the SCADA server 118 may issue one or more commands to the controller 122 in connection with controlling the devices 130a-130n within the I/O network 106. The SCADA server 118 may similarly be used in connection with controlling and monitoring other components within the I/O networks 124a and 124b. As known to those of ordinary skill in the art, a SCADA server may be used as part of a large system for remotely monitoring and controlling, for example, different types of energy production, distribution and transmission facilities, transportation systems, and the like. Generally, the SCADA server 118 may be used in connection with controlling and remotely or locally monitoring what may be characterized as components over possibly a large geographically distributed area. The SCADA server may rely on, for example, communication links such as radio, satellite, and telephone lines in connection with communicating with I/O networks 124a and 124b as well as I/O network 106. The particular configuration may vary in accordance with each particular application and embodiment.

The workstation 120 may include a human machine interface (HMI), such as a graphical user interface (GUI). The workstation 120 may be used, for example, in connection with obtaining different sensor readings, such as temperature, pressure, and the like, from the devices 130a-130n in the I/O network 106, and displaying these readings on the GUI of the workstation 120. The workstation 120 may also be used in connection with accepting one or more user inputs in response, for example, to viewing particular values for different sensor readings. For example, the workstation 120 may be used in connection with an application monitoring a transportation system. An operator may use the GUI of workstation 120 to view certain selected statistics or information about the system. The selections may be made using the GUI of the workstation 120. Other inputs from the workstation 120 may serve as instructions for controlling and monitoring the operation of different devices and components within the industrial network 14 and one or more I/O networks. For example, the transportation system may be used in dispatching and monitoring one or more trains.

The SCADA server 118 may also be used in connection with performing data acquisition of different values obtained by the device sensors 130a-130n in performing its monitoring and/or controlling operations. The data may be communicated to the SCADA server 118 as well as the workstation 120. The SCADA server 118, for example, may monitor flow rates and other values obtained from one or more of the different sensors and may produce an alert to an operator in connection with detection of a dangerous condition. The dangerous condition or detection may result in an alarm being generated on the workstation 120, for example, such as may be displayed to a user via the GUI. The SCADA server 118 monitors the physical processing within the industrial network and I/O network(s). The server 118 may, for example, raise alerts to an operator at the workstation 120 when there is a problem detected with the physical plant that may require attention.

The controller 122 may be used in connection with issuing commands to control the different devices, such as 130a-130n, as well converting sensor signal data, for example, into a digital signal from analog data that may be gathered from a particular device. An embodiment may also have a controller 122 perform other functionality than as described herein.

The Watch server 50 may be used in connection with monitoring, detecting, and when appropriate, notifying a user in accordance with particular conditions detected. The Watch server 50 may include a Watch module which is included in an appliance. The Watch server 50 may also be installed as a software module on a conventional computer system with a commercially available operating system, such as Windows or LINUX, or a hardened operating system, such as SE LINUX. In one embodiment, the Watch server 50 may be, for example, a rack mount server-class computer having hardware component redundancy and swappable components. The appliance or conventional computer system may be executing, for example, SE LINUX on an IBM X-series server that monitors the logs and performance of the industrial network 14. The foregoing may used in connection with monitoring, detecting and notifying a human and/or controlling computer system or other components where appropriate.

It should be noted that the Watch server 50 may be used in raising alerts detected in connection with the SCADA system, associated networks, and computer processors. In other words, the tasks related to monitoring the computers and networks of FIG. 3 are performed by the Watch server 50. In contrast, as known to those of ordinary skill in the art, the tasks related to the physical plant processing, sensor data gathering, and the like for controlling and monitoring the operation of the particular industrial application(s) are performed by the SCADA server 118.

Included in an embodiment of the network 14 are one or more agents 132a-132d that may be used in collecting data which is reported to the Watch server 50. It should be noted that each of the agents 132a-132d may refer to one or more different agents executing on a computer system to perform data gathering about that computer system. The agents 132a-132d report information about the system upon which they are executing to another system, such as the Watch server 50. The different types of agents that may be included in an embodiment, as well as a particular architecture of each of the agents, are described in more detail elsewhere herein. In addition to each of the agents reporting information to the Watch server 50, other data gathering components may include an SNMP component, such as 112a-112c, which also interact and report data to the Watch server 50. Each of the SNMP components may be used in gathering data about the different network devices upon which the SNMP component resides. As known to those of ordinary skill in the art, these SNMP components 112a-122c may vary in accordance with each particular type of device and may also be supplied by the particular device vendor. In one embodiment, the Watch server 50 may periodically poll each of the SNMP components 112a-112c for data.

In one embodiment of the industrial network 14 as described above, the Watch server 50 may be executing the SE LINUX (Security Enhanced LINUX) operating system. Although other operating systems may be used in connection with the techniques described herein, the SE LINUX operating system may be preferred in an embodiment of the Watch server 50 for at least some of the reasons that will now be described. As known to those of ordinary skill in the art, some operating systems may be characterized as based on a concept of discretionary access control (DAC) which provides two categories of a user. A first category of user may be an administrator for example that has full access to all system resources and a second category of user may be an ordinary user who has full access to the applications and files needed for a job. Examples of operating systems based on the DAC model include for example, a Windows-based operating system. DAC operating systems do not enforce a system-wide security policy. Protective measures are under the control of each of the individual users. A program run by a user, for example, may inherit all the permissions of that user and is free to modify any file that that user has access to. A more highly secure computer system may include an operating system based on mandatory access control (MAC). MAC provides a means for a central administrator to apply system wide access policies that are enforced by the operating system. It provides individual security domains that are isolated from each other unless explicit access privileges are specified. The MAC concept provides for a more finely-grained access control to programs, system resources, and files in comparison to the two level DAC system. MAC supports a wide variety of categories of users and confines damage, for example, that flawed or malicious applications may cause to an individual domain. With this difference in security philosophy, MAC may be characterized as representing a best available alternative in order to protect critical systems from both internal and external cyber attacks. One such operating system that is based on the MAC concept or model is the SE LINUX operating system. The SE LINUX operating system is available, for example, at http://ww.nsa.gov/selinux.

The components included in the industrial network 14 of FIG. 3, such as the agents 132a-132d, SNMP components 112a-112c, and the Watch server 50, may be used in connection with providing a real time security event monitoring system. The different agents 132a-132d included in the industrial network 14 may be installed on the different computer systems included in the industrial network 14 and may report, for example, on machine health, changes in security log files, application status, and the like. This information gathered by each of the agents 132a-132d and SNMP components 112a-112c may be communicated to the Watch server 50. This information may be stored in a real-time database also included on the Watch server 50. From the Watch server 50, alarm limits may be set, alerts may be generated, incident reports may be created, and trends may also be displayed. Watch server 50 may also run a network intrusion detection system (NIDS), and has the ability to monitor network equipment, such as switches, routers, and firewalls, via the SNMP components included in various network devices shown in the illustration 100.

The agents 132a-132d described herein may be characterized as intelligent agents designed to run and report data while minimizing the use of system and network resources. A control network 104 may have a relatively low amount of network bandwidth. Accordingly, when deploying a monitoring device, such as an agent 132a-132d within such a control system, there may be inadequate bandwidth available for reporting the data from each agent. The lower bandwidth of a control network is typical, for example, of older legacy systems upon which the various agents may be deployed. Agents within an embodiment of the network 14 may be designed to minimize the amount of CPU usage, memory usage, and bandwidth consumed in connection with performing the various data gathering and reporting tasks regarding the industrial network 14. In one embodiment, agents may be written in any one or more of a variety of different programming languages such as PERL, C, Java, and the like. Generally, agents may gather different types of information by executing system commands, reading a data file, and the like on the particular system upon which the agents are executing. It should be noted that the agents also consume resources in a bounded manner minimizing the variance of consumption over time. This is described elsewhere herein in more detail.

Agents 132a-132d may format the information into any one of a variety of different message formats, such as XML, and then report this data to the Watch server 50. In one embodiment, the agents 132a-132d may communicate the data to the Watch server 50 over TCP/IP by opening a socket communication channel just long enough to send the relevant data at particularly selected points in time. In one embodiment, the agents 132a-132d operate at the application level in communicating information to the Watch server 50. The Watch server 50 does not send an application level acknowledgement to such received data. Additionally, the agents never read from the communication channel but rather only send data out on this communication channel as a security measure. It should be noted that although the embodiment described herein uses TCP, the techniques described herein may be used in an embodiment with UDP or another type of connectionless communication.

As described in the following paragraphs, the agents that may be included in a system 10 of FIG. 1 may be generally characterized as 2 different classes of monitoring agents. A first class of agent may be used in monitoring control systems upon which the agent actually executes. Agents in this first class are those included in the industrial network 14 of FIG. 3, such as agents 132a-132d. A second class of agent that may be included in an embodiment is described elsewhere herein in connection with, for example, the Watch server 50. Agents of this second class may be used in monitoring input from third party equipment or applications or other activity about a system other than the system upon which the agent is executing. As described in more detail elsewhere herein, different types of agents of either class may be used in an embodiment to gather the different types of data.

It should be noted that the various activities performed by the agents described herein may be used in connection with monitoring and reporting, for example, on cyber-security incidents as well as the performance of different system devices such as, for example, the different computer systems for CPU load, space and memory usage, power supply voltage, and the like. Although one particular type of security threat is a cyber-security threat as described herein, it should be noted that the techniques and systems described herein may be used in connection with monitoring security threats that are of different types. For example, control system damage may be caused, for example, by a faulty power supply, faulty performance of other components, and the like. The various agents deployed within an embodiment of the system 10 of FIG. 1 may be used in detecting both malicious as well as accidental threats to the industrial network 14. It may also be useful to correlate performance information with security information when assessing the likelihood of system compromise as a result of an attack on one or more systems.

Although the agents 132a-132d are illustrated in connection with particular components included in FIG. 3, agents 132a-132d may also be used in monitoring a controller 122, devices 130a-130n, and the like as needed and possible in accordance with each embodiment. Agents may be used on components having a computer processor capable of performing the tasks described herein and meeting predefined resource limitations that may vary with each embodiment. For example, agents may be executed on "smart" controllers, such as 122, if the controller has a processor able to execute code that performs the agent functionality. There may also be a connection from the controller 122 to the Watch server 50 to communicate the agent gathered data to the Watch server 50.

In FIG. 3, it should be noted that each of 113a, 113b, and 113c may refer to one or more connections and may vary in accordance with the particular component connected to the Watch server 50 by each connection. For example, component 16 may be a hub, switch, router or firewall. If component 16 is a switch, element 113a may refer to two communication connections between 16 and the Watch server 50 where one of the connections is connected to the spanning port of the switch and is used for the monitoring operations for network intrusion detection by the Watch server 50. In an embodiment in which the component is a hub, a single connection may be used. The foregoing also applies to connections 113b and 113c and, respectively, components 110a and 110b.

Figure 4:
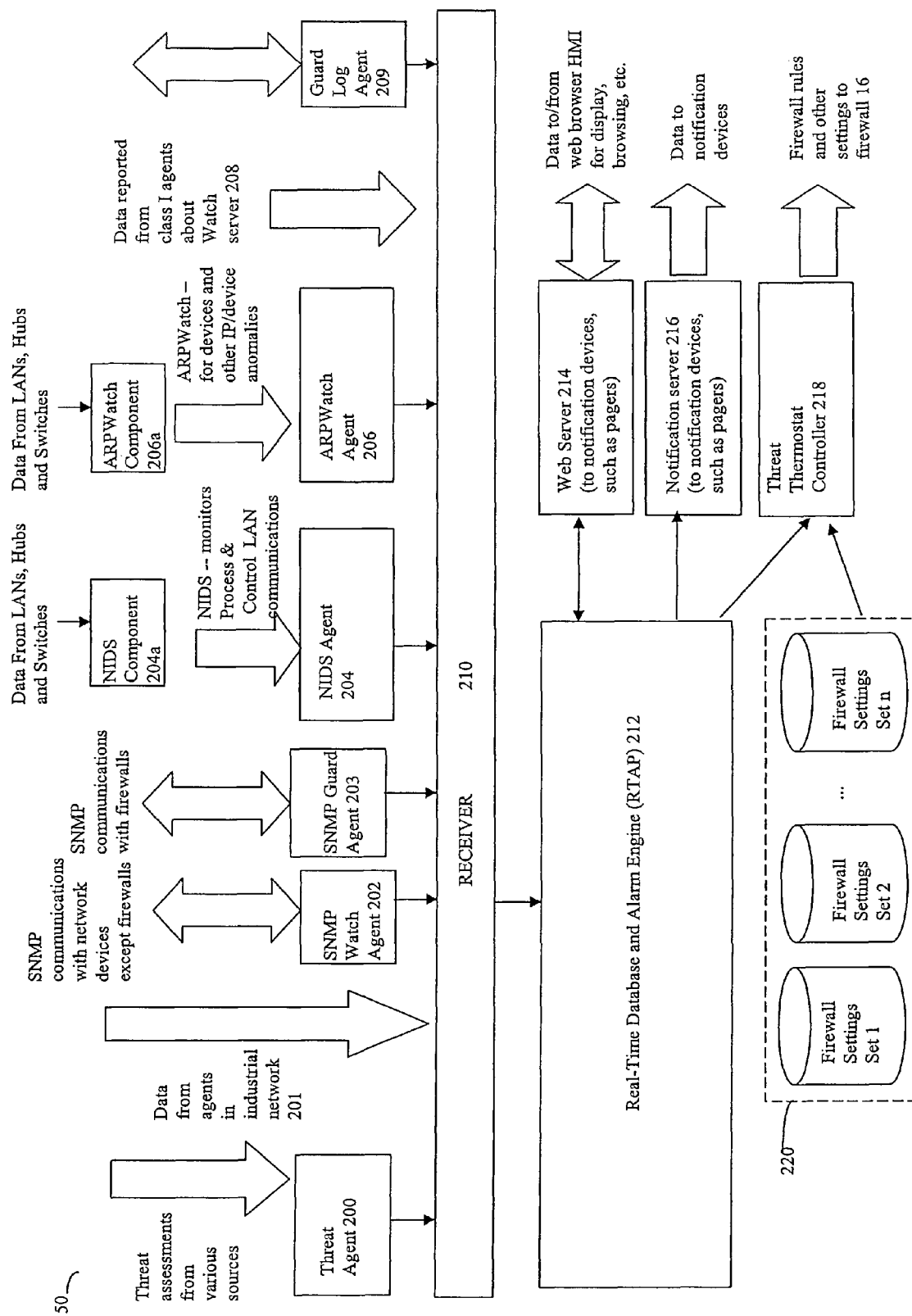
FIG. 4 is a more detailed example of an embodiment of components that may be included in the watch server of FIG. 3.

Referring now to FIG. 4, shown is an example of an embodiment of components that may be included in a Watch server 50. Watch server 50 in one embodiment may include a threat agent 200, an SNMP Watch agent 202, an SNMP Guard Agent 203, a NIDS agent 204, an ARPWatch agent 206, and a Guard log agent 209. Data 201 produced by the agents executing in the industrial network may be received by the Watch server. The Watch server 50 itself may be monitored using one or more agents 208 of the first class. Data from these agents is referenced as 208 in FIG. 4. Each of 200, 201, 202, 203, 204, 206, 208 and 209 communicates with the receiver 210 to store data in RTAP (real-time database and alarm engine) 212. The Watch server 50 may also include a web server 214, a notification server 216, a threat thermostat controller 218 and one or more firewall settings 220.

The agents included in the Watch server 50, with the exception of the agents reporting data 208, are of the second class of agent described elsewhere herein in which the agents included in the Watch server gather or report information about one or more systems other than that system upon which the agent is executing. It should be noted that this class of agent is in contrast, for example, to the agents 132a-132d previously described in connection with FIG. 3 which are executed on a computer system and report information to the Watch server 50 about the particular computer system upon which the agent is executing. The agents included within the Watch server 50 may be used in gathering data from one or more sources. As described in connection with the agents of the first class of agent, the second class of agents may be written in any one or more programming languages.

The threat agent 200 receives threat assessments from one or more sources which are external to the industrial network 14. The inputs to the component 200 may include, for example, a threat assessment level or alert produced by the corporate network, a security or threat level produced by the US government, such as the Homeland Security Threat level, an input published on a private site on the Internet, and the like.

Data from agents of both classes executing within the industrial network 14 of FIG. 3 communicate data to the receiver 210 as input source 201. It should be noted that any one or more of the metrics described herein may be reported by any of the agents in connection with a periodic reporting interval, as well as in accordance with the occurrence of certain thresholds or events being detected.

The SNMP Watch agent 202 periodically polls the different devices including hubs, switches, and routers having a vendor supplied SNMP component, such as 112a and 112b.

The Watch server performs this periodic polling and communicates with each of the SNMP components 112a-112b to obtain information regarding the particular component or network device. SNMP Components, such as 112a, report data to agent 202 such as, for example, metrics related to the activity level on switches and the like being monitored. Similarly, the SNMP Guard agent 203 periodically polls the firewall(s) for data. In one embodiment, the component 203 works with the Fortinet Fortigate series of firewalls. The particular firewall(s) supported and utilized may vary in accordance with each embodiment. The components 202 and 203 use the SNMP protocol to request the information set forth below from network switches, firewalls, and other network equipment.

In one embodiment, the following metrics may be reported by 203 at the end of each periodic reporting interval. It should be noted that the units in an embodiment may vary from what is specified herein. Also, not all metrics may be available and tracked by all devices:

Uptime—How long the device has been running continuously since it was last rebooted or reset.

Configuration—Information from the device that describes the device. This may include, for example, the name of the vendor, the model number, the firmware version, and any other software or ruleset versions that the device supports and may be relevant to an understanding of the behavior of the device.

Communications Status—An indication as to whether the device's SNMP component responded to the previous and/or current SNMP requests for information.

Total incoming and outgoing network traffic, in kilobytes, per reporting interval.

Per-interface incoming and outgoing network traffic, in kilobytes, for a reporting interval.

% CPU Load—The percentage of CPU Utilization in the reporting interval.

% Disk space—For devices with disks, like some firewalls, report the percentage used for every filesystem or partition.

% Memory Used—Report the fraction of physical memory in use.

Open Session Count—a count of open communications sessions.

VPN Tunnel count—a count of the number of machines and/or users connected through a firewall device using an IPSEC, SSL or other Virtual Private Network (VPN) technology. For each such connection, also report the source IP address, and if available:

host name, user name, certificate name and/or any other information that might serve to identify who or what is connected to the control network via the VPN connection.

Administrative User Count—A count of how many "root" or other administrative users are logged into the device and so are capable of changing the configuration of the device. For each such user, when the information is available via SNMP, report the user name, source IP address and any other information that might help to identify who is logged in.

With reference to the foregoing metrics, in one embodiment, the agent 202 may report at periodic intervals uptime, total incoming and outgoing network traffic, and information regarding the particular operating system, version number and the like.

The NIDS agent 204 monitors the process and control LAN communications by scanning messages or copies of messages passing through LANS, hubs, and switches. It should be noted that referring back to FIG. 3, a dedicated connection between a Watch server and these components may be used in connection with performing NIDS monitoring. The NIDS Agent 204 receives data and determines metrics, for example, such as a message count, network intrusion alerts raised, and the like. The NIDS agent 204 may be used in connection with monitoring both the process LAN and the control LAN communications. As an input to the NIDS agent 204, data may come from the NIDS component 204a. Data from LANs, hubs and switches may be input to the NIDS component 204a and used in connection with detection of network intrusions. Included within the NIDS component 204a is a library of signatures that may be used in connection with detecting different types of network intrusions. It should be noted that the NIDS agent 204 may be used in performing real time traffic analysis and packet logging of control networks. The NIDS component 204a may also be used in connection with performing protocol analysis, content searching and matching, and may be used to detect a variety of attacks and different types of probes including, for example, buffer overflows, stealth port scans, CGI attacks, SMB probes, fingerprinting attempts and the like. The NIDS agent 204 may also be used in connection with monitoring an existing third party network intrusion detection system installed on a control network.

In one embodiment, the NIDS component 204a is implemented using SNORT technology. As known to those of ordinary skill in the art, SNORT is described, for example, at www.snort.org, and may be used in connection with monitoring network traffic, for example, by monitoring and analyzing all messages on the network, such as through one of the connections connected into a spanning port of a switch used in an embodiment of FIG. 3. SNORT reports data on any messages exchanged between any two ports. SNORT uses a pattern matching engine which searches one or more messages for known patterns. The known patterns are associated with known viruses, worms, and the like. For example, a message packet may include a particular bit pattern indicative of a known worm. The NIDS agent may be implemented using both customized and/or conventional NIDS engines. In one embodiment using the SNORT technology, the SNORT open source NIDS engine may be used with the entire SNORT NIDS rules set. An embodiment may also use other NIDS technologies such as, for example, the Fortinet Fortigate NIDS system with the Fortinet Fortigate rules set. An embodiment may also use more than one NIDS system. Specific rules may be disabled or made more specific at particular sites if normal background traffic at the site is found to generate an unacceptable number of false positive alerts as a result of enacting particular rules. This may vary in accordance with each embodiment. An embodiment may connect one or more NIDS engines to the hubs and other components of the industrial network. In the event that the industrial network includes switches, the NIDS engines may be connected to the spanning ports on the switches as described elsewhere herein. If spanning ports are not available, it may be preferable to connect the NIDS engines to monitor the traffic between the industrial network 14 and the corporate network 12, using an Ethernet tap, hub, or other technique as known to those of ordinary skill in the art.

In one embodiment of the NIDS component 204a, customized signatures may be used in addition to those that may be supplied with the NIDS technology such as publicly available at the Snort.org website. These additional signatures may identify network traffic that would be "normal" on a business network, but is not associated with normal activity within an industrial network. These may include, for example, signatures identifying one or more of the following: telnet login traffic; ftp file transfer traffic; web browsing through normal and encrypted connections; reading email through POP3, IMAP and Exchange protocols; sending email through SMTP and Exchange protocols; and using any of the instant messaging products, such as those from Microsoft, Yahoo, and America Online. The foregoing may be considered normal traffic on a business network, such as the corporate network 12, but not within a dedicated-purpose network like the industrial network 14. It should be noted that plant operators within the network 14 may have access to email and other such facilities, but such access may be gained using workstation computers that, while they may sit physically beside critical equipment, may actually be connected to the corporate network and not to the industrial network.

In one embodiment, the following additional NIDS signatures may be used to report all attempts to communicate with well-known UDP and TCP ports having support which is turned off on correctly-hardened Solaris machines running the Foxboro IA industrial control system software:

| Port number | application or service |
| --- | --- |
| 7 | (ECHO) |
| 9 | (DISCARD) |
| 13 | (DAYTIME) |
| 19 | (CHARGEN) |
| 21 | (FTP) |
| 23 | (TELNET) |
| 25 | (SMTP) |
| 79 | (FINGER) |
| 512 | (REXEC) |
| 513 | (RLOGIN) |
| 514 | (RSH) |
| 540 | (UUCP) |
| 1497 | (RFX-LM) |

The foregoing are pairings of a port number and an application or service that may typically access this port for communications. In connection with an industrial network, there should typically be no communications for these ports using the TCP or UDP communication protocols by the above service or application. If any such communications are observed, they are flagged and reported. The foregoing pairings are well-known and described, for example, in RFC 1700 Assigned Number, section entitled "Well-known Port Numbers", at http://www.cis.ohio-state.edu/cgi-bin/rfc/rfc1700.html.

An embodiment may also include additional signatures representative of traffic that should not be present on an industrial network. The signatures below may be used, for example, to monitor and report on ports used for TCP and/or UDP to identify uses that may be characteristic and typical within the corporate or other business network, but are not desirable for use within an industrial network. This may include, for example, using particular applications and services such as Microsoft's NetMeeting, AOL and other Instant Messaging services, and the like.

For both TCP and UDP, report communications for the following:

| Port number | application or service |
| --- | --- |
| 80 | (HTTP) |
| 443 | (HTTPS) |
| 143 | (IMAP) |
| 993 | (IMAPS) |
| 110 | (POP3) |

-continued

| Port number | application or service |
| --- | --- |
| 995 | (POP3S) |
| 989 | (FTPS-DATA) |
| 990 | (FTPS) |
| 992 | (TELNETS) |
| 389 | (LDAP-NETMEETING) |
| 552 | (ULS-NETMEETING) |
| 1503 | (T.120-NETMEETING) |
| 1720 | (H.323-NETMEETING) |
| 1731 | (MSICCP-NETMEETING) |
| 1590 | (AOL-AOL_IMESSENGER) |
| 194 | (IRC) |

For embodiments using Yahoo Instant Messenger, report activity on the following:
  TCP ports 5000, 5001, 5050, 5100
  UDP ports 5000-5010
For embodiments using Microsoft Instant Messenger, report activity on the following:
  TCP ports 1863, 6901 for application/service: (VOICE)
  TCP ports 6891-6900 for application/service: (FILE-XFER)
  UDP port 6901 for application/service: (VOICE)

Note that the particular signatures used may vary with that activity which is typical and/or allowed within each embodiment.

The foregoing are examples of different activities that may not be characterized as normal within operation of an industrial network 14. Any additional signatures used may vary in accordance with each embodiment.

In one embodiment of the NIDS component 204a, customized signatures may be used in an inclusionary manner. Exclusionary NIDS signatures, such as those illustrated above, typically identify and report upon abnormal or undesirable messages detected on the network being monitored. As additional undesirable, abnormal or atypical messages are identified, new and corresponding NIDS signatures are developed for use in the embodiment. An embodiment may use inclusionary NIDS signatures to identify messages that are part of the network's normal, or desirable operating state and report upon any message not identified as such. New inclusionary NIDS signatures are developed in such an embodiment whenever a type of message is determined to be within the normal or acceptable behavior of a given network. In an embodiment using the inclusionary signatures, no additional signatures are needed to identify new undesirable or abnormal messages. Inclusionary signatures therefore incur lower signature update costs than do exclusionary signatures on networks whose normal or desirable network or message traffic patterns change infrequently. On such networks, it can be argued that inclusionary signatures may provide greater security, because they are immediately able to identify new abnormal or undesirable messages, without waiting for exclusionary signatures to be identified, developed or installed.

In one embodiment, the NIDS agent 204 may have a reporting interval every 10 seconds. The password age agent 310, described elsewhere herein, may have a reporting interval of every hour. The other agents may have a reporting interval of once every minute which may vary in accordance with the resources within each embodiment and computer systems therein.

The ARPWatch agent 206 may detect one or more events of interest in connection with the ARP (address resolution protocol) messages monitored. ARP may be used with the internet protocol (IP) and other protocols as described in RFC 826 at http://www.cis.ohio-state.edu/cgi-bin/rfc/rfc0826.html. In one embodiment, the ARPWatch 206a is based on open source software, as described in ftp://ftp.ee.lbl.gov/arp-watch.tar.gz, with additional functionality described herein to minimize false positives. As known to those of ordinary skill in the art, ARP may be used in performing IP address resolution and binding to a device address. The ARPWatch 206a may, for example, look for any new devices, such as computers, detected on a network. The ARPWatch 206a may monitor the industrial network 14 for the introduction of new types of devices and log information regarding these new devices. The ARPWatch agent 206, for example, may use information on new devices provided by 206a and report information to RTAP in a fashion similar to that used with the NIDS agent using SNORT based technology. For example, a laptop computer may be turned on and connected for a short time period to a network by a wireless connection. When the laptop is introduced into the network, a network address is associated with the laptop while in the network. This may be done by binding an IP address to the device address unique to the particular laptop. When first introduced into the network, there is no known IP address for the laptop. In connection with assigning an IP address to this new laptop, one or more messages may be monitored in the network to detect this event of introducing a new device in the network causing a new binding of an IP address to the unique address of the laptop. The IP addresses associated with the device may be assigned on a visitor or temporary basis, such as with the laptop. Thus, IP addresses may be reused such that a same IP address may be bound to different devices at different points in time.

In one embodiment, a customized version of ARPWatch may raise an alert if the device address of the computer was not previously known or active. An alert may also be raised if the device address was assigned to some other IP address or the IP address had some other device address assigned to it within a prior time period, for example, such as 15-20 minutes. Within an embodiment, the prior time period may vary. It should be noted that the prior time period may be long enough to be confident that the device to which the other IP address was assigned is no longer connected to the network.

Such activity may be a sign of, for example, ARP spoofing or ARP poisoning. As known in the art, ARP spoofing occurs when a forged ARP reply message is sent to an original ARP request, and/or forged ARP requests are sent. In the forged replies and/or forged requests, the forger associates a known IP address with an incorrect device address, often the forger's own device address. Thus, receiving the forged ARP messages causes a reassignment of the known IP address to the address of the forger's device, in one or more other devices on the network. This can also cause the network's own table of address bindings to be updated or poisoned with the forged binding. The time period described above may be used to minimize the false positives as may be generated when using the standard open source ARPWatch in IP-address-poor DHCP environments.

The agent 206 in one embodiment uses a version of ARPWatch that issues fewer messages than the conventional open source version for ARP frames containing invalid IP addresses that do not fall within the local network mask. The conventional open source ARPwatch logs a message for every ARP frame containing an invalid IP address resulting in up to 100 messages per minute for a given invalid IP address detection.

The ARPWatch 206a in one embodiment keeps track of the invalid addresses detected and reports invalid IP/device address binding for as long as the ARPWatch 206a is running.

The RTAP 212 may also track changed IP addresses reported by the ARPWatch 206a via the ARPWatch agent 206, and the web server 214 may then present a list of these to the network administrator for approval such that these addresses are no longer considered as "new." An embodiment may also provide functionality for approving new and/or changed IP/device address bindings, and/or provide functionality for individually approving new IP addresses and/or new and/or changed IP/device address bindings as well as approving the entire list presented at once. Once the foregoing new device address/IP bindings are approved, the number of "new" network devices drops to zero and any RTAP alert that may be outstanding against that count is reset to a normal condition or state.

In one embodiment, agents of the first class described elsewhere herein may be executing on the Watch server monitoring the health, performance, and security of the Watch server. The data from these agents 208 is sent to the receiver 210 to report data about the Watch server 50. The particular types of this first class of agent are described elsewhere herein, for example, in connection with FIGS. 5 and 6. An embodiment may include any number of these types of agents of the first class to report data about the Watch server 50.

The Guard log agent 209 monitors log files of the Watch server 50 and also the firewall log files of one or more firewalls being monitored, such as an embodiment including a firewall as component 16 of FIG. 3. In one embodiment, an option may be set on the Fortinet Fortigate firewall to automatically transmit all firewall log information to the Watch server 50. On the Watch server 50, the received firewall log information may be included as part of the system logging for the Watch server 50. In one embodiment, the system log files of the Watch server may be segregated into different physical files of the file system. The firewall log files may be included in a separate physical file in the Watch Server's log file area. The Guard log agent 209 may also obtain additional information from the firewall using SSH (Secure SHell). The agent 209, using SSH (Secure SHell), remotely logs into a machine via a shell. As known to those of ordinary skill in the art, SSH may be characterized as similar in functionality to telnet, however unlike telnet, all data exchanged is encrypted. In one embodiment, the agent 209 may download a copy of the firewall rules and other configuration information currently in use in a firewall using SSH. Other embodiments may use other secure command and communications technologies such as, for example, IPSEC, sftp, HTTPS, SSL, and the like. The agent 209 may have a master set of firewall configuration information which it expects to be currently in use. The downloaded copy of firewall configuration information currently in use may be compared to the master set to determine any differences. In the event that any differences are detected, an alert may be raised and signaled by RTAP 212.

In one embodiment, the following metrics may be reported by the Guard log agent 209 in connection with the firewall log files every reporting interval:

firewall violations—Report the total number of firewall violations messages detected in the reporting interval. On platforms that distinguish different kinds of violation messages, report those counts separately. For example, one embodiment uses ipchains which, as known to those of ordinary skill in the art, is available on some versions of Linux to set up, maintain and inspect the IP firewall rules in the Linux kernel. Ipchains provides for distinguishing "dropped" packets from "rejected" packets, and these counts may be reported out separately.

Report the first three firewall violation messages detected for each type of violation message in each reporting interval.

Report a summary information for each types of firewall violation message. The summary information may include, for example, one or more IP addresses identified as the source for most of the messages, what percentage of the messages are associated with each IP address, one or more IP addresses that are the target in a majority of the messages, and what percentage of messages are associated with each target address.

Network IDS (intrusion detection system) and IPS (intrusion prevention system) reports—Report the total number of intrusion detection and prevention reports logged in the reporting period. For systems that report different kinds or priorities or severities of intrusion attempts, report the total number of each class of attempts as separate metrics.

For each separately-reported class of intrusion attempts, report the first three attempts logged in each reporting interval as well as the total number of attempts.

Summary reporting information for each class of intrusion attempt—Report the most common source IP address, destination IP address and attack type and the percentage of total attempts in that class of attempt that had that most common source IP, destination IP or attack type.

Firewall configuration change—This is described above in which the agent 209 may report a boolean value indicating whether any aspect of the industrial network firewall configuration has changed at the end of the reporting interval. As described above, the agent 209 agent uses firewall-specified technologies (eg: ssh or tftp) to download the currently active firewall configuration to the server 50. If the configuration downloaded at the end of one reporting interval differs from the configuration downloaded at the end of the previous reporting interval, the agent 209 reports a one, otherwise if the downloaded configuration differs from the saved firewall settings for the current threat level, the agent 209 reports a one, otherwise if any of the saved firewall settings for any threat level have changed in the reporting interval, the agent reports a one, otherwise it reports a zero. The agent 209 also reports a one-line summary of what area of the firewall configuration has changed, such as, for example, the saved settings, the downloaded configuration, and the like, with further detail as to what part of the configuration changed, such as, for example, the firewall rules, the number of active ports, address translation rule, and the like. If the configuration has changed, the alert may remain in the elevated alarm state until an authorized administrator, for example, updates the saved configuration data (firewall configuration set) on the Watch server 50 as the new master set of configuration data.

It should be noted that in industrial networks, for example, paths through the firewall may be opened temporarily by a short term firewall configuration change such as while short-term projects or contractors are on-site. The firewall configuration change metric allows for automatic tracking and determination of when there has been such a change. In response to a one for this metric, for example, RTAP 212 may generate an alert condition. This condition may continue to be tracked as long as the configuration is non-standard until the configuration is restored to a firewall configuration known to be safe.

Threat thermostat configuration change—Reports the number of saved firewall configurations corresponding to threat thermostat threat levels that have changed in the reporting interval.

Note that the agent 209 keeps a copy of the saved firewall configurations corresponding to the different threat levels. At the end of the reporting interval, the agent 209 compares the copies to the current firewall configurations corresponding to the different threat levels and reports if a particular pairing of firewall rule sets with an associated threat level has changed, or if there has been a change to any one of the rules sets. If there have been any changes, then after reporting, the agent 209 replaces its set of saved firewall configurations with the modified firewall configurations. For every configuration that changed in a reporting period, the agent 209 also reports a one-line summary of what has changed in the configuration.

Other activity and innocuous activity filters—In log files of firewalls and other systems, various metrics may be derived from a master system log file. The "other activity" metric is a count of "unusual" messages detected in the master log file during the reporting interval. A set of messages may be defined as unusual using a default and/or user specified set. For example, unusual messages to be included in this metric may be filtered using regular expressions. Any line of the log file that is not counted as some other metric is a candidate for "other activity." These "other activity" candidate lines are compared to each of the saved regular expressions and discarded if there is a match with any expression. Otherwise, the candidate log entry is counted as an incident of "unusual activity". When all the log entries generated during the reporting interval are processed, the "unusual" count is reported as the value of the "other activity" metric.

The receiver 210 is used to interface with RTAP 212. In one embodiment, use of facilities in RTAP 212 is in accordance with a predefined interface or API (application programming interface). One of the functions of the receiver 210 is to convert the agent protocol data received into a format in accordance with a known RTAP API in order to populate the database of RTAP 212. Additionally, the receiver 210 may perform agent authentication of messages received. For example, in one embodiment, a private unique key may be used by each device or processor sending a message to the Watch server 50. The receiver 210 knows these private keys and uses these to authenticate the received messages as being from one of the expected devices. The receiver 210 records the IP address reporting every metric and rejects new values reported for a metric from any IP address but the last address to report legitimately to the metric. Other embodiments may use other encryption techniques and accordingly may use different techniques in authenticating received messages.

The notification server 216 and/or the web server 214 may be used in connection with providing incident notification. When configuring the security or system performance metrics used by the Watch server 50, a user may specify an e-mail address or other destination for receiving different types of alert notifications that may be produced. The notification in the event of an alert may be sent, for example, to a PDA, pager, cell phone, and the like upon the occurrence of an event determined by the Watch server. Such an event may include, for example, reported data reaching predetermined alarm or other thresholds, detection of a cyber-attack, detection of a component failure within the industrial network requiring immediate repair, and the like. Once a user has been notified upon such a device, the user may then use a web browser to gain secure access to the Watch server allowing one to examine the problem and acknowledge any one or more alarms. The notification server 216 may also send a message to a direct phone connection, such as to a phone number, rather than an e-mail address.

The web server 214 may be used in connection with displaying information and/or accepting input from a user in connection with any one of a variety of different tasks in this embodiment. Other embodiments may use conventional command line, Windows, client/server or other user interfaces known to those of ordinary skill in the art. In this embodiment, for example, the web server 214, through a web browser, may be used in displaying a security metric set-up page allowing for customization of security conditions, and definitions used for recording and alarming. For example, a user may specify limit values or thresholds associated with different warnings or alarms. When such thresholds have been reached, a notification message may be sent to one or more specified devices or addresses. Additionally, the web server 214 in connection with a browser may be used, for example, in connection with displaying different types of information regarding a security status, details of selected metrics, and the like. In connection with the use of the web server 214 and a browser, the different agents may be configured and monitored.

The web server 214 may be any one of a variety of different types of web servers known to those of ordinary skill in the art such as, for example, a TOMCAT web server. The web server 214 may be used in connection with obtaining input and/or output using a GUI with a web browser for display, browsing, and the like. The web server 214 and a browser may be used for local access to appliance data as well as remote access to appliance data, such as the RTAP 212 data. The web server 214 may be used in connection with displaying pages to a console in response to a user selection, in response to a detected alert or alarm, obtaining settings for different threshold and alarm levels such as may be used in connection with notifications, and the like. The web server 214 may also be used in connection with communicating information to a device such as a pager in the event of a notification when a particular designated threshold for example of an alarm level has been reached.

RTAP 212 may provide for collection, management, visualization and integration of a variety of different automated operations. Data may be collected and reported to the Watch server and stored in RTAP 212, the Watch server's database. As described elsewhere herein, RTAP 212 may be used in connection with performing security monitoring and providing for appropriate notification in accordance with different events that may be monitored. RTAP may raise alerts, for example, in the event that predetermined threshold conditions or events occur in accordance with the data store maintained by RTAP 212. One embodiment of RTAP is described in following paragraphs in more detail.

RTAP 212 may be implemented using a commercially available real time control system, such as Verano's RTAP product, or the Foxboro Intelligent Automation (IA) product or other SCADA or DCS system. In other words, a conventional control system may be used not to control a physical process, but to monitor the security activity of an industrial network and connections. RTAP 212 may also be implemented using customized software that uses a relational database. As will be appreciated by one of ordinary skill in the art, other embodiments may use other components.

In operation, each of the different agents may report data to RTAP 212 through use of the receiver 210. RTAP 212 may then store the data, process the data, and perform event detection and notification in accordance with predefined alarm levels and thresholds such as may be obtained from user selection or other defined levels. For example, as described above, a user may make selections in accordance with various alarm or alert levels using a browser with a GUI. These particular values specify a threshold that may be stored and used by RTAP 212. As RTAP 212 receives data reported from the different agents, RTAP 212 may process the data in accordance with the threshold(s) previously specified. In the event that an alarm level has been exceeded or reached, the RTAP 212 may signal an alert or alarm, and provide for a notification message to be sent on one or more devices using the web server 214 and/or notification server 206. It should be noted that the various designated location or device to which notification messages are to be sent may also be specified through the same GUI by which the threshold levels are specified.

The threat thermostat controller 218 may be used in generating a response signal in accordance with one or more types of security-threat inputs. In one embodiment, the threat thermostat controller 218 may use as inputs any one or more raw or derived parameters from the RTAP 212, other inputs that may be external to the Watch server, and the like. In one embodiment, in accordance with these various input(s), the threat thermostat controller 218 selects one or more of the firewall settings from 220 which controls access between the corporate network 12 and the industrial network 14 as well as access to the industrial network 14 from other possible connections.

In one embodiment, the threat thermostat controller 218 may use one of three different firewall settings from 220 in accordance with one or more inputs. Each of the firewall settings included in 220 may correspond to one of three different threat levels. In the event that a low threat level is detected for example the firewall rule settings corresponding to this condition may allow all traffic between the corporate network 12 and the industrial network 14 as well as other connections into the industrial network 14 to occur. In the event that a medium threat level is determined, a second different set of firewall settings may be selected from 220. These firewall settings may allow, for example, access to the industrial network 14 from one or more particular designated users or systems only within the corporate network 12. If a high threat level is determined by the threat thermostat controller 218, all traffic between the corporate network 12 and industrial network 14 may be denied as well as any other type of connection external into the industrial network 14. In effect, with a high threat level a determination, for example, an embodiment may completely isolate the industrial network 14 from any type of outside computer connection.

Actions taken in response to a threat level indicator produced by the threat thermostat controller 218 may include physically disconnecting the industrial network 14 from all other external connections, for example, in the event of a highest threat level. This may be performed by using a set of corresponding firewall rules disallowing such connections. Additionally, a physical response may be taken to ensure isolation of one or more critical networks such as, for example, disconnecting a switch or other network device from its power supply. This may be done in a manual or automated fashion such as using a control system to implement RTAP 212. Similarly, a mechanism may be used to reconnect the critical network as appropriate.

In connection with low threat level determinations, the corresponding firewall settings from 220 may allow data to be exchanged between the industrial network and less trusted networks in predefined ways and also allow authorized users on less trusted networks to remotely log into computers on a critical network, such as the industrial network. When the threat level as generated or determined by the threat thermostat controller 218 increases, the second set of firewall rule settings from 220 may be used which provide for a more restrictive flow of communication with a critical network such as the industrial network 14. For example, corporate may notify the industrial network that a particular virus is circulating on the corporate network 12, that a Homeland Security alert status has increased, and the like. Using these different inputs, the second set of rules may be selected and allow critical data only to be exchanged with less trusted networks and also disable remote log in capabilities. In the event that the highest or third level of threat is determined by the threat thermostat controller 218, what may be characterized as an air gap response may be triggered leaving all less trusted networks physically disconnected until the threat(s) have been addressed, such as, for example, by installing any proper operating system and application patches.

In connection with the threat thermostat 218 in one embodiment, five threat levels may be utilized. Associated with each threat level may be a text file with a series of commands that define a particular firewall configuration including firewall rule sets, what network ports are enabled and disabled, address translation rules, and the like. All of this information may be included in each of the text files associated with each of the different threat levels.

One of the inputs to the threat thermostat controller 218 may include, for example, a security level as published by the Homeland Security, an assessment or threat level as produced by a corporate department, and/or another source of a threat level that may be gathered from information such as available on the Internet through a government agency or other type of private organization and reported by the threat agent 200. These assessments may be weighted and combined by the threat thermostat controller 218 to automatically determine a threat level causing a particular set of firewall settings to be utilized. A particular weighting factor may be associated with each of multiple inputs to 218 making the determination of a specific indicator or threat level.

It should be noted that the particular firewall settings included in each of the sets of 220 may include a particular set of firewall rules, address translations, addresses to and from which particular communications may or may not be allowed, intrusion detection and prevention signatures, antivirus signatures, and the like. Inputs to the threat thermostat controller may also include, for example, one or more raw metrics as provided from RTAP, and/or one or more derived parameters based on data from RTAP and/or from other sources. It should be noted that the threat thermostat controller may generate a signal causing data to be displayed on a monitor connected to the Watch server 50 such as through a console as well as to send one or more notification messages to previously designated destinations. In one embodiment, the threat thermostat control level may be displayed on a GUI. In one embodiment, an alert may be generated when there is any type of a change in a firewall rule set or threat level either in an upward or a downward threat level direction.

An embodiment may provide for a manual setting of a threat thermostat level used in the selection of the firewall settings, and the like. This manual setting may be in addition to, or as an alternative to, automated processing that may be performed by the threat thermostat controller 218 in determining a threat level. Additionally, an embodiment may include one or more user inputs in the automatic determination of a threat level by the threat thermostat controller 218. It should be noted that in one embodiment, once the threat level has risen out of the lowest level, only human intervention may lower the thermostat or threat level.

It should also be noted that although various levels of access with respect to a critical network, such as the industrial network, have been suggested in examples herein in connection with different threat levels, an embodiment may vary the particular access associated with each of the different threat levels. Although three or five threat levels and associated rule sets are described herein, an embodiment may include any number, more or less, of threat levels for use in accordance with a particular application and embodiment.

Additionally, in connection with the data that has been gathered by RTAP 212 such as raw data, alerts may be generated using one or more derived or calculated values in accordance with the raw data gathered by the agents.

An embodiment may implement the database portion of RTAP 212 as an object oriented database. RTAP 212 may include a calculation engine and an alarm engine in one embodiment. The calculation engine may be used to perform revised data calculations using a spreadsheet-like data flow process. The alarm engine may determine an alarm function or level using a state table. Details of RTAP 212 are described elsewhere herein in more detail.

It should be noted that any one or more hardware configurations may be used in connection with the components of FIGS. 3 and 4. The particular hardware configuration may vary with each embodiment. For example, it may be preferred to have all the components of FIGS. 3 and 4 executing on a single computer system in a rack-mount arrangement to minimize the impact on the physical layout of a plant or other location being monitored. There may be instances where physical location and layout of a system being monitored require use of extra hardware in a particular configuration. For example, NIDS and ARPWatch may be monitoring the activity of 3 different switches in an industrial network using the spanning ports of each switch. Each of the 3 switches may be located in physical locations not in close proximity to one another or another computer system hosting the components of the Watch server 50. Two switches may be located in different control rooms and one switch may be located in a server room. One hardware configuration is to have the computer system upon which the Watch server components execute monitor the one switch in the server room. Two additional processors may be used in which each processor hosts agents monitoring execution of one of the remaining two switches. The two additional processors are each located in physical proximity near a switch being monitored in the control rooms. The two additional processors are capable of supporting execution of the agents (such as the NIDS agent 204 and ARPWatch Agent 206) and any software (such as NIDS 204a, ARPwatch 206a) used by the agents. These processors are connected to, and communicate with, the computer system upon which the Watch server components execute. As will be appreciated by those of ordinary skill in the art, the hardware and/or software configurations used may vary in accordance with each embodiment and particular criteria thereof.

In one embodiment, it should be noted that the receiver 210 of the Watch server 50 may track the last time a report was received by each agent (class 1 and class 2). In the event that the component 210 determines that an agent has not reported to the receiver 210 within some predetermined time period, such as within 150% of its expected periodic reporting interval, an alert is raised by sending a notification to one of the notification devices. Such an alert may indicate failure of an agent and/or machine and/or tampering with the watch system and/or with agents. Alerts may also be raised if agents report too frequently, indicating that someone may be trying to mask an attack or otherwise interfere with agent operation. Alerts may also be raised if agent reports are incorrectly authenticated, for example, if they are incorrectly encrypted, have an incorrect checksum, contain an incorrect timestamp or sequence number, are from an incorrect IP address, are of incorrect size, or are flagged as being destined for an IP address other than the address on which the receiver 210 is listening.

It should be noted that components 202, 203 and 209 may preferably send encrypted communications where possible to other components besides the receiver 210. Whether encryption is used may vary with the functionality of the components communicating. An embodiment may use, for example, V3.0 or greater of the SNMP protocol with the components 202 and 203 in order to obtain support for encryption. Component 209 may also use encryption when communicating with the firewall.

Figure 4A:
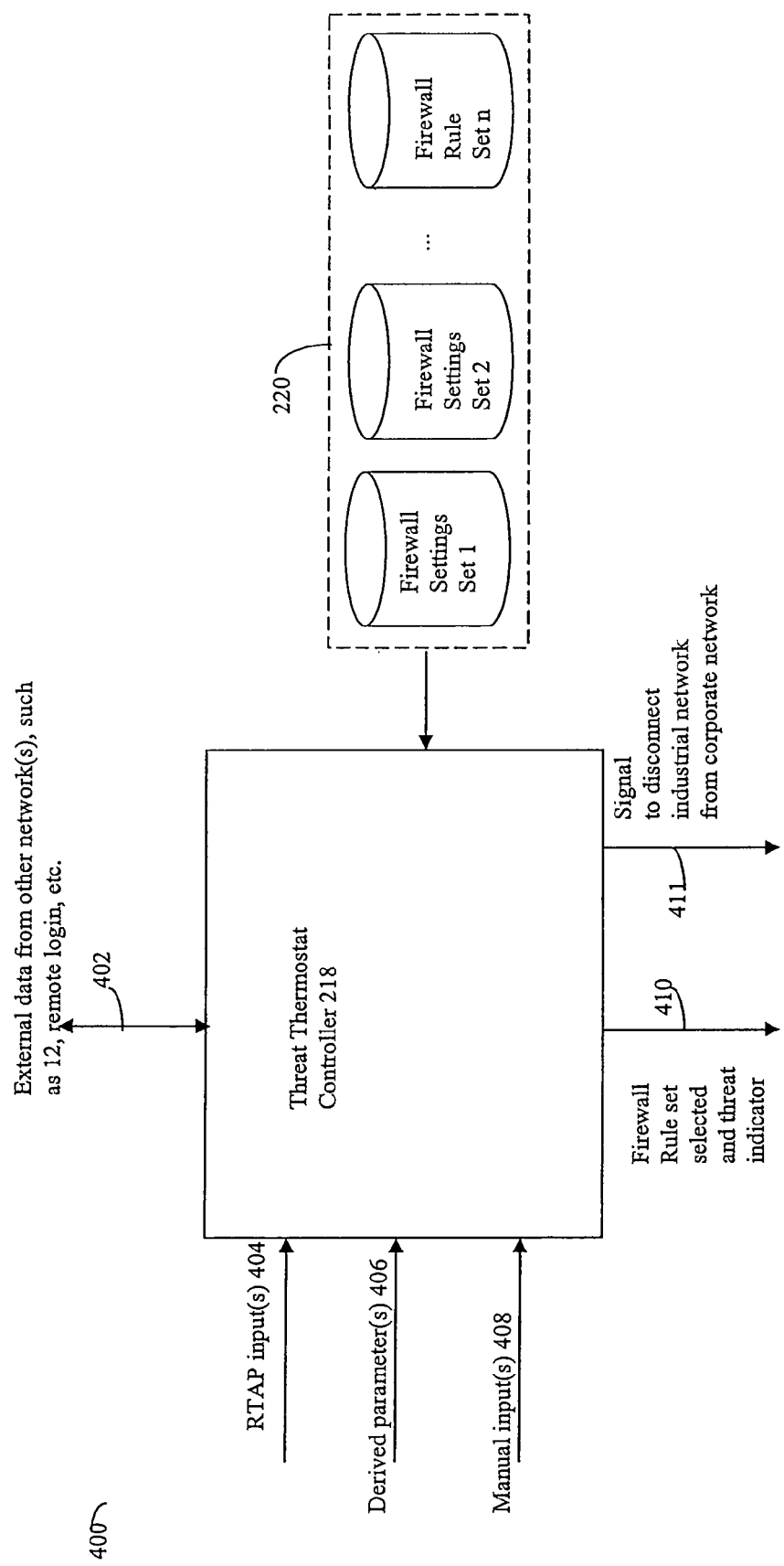
FIG. 4A is a more detailed example of an embodiment of the threat thermostat controller.

Referring now to FIG. 4A, shown is an example 400 of an embodiment of a threat thermostat controller 218 in more detail. In particular, the example 400 illustrates in further detail the one or more inputs that may be used in connection with a threat thermostat controller 218 as described previously in connection with the Watch server 50 of FIG. 4. An embodiment of the threat thermostat controller 218 may automatically determine a firewall rule set and threat indicator 410 in accordance with one or more inputs 402, 406 and/or 408 and 220. Inputs 402, 404, 406 and 408 may be characterized as selection input which provides for selection of one of the firewall settings from 220. As an output, the threat thermostat controller 218 may automatically send the selected firewall settings from 220 and a threat indicator level as a signal or signals 410. Inputs 402 may come from external data sources with respect to the industrial network 14. The external data may include, for example, an indicator from a corporate network, one or more inputs from an internet site such as in connection with a Homeland Security alert, a threat indicator generated by another commercial or private vendor, and the like. This external data may come from network connections, or other type of remote log in connections with respect to the industrial network 14. Other types of input may include one or more RTAP inputs 404. The RTAP inputs 404 may be raw data inputs as gathered by agents and stored within the RTAP 212 database, particular threshold levels, and the like. RTAP inputs 404 may also include a resultant value or indicator that is generated by processing performed by RTAP in accordance with one or more of RTAP data values. An RTAP indicator included as an RTAP input 404 to the threat thermostat controller 218 may be, for example, an indicator as to whether a particular threshold level for one or more metrics is exceeded. The input to the threat thermostat controller 218 may also include one or more derived parameters 406. The derived parameters 406 may be based on one or more raw data values as gathered by the agents and stored in RTAP. These derived values may be stored within RTAP or determined by another source or module. Another input to threat thermostat controller 218 may be one or more manual inputs 408. The manual input or inputs 408 may include, for example, one or more values that have been selectively input by an operator such as through GUI or configuration file. These values may include a metric that may be manually input rather than being received from an external source in an automated fashion.

Although the various inputs described and shown in 400 have been illustrated for use with a threat thermostat controller 218 in one embodiment, it should be noted that any one or more of these as well as different inputs may be used in connection with the threat thermostat controller to produce an output threat indicator. The outputs of the threat thermostat controller 218 include a firewall rule set and threat indicator 410. The firewall rule set and other settings may be communicated, for example, to a firewall as a new set of rules to be used for subsequent communications and controlling access to one or more critical networks. In one embodiment, a new set of firewall rules may be remotely loaded from the Watch server location 220 to the firewall using SSH (described elsewhere herein) and/or any of a variety of secure communications mechanisms known to those of ordinary skill in the art such as, for example, IPSEC, HTTPS, SSL, and the like.

The threat indicator that may be produced by a threat thermostat controller 218 may, also serve as an input to RTAP 212 and may be used, for example, in connection with generating one or more notifications through use of the web server and/or notification server as described elsewhere herein when a particular threat indicator level has increased or decreased, a firewall rule setting selection has been modified and the like. Additionally, data recording for the threat level, date, time, and the like may be recorded in RTAP 212. The threat thermostat controller 218 may also produce an output signal 411 used in connection with automatically controlling the operation of a connecting/disconnecting the industrial network from the corporate network in accordance with the threat indicator. For example, the signal 411 may be input to RTAP, a control system, switch or other hardware and/or software used to control the power supply enabling connection between the industrial network and corporate network as described elsewhere herein.

It should be noted that in one embodiment, only manual inputs may be used. A single manual input may be used in one embodiment, for example, in selection of a threat indicator causing the threat thermostat controller 218 to make a selection of a particular firewall setting. Another embodiment may provide for use of a combination of automated and/or manual techniques where the automated technique may be used to produce a threat indicator unless a manual input is specified. In other words, rather than weight one, or more manual inputs in connection with one or more other inputs in an automated fashion, the manual input or inputs may serve as an override of all of the other inputs in connection with selecting a particular firewall rule set from 220 and generating a threat indicator. Such a manual override may be provided as an option in connection with a mode setting of a threat thermostat controller 218. If the override setting which may be a boolean value is set to on or true, the manual input will act as an override for all other inputs and an automated technique for producing a threat indicator. In the event that override is set to off, the manual input may not be considered at all, or may also be considered along with other inputs in connection with an automated technique used by the threat thermostat controller.

Figure 5:
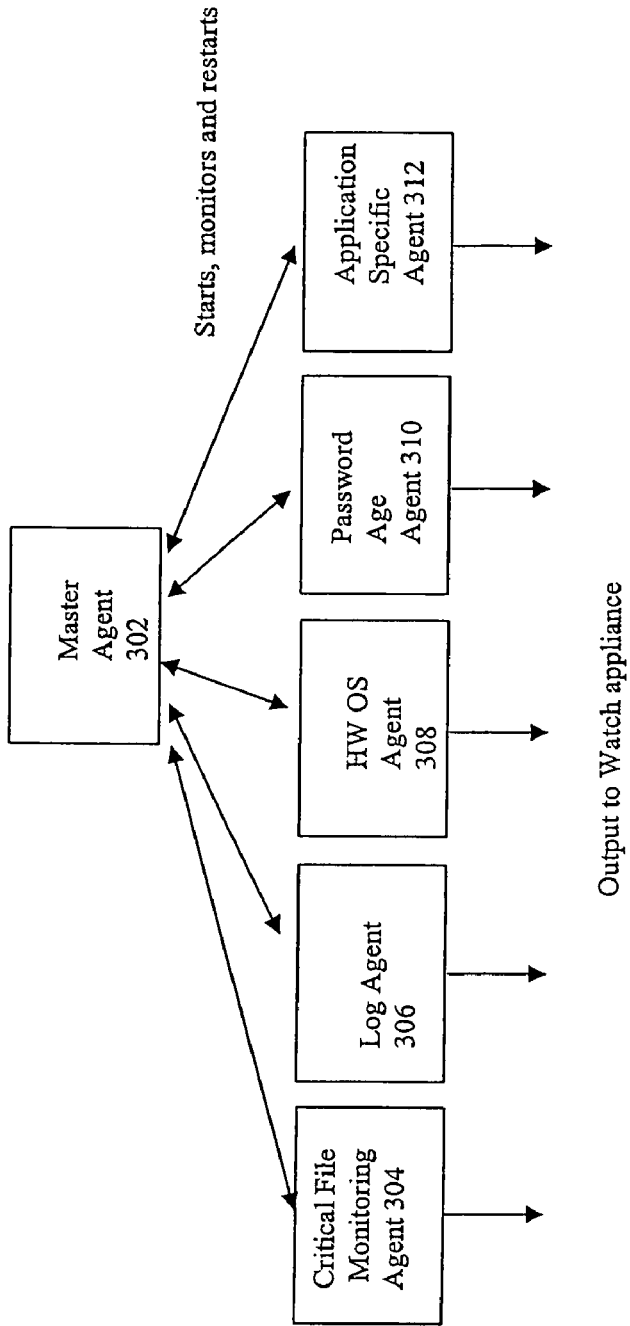
FIG. 5 is an example of the different types of agents that may be included in an embodiment on systems from FIG. 3.

Referring now to FIG. 5, shown is an example 300 of the different types of agents of the first class of agent that may be utilized in an embodiment of the industrial network 14. It should be noted that the agents 300 may be included and executed on each of the computer systems in the industrial network 14 as indicated by the agents 132a-132d. In other words, the different agent types included in 300 are those types of agents that may execute on a system and report information about that system to the Watch server 50. It should be noted that although an embodiment may include the particular agent types of 300, an embodiment may include different types of agents and a different number of agents than as described herein in accordance with the particular application and embodiment and may vary for each computer system included in the industrial network 14.

Included in 300 is a master agent 302, a critical file monitoring agent 304, a log agent 306, a hardware and operating system agent 308, a password age agent 310, and an application specific agent 312. In one embodiment, the master agent 302 is responsible for control of the other agents included in the computer system. For example, the master agent 302 is responsible for starting and monitoring each of the other agents and to ensure that the other agents are executing. In the event that the master agent 302 detects that one of the other agents is not executing, the master agent 302 is responsible for restarting that particular agent. The master agent 302 may also perform other tasks, such as, for example scheduling different agents to ran at different periods of time, and the like.

The critical file monitoring agent 304 may be used in connection with monitoring specified data files. Such data files that may be monitored by agent 304 may include, for example, operating system files, executable files, database files, or other particular data file that may be of importance in connection with a particular application being performed within the industrial network 14. For example, the agent 304 may monitor one or more specified data and/or executable files. The agent 304 may detect particular file operations such as file deletion, creation, modification, and changes to permission, check sum errors, and the like. Agent 304, and others, gather information and may report this information at various time intervals or in accordance with particular events to the Watch server 50.

The log agent 306 may be used in monitoring a system log file for a particular computer system. The log monitoring agent 306 may look for particular strings in connection with system activity such as, for example, "BOOT", or other strings in connection with events that might occur within the computer system. The log agent 306 searches the log file for predetermined strings of interest, and may store in memory the string found as well as one or more corresponding metrics such as, for example, the number of occurrences of a string. For example, the log agent 306 may count occurrences of a BOOT string and report the count in a single message which may be sent to the Watch server or appliance. The sending of a single communication to the Watch server may be performed as an alternative, for example, to sending a message reporting the occurrence of each string or event. Techniques such as these provide for efficient and bounded use of resources within the industrial network 14 resulting in reduced bandwidth and CPU and memory usage consumed by the agents.

In one embodiment, the agent 306 may report the following metrics at periodic intervals:

Login failures—Report the number of "failed login" messages in the system log in the reporting interval. The format of these messages may vary in accordance with software platform, such as operating system and version and login server, such as for example, ssh, telnet, rlogin, and the like. Reported with this metric may be the names of the top three accounts reporting login failures in a reporting interval, and what percentage of the total number of failure reports is associated with each of these three accounts.

Password change failures—Report the number of "failed password change attempt" messages in the system log in the reporting interval. Some of these failures may be the result of an authorized user trying to change his/her own password. This metric may indicate false positives such as these in addition to indicating a brute force password attack by an unauthorized user. Reported with this metric may be the top three accounts reporting failed password attempts in a reporting interval and a corresponding percentage of failed attempts associated with each account.

Network ARPwatch—Using the modified version of ARPwatch described elsewhere herein, this metric reports the number of unapproved IP/device address bindings currently on the network. The ARPwatch metric also reports the first three ARPwatch log messages detected in each reporting interval, and if the metric is non-zero in an interval, reports the top three IP addresses and device addresses responsible for those messages.

Host IDS audit violations—Report the total number of IDS and failure audit messages detected in the reporting interval.

When the IDS classifies the messages, report a count for each classification—eg: critical, warning. When multiple audit systems are running on a machine, report each system's output independently. For example, on SELinux systems, the SELinux system reports authorization failures for all failed accesses to protected resources. Such authorization failures are reported as a separate SELinux authorization failure metric. Additionally, report the first three log messages detected in each classification in each reporting interval and a count of the messages not reported. This metric may be extended to report a summary of all the messages detected for each kind of message in the reporting interval as well, including, where process information is available, the top three processes responsible for the messages and the percentage of total messages associated with each process and/or, where file information is available, the top three files that are reported as the targets of audited file manipulations, and what percentage of all the IDS messages each file was mentioned in.

Host IDS antivirus alerts—for host IDS systems that monitor and report on viruses detected on control system hardware. Note that while some computers in the industrial network may not execute antivirus software for performance, compatibility, or other reasons, other computers within the industrial network may utilize antivirus software. An embodiment of this agent may also report the first three such messages detected in a reporting interval.

The agent 306 may also include metrics related to the following:

Web page authentication failures, web page permission violations, total web page failures, firewall violations (described herein in more detail), and tape backup failures. This last metric may be useful in connection with notifying administrators, for example, in the event that security history or other information is no longer being backed up on a tape or other backup device.

Windows event logs—Report the number of Windows "Error," "Warning," "Informational," "Success Audit," and "Failure Audit," log entries detected in the reporting interval. The agent also reports the first 256 characters of text for the first three such log entries discovered for every type of log in every reporting interval.

The hardware and operating system agent 308 may be used in connection with gathering and reporting information in connection with the operating system and hardware. For example, through execution of a status commands or others that may be available in an embodiment, information may be produced using one or more operating system utilities or calls. As an output of the command, data may be produced which is parsed by the hardware operating system agent 308 for the particular statistics or metrics of interest. In one embodiment the hardware operating system agent 308 may use one or more status commands, for example, to obtain information about CPU load, disk space, memory usage, uptime, when the last reboot has occurred, hardware and software information such as related to version numbers, and the like. Similar to the behavior of other agents, the hardware operating system agent 308 may parse the output of different status commands and send a single report to the Watch server at different points in time rather than report multiple messages to the Watch server. For example, the agent 308 may combine information from multiple status commands and send a single communication to the Watch server or appliance 50 at particular time periods or in accordance with particular events.

In one embodiment, the following metrics may be reported by agent 308 at periodic intervals:

Counts of interprocess communications resources used—System V message counts and segment counts for any message queues used by the control system. If the system is becoming congested such as, for example, messages requests are backing up because the system does not have the resources to process them fast enough, or because of a failure of some component of the system that is supposed to be processing them, an alarm may be raised when any message queue's message or segment count exceeds a preset limit.

Operating System type—This is a constant value reported to assist in auto-configuration of the Watch server. For example, when an administrator is searching for a particular machine when using the GUI on the Watch server, that person may become confused by the many machines whose information is available via the GUI. Operating system type, version number, and the like, may be used in identifying a particular machine through the GUI.

"Uptime"—How long it has been since the machine running the agent 308 has been rebooted. This is sometimes useful in post-mortem analysis. For example, a number of anomalous alerts are generated by the Watch server in connection with resource and system performance metrics. It may also be observed that a particular computer in the industrial network was also being rebooted during this time period. It may be determined that the abnormal resource usage, for example, was due to the machine reboot or restart activity which may differ from the usage when the computer is in steady state. Thus, it may be useful to determine why the machine rebooted and restarted rather than investigating the individually raised resource-generated alerts.

User count and root user count—How many login sessions are active on the machine, and how many of those belong to "root" or other account with an elevated level of permissions. Each metric reports not just the count of logins, but for the first N logins, such as 20 for example, report where the user is logged in from, such as the machine's console, or the IP address, or host name of some other machine the user is logged in from. In one embodiment, the foregoing metrics may be determined on a Unix-based system. Other systems may provide similar ways to obtain the same or equivalent information. Note that below as known to those of ordinary skill in the art, "tty" is a UNIX-specific reference to a UNIX device that manages RS232 terminal connections:

1) Determine who is logged into the system. In one embodiment, this may be determined by examining the output of the "who" command. (i.e., On HP-UX, "who –uR". On Tru64 use "who –M").

2) From the output of 1), extract the user name, the source machine if any, and the "tty" or other login user identifier.

3) Determine which user(s) are currently using system resources. This may be determined, for example, using the Unix-based "ps" command.

4) Since "Who" command output may be sometimes stale, the number of current users may be determined in a Unix-based system by remove from the "who" list (from 1) any user whose identifier is not associated with any active process identified in 3).

5) When reporting root user counts, an embodiment may also search the /etc/passwd file for each user "who" reports. Any user with a numeric user ID of 0 is in fact running as root and is reported as such. Since a single user logged in on the console may have many terminal windows open and "who" reports each as a separate login, it may be desirable to report the foregoing as a single user.

6) All of the login sessions whose source "who" reported as ":0" as associated with the console display device, may be combined into a single entry.

7) Count and report all root users whose "source" is reported by the "who" command as a machine other than the local machine.

8) Examine the "tty" of all potential root users. Increment the root count for, and record the source for, every unique standard input device:
"ptyN"—a pseudo tty used by X11 windows
"ttyN"—a Linux pseudo console created using the keystroke combination: <Ctrl><Alt><Fn>
serial port logins—"ttySN" on Linux or "ttyN" on HP-UX, Solaris and Tru64,
"console" for console device logins and ":0" as well for console logins on Tru64.

9) Determine the owner of any of the standard window manager processes that might be running on the machine. If a root console login has not already been identified, and any of these processes is running as root, that counts as a root console login.

(10) Determine and count the number of rsh (remote shell) users. Use the Unix "ps" command to identify remote shell daemon processes (eg: remshd) and their child processes. Count and report as users the user identifiers associated with all such child processes.

CPU Load—On a Windows-based system, report the % CPU used in the reporting interval. On UNIX systems, report the CPU load average for the interval. The load average is the average number of processes competing for the CPU. Note that on a Windows system, if some process is spinning in a tight loop, the machine reports 100% CPU usage. This metric may be characterized as a rather blunt reporting instrument since it gives no idea of how much "other" work the machine is accomplishing over and above the process that is currently looping. On a UNIX system in a similar state, a report may indicate, for example, a load average of 1.5. The process in a loop accounts for 1 load unit (it was always wanting the CPU). The additional 0.5 indicates that over and above the executing process, ½ of the time some other process wanted the CPU for execution purposes: Additionally, the top three process names consuming CPU in a reporting interval may be reported along with what portion (such as a fraction or percentage) of the CPU used in the interval was used by each of these top three processes.

% Disk space—for every disk partition or volume, report the % used for each. It should be noted that RTAP may be configured to alert when the percentage of this metric is not in accordance with an absolute threshold.

% Swap space—Report the % used for swap space. An alert may be generated when that metric increases to an absolute threshold. Additionally, in each reporting interval, the top three processes using memory and/or swap space may be reported and what % of the available resource each of these processes consumes.

% Memory Used—Report the fraction of physical memory used. It should be noted that some operating systems report swap and memory as one metric and so the % swap space metric may be the metric reported. In that case % swap space combines memory used and swap used into one total and reports the fraction of that total in use.

Hardware (such as LM) Sensors and Disk Status (such as SMART)—Report metrics from sensors on different computer components, such as the CPU. The values reported on different platforms may differ in accordance with the different hardware and/or software and/or monitoring circuits. Examples of the metrics that may be reported by one or more sensors may include CPU temperature, case temperature, fan speed for any of several fans, power supply working/failed status in machines with multiple power supplies, soft hard disk failures, etc. These sensors can provide early warning of impending hardware failure of critical industrial control computer components. Note that "SMART" refers to the Self Monitoring Analysis and Reporting Technology as described, for example, at http://smartmontools.sourceforge.net. "LM" refers to, for example, "LM-78" and "LM-75" hardware monitoring functionality that is standard in some vendor chipsets and is described, for example, at http://secure.netroedge.com/~lm78.

Network Traffic—Report total incoming and total outgoing traffic for every network interface on the computer. An abnormal increase in such traffic can mean either that the machine is under attack, that the machine has been compromised and is being used to attack another machine, that the machine has been compromised and is being used for some purpose other than it was intended for, or that there has been some sort of malfunction of the control system on the machine.

Open listen sockets—Reports a count of open listen sockets on the computer. Listen sockets are almost always associated with long-running server processes, and the count of such processes and sockets almost always changes very predictably on control system computers. For example, the count of such sockets may fall within a very small range having little variance. When the count moves out of this range, an alert may be generated. When the listen socket count falls out of the bottom of the range, it may be an indication that some server component of the operating system or of the control system itself has failed, causing the associated listen socket to close. When the listen socket count rises out of the top of the normal range, it may indicate that some server component has been added to the system. This may be, for example, a new control system component, a debugging or other tool that it may or may not be wise to deploy on a production control system, or a component installed by an intruder or authorized user seeking to gain unauthorized access to the system in the future.

The password age agent 310 may be used in monitoring the status of different passwords and accounts. Such activity may include password aging. The particular metrics that may be gathered by the agent 310 may relate to the security of the computer system being monitored as a security measure to detect hackers trying to log in to the system.

In connection with one embodiment, the agent 310 may report the following at periodic intervals:

Max password age—Once an hour, a maximum password age metric may be reported that measures the age of every password on every account on the system. Included in this reported metric may be the age of the oldest password on the system, and, for each of the first 100 users on the system, the user name and age of that user's password. This metric may be useful when raising alerts when passwords become too old. Some sites have a policy of changing passwords regularly, eg: at minimum every 180 days. Because user names and password ages can serve to help identify vulnerable accounts on a computer system, these information may be separately encrypted when the primary communication channel for the agent report is not already encrypted.

The application specific agent 312 may be customized, for example, to monitor specific application parameters that may vary with a particular embodiment and/or application executing in the industrial network 14. Generally the application specific agent 312 is an agent that may be built and specified by a particular operator of the industrial network.

In one embodiment, the agent 312 may report information about the particular application at periodic intervals including any of the following metrics:

Abnormal process terminations—A count of control system processes that have terminated unexpectedly or with an improper exit/termination status. The names of a number of such processes which failed in the reporting period may also be reported. These names occupy a fixed maximum size/communications budget, and mean that the next level of detail is available in the Web GUI. It should be noted that this metric may include reporting information regarding the first processes in time to terminate unexpectedly rather than the last processes in time to terminate unexpectedly since the last processes may have terminated as a result of the earliest failed processes. For example, a later terminated process (unexpectedly terminated) may have terminated execution as a result of being unable to communicate with an earlier terminated process (unexpectedly terminated). Also included with this metric when non-zero are the names or other identifiers of the processes that failed most frequently, and what percentage of the total number of failures is associated with each.

Installed software—Reports a count of software packages installed, uninstalled and/or updated in the last reporting period. This information comes from whatever sources are available on the computer such as, for example, one or more log files that are appended to when software is installed, uninstalled or updated, and one or more system databases of installed software that are updated when software is installed, uninstalled or updated.

Another type of application specific agent 312 may be a control system software agent with knowledge of the expected behavior of a specific control system such as, for example, a Foxboro IA system, a Wonderware InSQL server, or a Verano RTAP server (such as the RTAP component 312), and the like. Such agents may report some metrics already described herein such as:

Installed software—When the control system software itself has new components installed, or installed components updated or removed.

Process terminations—either terminations reported as abnormal by the control system software application itself, or processes no longer active that the agent "knows" should be active because a correctly functioning Foxboro or RTAP or other system should have such processes active to run correctly.

Open listen sockets—The number of open listen sockets. An embodiment may report and monitor the number of open listen sockets that are managed by the control system and are expected to be open for the correct operation of the control system. Note that the number of open listen sockets refers to an embodiment that may use, for example, UDP or TCP. This metric may be more generally characterized as the number of communication endpoints or communication channels open on a server machine upon which the server is listening for client requests.

Control system shutdown—Reports all controlled and uncontrolled shutdowns of the control systems application. In the case of an unexpected shutdown of the entire computer running the control system, where there may not have been an opportunity to report the shutdown before the computer itself shuts down, the shutdown may be reported when the computer and the agent restart.

An embodiment may also include other types of agents not illustrated in 300. Some of these may be optionally included in accordance with the amount of resources available as well as the particular task being performed by a system being monitored. For example, an embodiment may also include a type of agent of the first class reporting on file system integrity characteristics, such as changes in file checksum values, permissions, types, and the like. Execution of such an agent may be too CPU and/or disk I/O intensive to scan entire filesystems, or to determine checksums for large number of files in a system, so this agent may be selectively included in particular embodiments. The file system integrity agent may report the following metric at periodic intervals:

Integrity failures—For IDS that monitor and report on file integrity, report the total number of integrity failure messages detected in the reporting interval. For systems that report different kinds of, or priorities of, integrity failures, an embodiment may report the total integrity failures in each classification. For each classification of failure, also report the first three integrity failure log messages or events detected in the reporting interval and a count of the remaining messages not reported. Integrity failures may be discovered by the agent itself, or the agent may monitor the results of conventional integrity checking tools such as Tripwire or may invoke installation integrity checking tools such as fverify. For more information on Tripwire, see http://www.tripwire.org. For more information on fverify, see: http://h30097.www3.hp.com/docs/base doc/DOCUMENTA-TION/V51 HTML/MAN/INDEXES/IN DEX_F.HTM In addition, to provide a degree of filesystem integrity checking on a resource-constrained computer system, an embodiment may pace filesystem integrity checking such that only a small number of files are checked in a given reporting interval to reduce and/or limit the CPU and disk I/O impact of such checking. Such an embodiment may, for example, also classify files into two or more levels of importance, and may scan some number of files from each level of importance in each reporting interval. This way, when the lowest level of importance has many more files in it than the highest level of importance, more important files will tend to be checked more frequently than less important files, while still controlling the resource impact of the scanning.

It should be noted that the particular metrics reported by each agent as well as other particular agent characteristics, such as periodic reporting intervals, may vary with each embodiment. Although the description of the various metrics herein may be made with reference to elements particular to this embodiment, such as a the UNIX-based operating systems, it will be appreciated by one of ordinary skill in the art that equivalents may be used in connection with other elements, such as other operating systems that may be used in an embodiment.

It should be noted that an embodiment may issue an alert using RTAP when any one of more of the metrics, reported as a count or value rather than a boolean, described herein is not in accordance with an absolute threshold.

Data flows from each of the different types of agents of the first class 132a-132d on computer systems in the industrial network to the Watch server 50. In this embodiment, the Watch server may be characterized as an appliance that is a passive listening device where data flow is into the appliance. Within the Watch server, a process may be executed which expects a periodic report from the agents 132a-132d as well as a report from the agents 132a-132d when a particular event occurs. If there is no report from a particular agent 132a-132d within a predefined time period, the Watch appliance may detect this and consider the agent on a particular system as down or unavailable. When a particular system, or the particular agent(s) thereon, in the industrial network 14 are detected or determined to be unavailable or offline, as may be determined by the RTAP 212 of FIG. 4, an alarm or alert may be raised. Raising an alarm or alert may cause output to be displayed, for example, on a console of a notification device.

Collectively the different types of agents provide for gathering data that relates to the health, performance, and security of an industrial network. This information is reported to the Watch appliance or server 50 that uses the health, performance and security data in connection with security threat monitoring, detection, and determination.

Each of the agents may open up its own communication connection, such as a socket, to send data to the Watch server. An embodiment may alternatively use a different design and interaction of the different types of agents than as illustrated in 300. In one embodiment using the example 300, each agent may be implemented as a separate process. In an alternative embodiment, a single process may be used performing the processing of all the different types of agents illustrated in FIG. 5 and all data may be communicated to the Watch server over a single communication connection maintained by this single process. An embodiment may use another configuration to perform the necessary tasks for data gathering described herein.

It should be noted that an embodiment may include the master agent with any one or more of the different types of agents for use with a system being monitored. Using the model of FIG. 5, the master agent is necessary to control the operation of one or more of the other types of the first class.

Figure 6:
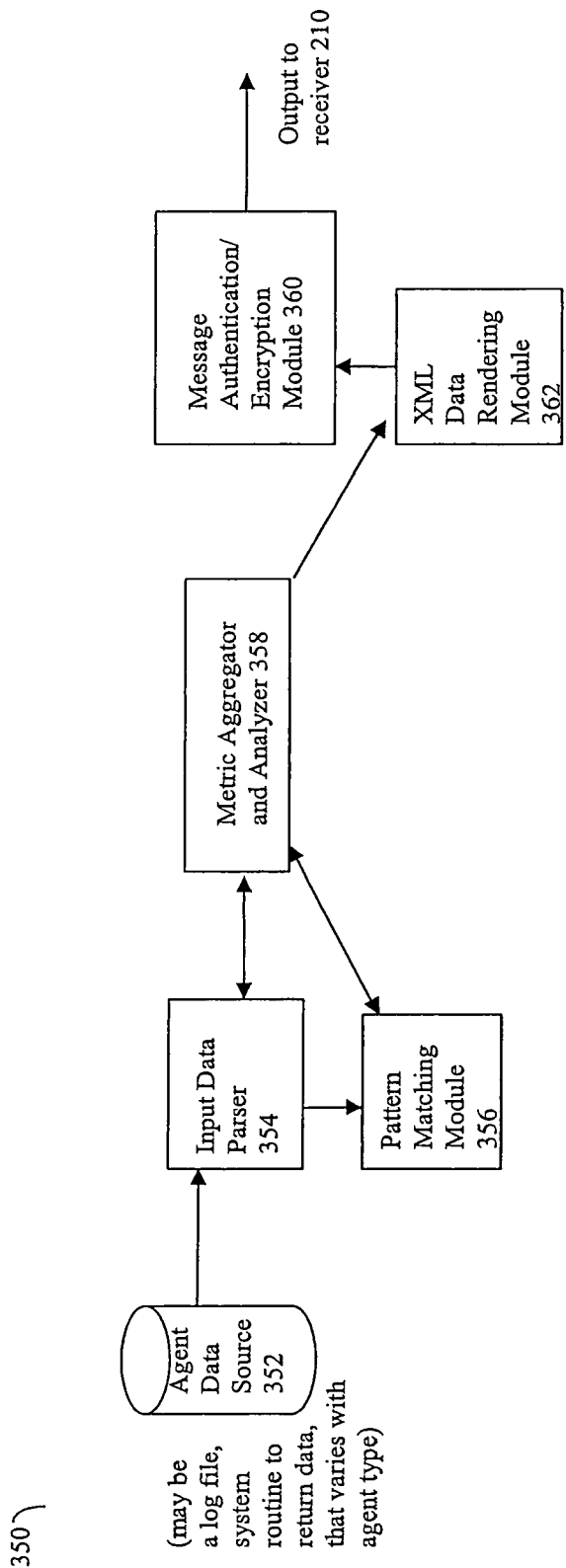
FIG. 6 is an example of an embodiment of an architecture of each of the agents from FIG. 5.

Referring now to FIG. 6, shown is an example 350 of the architecture of each of the agents of the first and second classes described herein. It should be noted that the architecture 350 may vary in a particular embodiment or with a particular class of agent. The particular illustration of FIG. 6 is only an example and should not be construed as a limitation of the techniques described herein.

An agent data source 352 is input to an input data parser 354. The particular data source 352 may vary in accordance with the particular type of agent. For example, in the event that the agent is a log file agent, the agent data source may be a system log file. In the event that the agent is the hardware operating system agent, the agent data source may be the output of one or more status commands. The one or more data sources 352 are input to the data parser 354 for parsing. The particular tokens which are parsed by 354 may be passed to the pattern matching module 356 or the metric aggregator and analyzer 358. It should be noted that there are times when the parsed data may be included in a message and does not require use of pattern matching. The pattern matching module 356 searches the data stream produced by 354 for those one or more strings or items of interest. The pattern matching module 356 may report any matches to the metric aggregator and analyzer 358. The component 358 keeps track of summary of the different strings as well as counts of each particular string that have occurred over a time period as well as performs processing in connection with immediate notification. As described elsewhere herein, an agent may report data to the Watch server 50 at periodic reporting intervals. Additionally, the agent may also report certain events upon immediate detection by the agent. This is described elsewhere herein in more detail. The metric aggregator and analyzer 358 also controls the flow of data between the different components and is also responsible for compressing the messages to minimize the bandwidth function.

Once the metric aggregator and analyzer 358 has determined that a message is to be reported to the Watch server 50, such as for immediate reporting or periodic reporting of aggregated data over a predetermined time period, the metric aggregator and analyzer 358 may send data to the XML data rendering module 362 to form the message. The XML data rendering module 362 puts the information to be sent to the Watch server 50 in the form of an XML message in this particular embodiment. Subsequently, component 362 communicates this XML message to the message authentication and encryption module 360 for encryption prior to sending the XML message to the Watch server or appliance.

In connection with the message authentication and encryption module 360 of FIG. 6, it should be noted that any one of a variety of different types of encryption techniques may be used. In one embodiment, a timestamp and agent host name or identifier may be included in a message body or text. The authentication processing on the Watch server 50, such as may be performed by the receiver 210, may require that the timestamp values always increase and otherwise reject duplicate or out of date messages. Additionally, an encryption technique may be used which utilizes a key, such as a shared secret key, and the entire message may be encrypted with this key. The shared secret key provides the message authentication information. An embodiment may also use other well-known techniques such as, for example, the MD5 cryptographic checksum and encrypt the checksum of the entire message. The authentication processing performed within the Watch server 50 may vary in accordance with the techniques used by the agents. In one embodiment, an agent may encrypt the checksum of the message and not the message itself. Alternatively, in an embodiment in which a checksum determination of a message is not available, the agent may encrypt the message.

The different types of data reported by the types of first class of agents illustrated in FIG. 5 relate to the health, performance, and security of a critical network, such as the industrial network 14. This data as reported to the Watch server 50 enables the Watch server 50 to generate signals or alerts in accordance with the health, performance, and security of the critical network. In particular, the RTAP 212 of the Watch server may be characterized as a global aggregator and monitor of the different types of data reported to a central point, the Watch server 50.

The agents 132a-132d (of the first class described elsewhere herein) as well as the second class of agents that communicate data to the Watch server 50 may be characterized as distributed monitoring agents. In one embodiment, these agents may raise alerts or send reports to the Watch server in summary format in accordance with predefined time periods, or in accordance with the detection of certain events in order to conserve the bandwidth within the industrial network 14. In existing systems, agents may report every occurrence of a particular event, such as a suspicious activity, and may result in the consumption of excessive bandwidth when a system is under attack. An agent, such as one of the first class executing in the industrial network 14, may report attack summaries at fixed intervals to conserve network resources. For example, an agent 132a-132d may report the occurrence of a first suspicious event and then report a summary at the end of a reporting period. In other words, reports may be sent from an agent at predetermined time intervals. Additionally, the agents may send messages upon the detection or occurrence of certain conditions or events.

The agents (first class and second class when communicating with the receiver 210) included in an embodiment may be designed in accordance with particular criteria. As described in connection with the above embodiment, the agents are "one-way" communication agents at the application level for increased security so that operation of an agent, such as on a component in the industrial network 14, minimizes added vulnerability to a network attack. The agents communicate with the Watch server by opening a TCP connection, sending an XML document over the connection, and closing the connection after the XML communication is sent. The agents do not read commands or requests for information from this connection from the Watch server.

It should be noted that a computer hosting an agent does receive and process messages from the Watch server. However, the processing performed by such a host to an agent are limited to processing steps at lower network levels. For example, in an embodiment using the XML messages described herein, this processing may include the TCP-level connection setup, teardown and data acknowledgement messages performed at levels lower than the application level. Any vulnerabilities existing at these lower levels exist independent of whether the agents described herein are utilized. In other words, use of the agents described herein does not introduce any additional vulnerabilities into monitored and networked control system equipment.

The agents, in particular the first class of agents described herein, may be characterized as bandwidth limited agents designed to consume a fixed portion of available network resources. Conventional security agents tend to report every anomalous event upon the occurrence of the event consuming potentially unbounded communication resources under denial-of-service attacks. Conventional agents may regard every security event as important and make a best-effort attempt to communicate every such event to their management console. Agents that consume an excessive amount of a limited network communications resource risk causing the entire system to malfunction, triggering safety relays and other mechanisms to initiate an emergency shutdown of the industrial process.

In contrast, the agents described herein are designed to transmit small fixed-size messages at fixed intervals, thus consuming a bounded portion of available communications resources, even under denial-of-service attack conditions. The first class of agents herein gather information, produce condition reports and event summaries, and report those conditions and summaries at fixed intervals. The reports may include: statistics in accordance with the particular first class agent type, such as, for example, resource usage statistics like % CPU used, CPU load factors, % memory used, % file system used, I/O bus utilization, network bandwidth utilization, number of logged in users, and the like. The report may also identify the top N, such as, for example, two or three, consumers of one or more resources. The consumers may be identified by, for example, process names, directories, source IP addresses, and the like, and may identify, when appropriate, what portion of a resource each is consuming. The report may also include other information that may vary with agent type and class such as, for example, counts of log messages and other events, like login failures, network intrusion attempts, firewall violations, and the like detected in the reporting interval that match some criterion or search expression; representative samples of the complete event description or log message for the events counted in the reporting interval, and a short statistical summary of the events, such as what host or IP address hosted the most attacks and what percentage of attacks overall were hosted by a particular computer, which host was most attacked and what percentage of attacks were targeted at a particular host, what user account was most used in connection with launching an attack and what portion of attacks are targeted at a particular user account. In one embodiment, a reporting threshold for an agent may be specified indicating a maximum amount of data the agent is allowed to transmit during one of the reporting intervals. The reporting threshold may specify, for example, a number of bytes that is equal to or greater than a size of a summary report sent at the reporting interval. For a given reporting interval or period, an agent's reporting budget may be the reporting threshold. The agent may also report one or more other messages as needed besides the summary in accordance with the specified reporting threshold. Prior to sending a report, the agent makes a determination as to whether it is allowed to send a next report by determining if the total amount of data reported by an agent would exceed the reporting threshold by sending the next report. If the threshold is exceeded, the agent does not send the report.

The agents described herein, in particular the first class of agents, are also designed to limit the amount of processing time and storage (disk and memory) consumed. Conventional intrusion detection and performance monitoring agents are known for the negative performance and storage impact on the system being monitored. SNMP components, for example, have been known to consume all of the memory on a host of the SNMP component. AntiVirus scanners may impair the performance of the machines they are monitoring by up to 30-40% depending on the particular processor. The foregoing may not be acceptable in connection with legacy systems, such as may be encountered in industrial networks. Industrial control applications respond to inputs from the industrial process within very short time windows due their real-time processing nature. Furthermore, such systems render information about the process to operators in a timely manner. Anti-virus solutions, for example, may not generally be deployed on control system hardware, such as in the industrial network 14 described herein, because the anti-virus processing may impair the operation of a system sometimes causing system failure. The agents described herein are designed to minimize the resource impact on the system being monitored. Expensive metrics, like filesystem checksums, are gathered over a very long period of time, or for only the most security-critical components so that the impact of the data gathering on the system being monitored is within a small fixed budget. For example, in one embodiment, 1-3% of all of a machine's resources can be allotted to the monitoring agents executing thereon.

An embodiment of RTAP 212 may use an event reporting technique referred to as the exponentially decreasing attack reporting. In some embodiments, when a metric goes into an alert state and a user has requested notification of the alert, an e-mail or other notification message is sent indicating that a particular metric has gone into alert state. If the "current value" of the metric, for example, returns to the "normal" range, a notification message may also be sent regarding this transition. The foregoing may cause a large burst of notification messages to be sent to an administrator and important information may be overlooked due to the volume of notification messages received in a short time interval. For example, in the event that the alert or alarm condition exists for some time period, an initial set of notification messages may be sent when an attacker succeeds in compromising one machine. Reported by agents on that machine in the industrial network may be high memory and network usage as a consequence of being compromised and an illicit web server started. When usage levels return to normal, another set of notification messages may be sent. However, suppose that the memory and network alert conditions do not return to normal. The foregoing conditions may be overlooked in the burst of notification messages. An administrator with access to a web browser could log into the Watch web user interface and see that metrics on a particular host were still in an alert state, but email notification may also be used by administrators who do not have such access. Accordingly, an embodiment may use the "exponentially decreasing notifications" technique which reports the initial alert. Instead of staying silent until the next alert state change, additional alert notices are sent while the metric stays in an alert state. The frequency with which these additional alert notices are sent may vary in accordance with the length of time an alarm condition or state persists. In an embodiment, this frequency may decrease exponentially, or approximately exponentially. In one embodiment, the following alert or alarm notification messages may be sent upon the first detection of an alarm or alert condition, and at the end of a first defined reporting interval. At this point, there may be additional summary information that may be optionally sent to the user with the notification message. This is described in more detail herein using the enhanced email notification described elsewhere herein. Subsequently, a notification message is sent at increasing intervals while the condition persists. These time intervals may be user specified as well as defined using one or more default values that may vary with an embodiment. For example, in one embodiment, an initial reporting interval of an alarm condition may be every minute. After the end of the first reporting interval or minute, notification messages may sent at time intervals so that a current reporting interval is approximately 10 times longer than the previous reporting time interval. In this example, if the first notification message is sent after 1 minute, the second notification message may be sent after 10 minutes and include any additional information such as may be available using the enhanced e-mail reporting described elsewhere herein. The third notification message may be sent at about 1½ hours later, and so on. The reporting interval may reach a maximum of, for example, 12 hours so that if an alarm or alert state persists, notification messages with enhanced reporting (such as enhanced e-mail) may be sent every 12 hours until the alert condition clears, or the user otherwise removes themselves from the notification list.

Using the foregoing notification reporting technique, persistent alert conditions that may otherwise be lost in a burst of notification messages may remind the administrator that there is a persistent problem condition, and provide the administrator with current summary information so that the administrator can see if the nature of the attack or compromise is changing over time. Using this type of exponentially decreasing attack reporting techniques, the bandwidth of the network may be more wisely utilized for the duration of the attack as well. The foregoing exponentially decreasing notification reporting may be performed by the notification server 216 of FIG. 4. The alarm or alert conditions may be produced using the calculation as described elsewhere herein causing the notification server to be notified. However, the foregoing may be performed by the notification server to reduce the number of times that a notification message is sent.

Additionally, an embodiment may use different techniques in connection with when agents report to the Watch server 50. One design concern, as described elsewhere herein, is minimizing the amount of network bandwidth used for reporting due to the possible bandwidth limitation of the industrial network. In one embodiment, for one or more designated metrics in a defined reporting interval, the log agent 306 may report the first detection of a log message that causes the metric to increment as soon as the log message is detected. Subsequently, the agent does not report any additional information to the Watch server about the metric until the end of the reporting interval, when the agent 306 then reports the total count for the metric in the reporting interval. Using the foregoing, immediate notification may be achieved upon the occurrence of the metric increase and then an update received at the next reporting interval. The foregoing immediate notification may be used with metrics determined using log files. An embodiment may also use other agent types to report other metrics that may be readily determined on an event basis such as, for example, a line being added to a log file, a file descriptor becoming readable, or a command executing.

An embodiment may use a combination of the foregoing immediate notification and periodic interval reporting. In an embodiment using just the periodic interval reporting by the agents to the Watch server 50, there may be an unacceptable delay in reporting alarm conditions indicating an attack or attempted attack. For example, consider an agent's reporting interval of 60 seconds. One second into that interval, the agent viewed a failed login attempt indicated by a metric and then another 10,000 such attempts in the minute. A single report is sent at the end of the minute reporting interval to the Watch server with a report metric indicating the 10,001 attempts. However, there is a delay and an administrator may expect to receive a notification of the event prior to 10,000 being detected. Using the immediate notification, the agent also reports the first occurrence of the failed login attempt when it is detected. Accordingly, the Watch server 50 may respond with an immediate notification message with the first occurrence or detection of the metric increase.

It should be noted that the foregoing immediate notification may be performed in accordance with user selected and/or default specified conditions. This may vary with each embodiment. In one embodiment, the metric aggregator and analyzer 358 may perform processing steps in connection with the immediate reporting and also periodic interval reporting to the Watch server 50.

Figure 7:
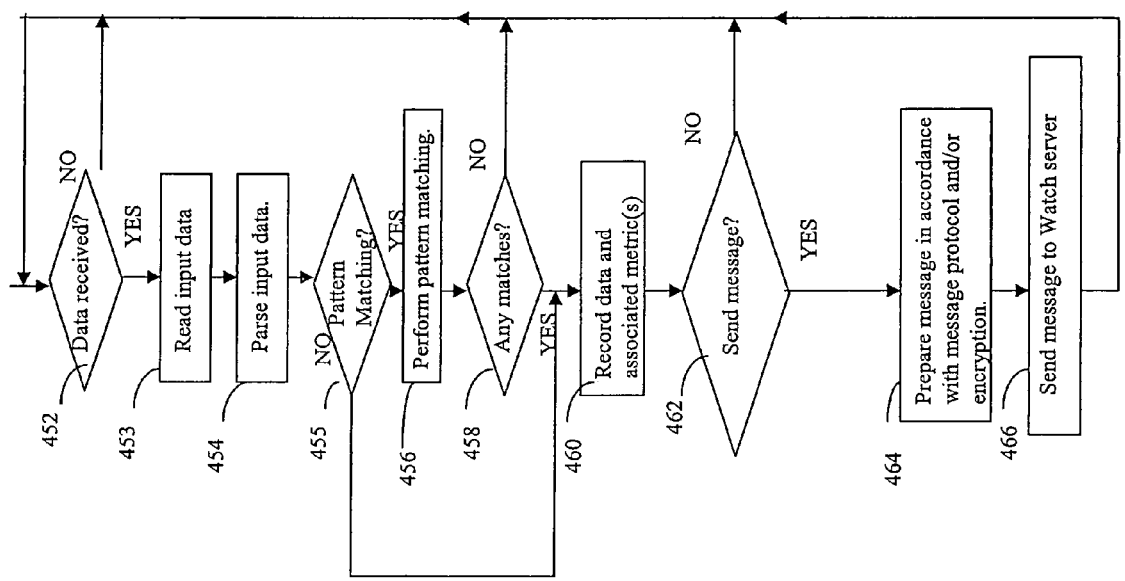
FIG. 7 is a flowchart of steps of one embodiment for control flow within an agent.

Referring now to FIG. 7, shown is a flowchart 450 of processing steps describing the control flow previously described in connection with 350 of FIG. 6. Generally, the processing steps of 450 may be performed in an embodiment by each of the agents of the first and second classes when processing the one or more input data sources. At step 452, a determination is made as to whether input data has been received by the agent. If not, control continues to wait at step 452 until input data has been received. It should be noted that the input data may be received in accordance with the agent performing a particular task such as executing a command producing input, waiting for input on a communications channel, reading a data file, and the like, in accordance with one or more predefined criteria. The one or more predefined criteria may include performing a particular task at predefined intervals, when a particular data file reaches a certain level of capacity in accordance with a number of operations, and the like. The particular criteria which causes the input data to be received by the agent may vary in accordance with each embodiment. At step 452 once data has been received, control proceeds to step 454 where the input data is read and then parsed at step 454. Once the input data stream has been parsed, control proceeds to step 455 where a determination is made as to whether pattern matching is needed. If not, control proceeds to step 460. It should be noted that pattern matching may not be needed, for example, if no selective filtering of the parsed input source is needed when all metrics from a source are reported. Otherwise, control proceeds to step 456 where pattern matching is performed. At step 458, a determination is made as to whether the input data has any one or more matches in accordance with predefined string values indicating events of interest. If not, no strings of interest are located and control returns to step 452. Otherwise, control proceeds to step 460 where data may be recorded for the one or more metrics derived from the parsed input source. For example, a particular metric and its value may be stored and recorded, for example, in the memory of a computer system upon which the agent is executing. At step 462, a determination is made as to whether any messages reporting data to the Watch server are to be sent. As described herein, an agent may report data at periodic intervals when summary information is reported. An embodiment may also provide for immediate reporting the first time a designated metric increases in value such as may be the case, for example, at the beginning of an attack or an attempted attack. This processing may be performed, for example, by the metric aggregator and analyzer 358. If no message is to be sent to the Watch server 50, control proceeds to step 452 to a obtain additional data. Otherwise, control proceeds to step 464 where the message to be sent to the Watch server is prepared in accordance with a message protocol and/or encryption technique that may be used in an embodiment. As described herein, for example, a message being sent to the Watch server is sent in an XML or other format and an encryption technique described elsewhere herein may also be used. Control then proceeds to step 466 where the message is sent to the Watch server. Control then returns to step 452 to wait for additional input data to be received by the agent.

Figure 8:
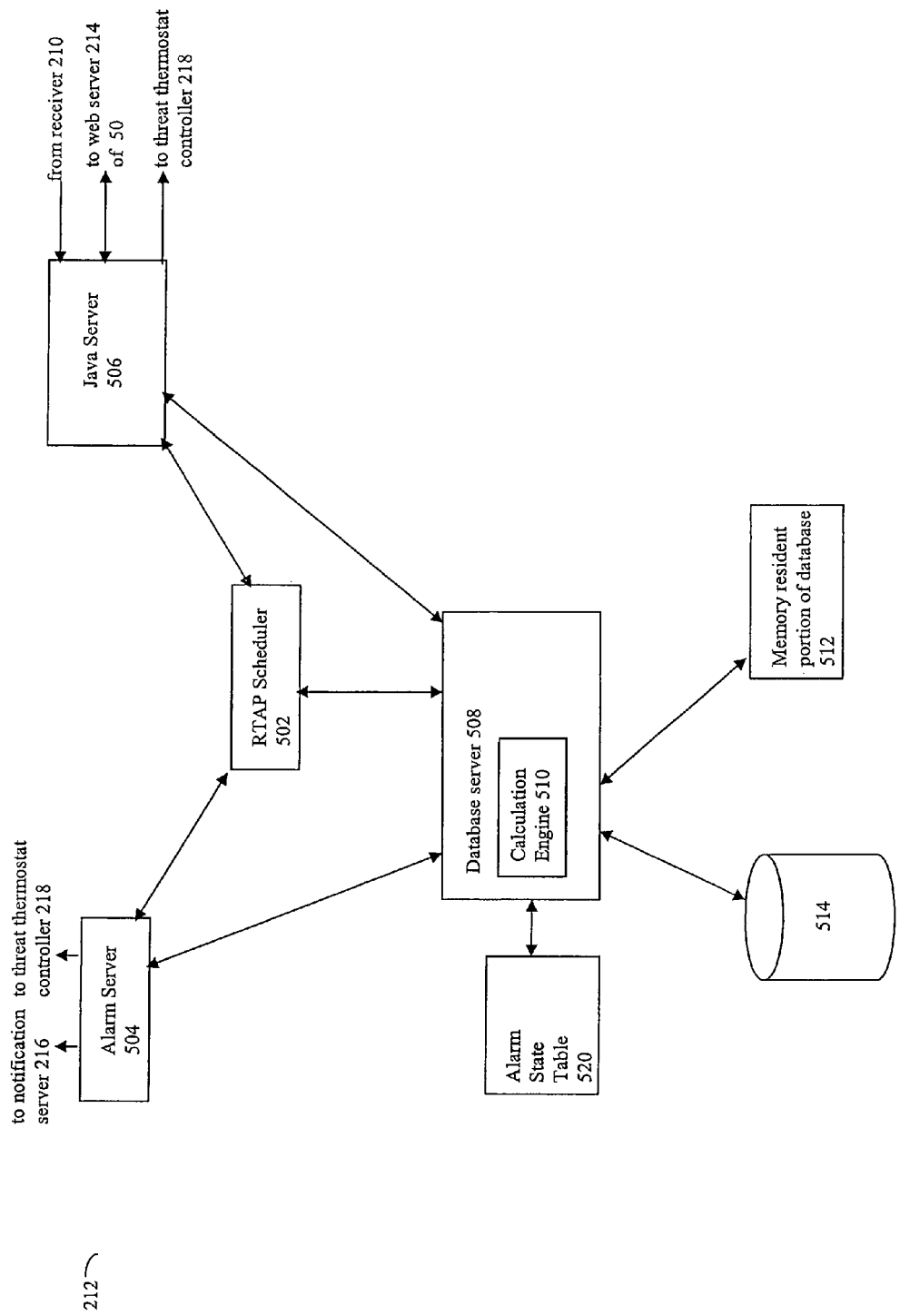
FIG. 8 is an example of an embodiment of the real time database and alarm engine (RTAP) of FIG. 4.

Referring now to FIG. 8, shown is an example of an embodiment 212 of components that may be included in RTAP. It should be noted that a version of RTAP is commercially available from Verano Corporation as described, for example, at the website www.verano.com. Included in FIG. 5 is RTAP scheduler 502, an alarm server 504, a Java server 506, and a database server 508. The database server 508 in this embodiment includes a calculation engine 510. The database server 508 may output data, such as the metrics gathered by the agents described herein, to one or more devices 514 which may be stored, for example, on data storage devices such as disks. Included in this embodiment is a memory resident portion of the database 512 used to store designated portions of the data in memory in order to increase efficiency by reducing the amount of time it takes to retrieve data. An embodiment may therefore designate one or more portions of the database to be stored in a memory resident portion 512.

The RTAP scheduler 502 schedules and coordinates the different processes within the RTAP component 212. The RTAP scheduler may perform various process management tasks such as, for example, ensuring that other processes in 212 are executing, scheduling different processing for execution, and the like. The alarm server 504 may be used in connection with interfacing to one or more other components described elsewhere herein for notification purposes. For example, the alarm server 504 may interface with the notification server 216 and the threat thermostat controller of the Watch server 50. The alarm server 504 may be signaled in the event of a detection of a particular alert or alarm condition by the database server 508 and may accordingly interact with components external to RTAP 212. The Java server 506 may characterized as a bi-directional server communicating with the web server 32 of FIG. 4. The Java server 506 may interface with the web server 32 as needed for notification, message sending, and other communications with RTAP 212. The Java server 506 may also output one or more inputs to the threat thermostat controller 218, and also receive input from the receiver 210 to store data gathered by agents. The database server 508 may be used in connection with storing data either on a data storage device, such as a disk 514, as well as the one or more memory resident portions of the database, as may be included within memory 512. In one embodiment, the memory resident portion 512 may be implemented, for example, as a shared memory segment. The data stored in 512 and/or 514 may be an object-oriented database. Prior to use, objects of the database may be designated for inclusion in the memory resident portion 512.

In one embodiment, write operations of the database are made to the database server using the calculation engine 510. Read operations may be performed by having another RTAP component perform the processing rather than reading the data through the use of the database server 508. The RTAP component, such as the Java server, processing a read request for data first consults the memory resident portion 512 and may obtain the one or more other portions of data from disk storage 514 as needed. All write operations in this embodiment are processed through the database server 508 and the calculation engine 510 is used to determine revised data values having dependencies on a modified data value being written. The database server 508 uses an alarm state table 520 in this embodiment to determine alarm conditions in accordance with modified data values stored in the database. The component 520 may be included in the disk or memory resident portion of the database in an embodiment depending on how the database is configured. The shared memory segments of portion 512 may be stored at various time intervals to disk or other non-volatile storage as a back up. Such a time interval may be, for example, every 30 seconds or another time interval selected in accordance with the particular tolerance for data loss in the event that data included in the memory resident portion of the database 512 is lost, for example, in connection with a power or memory failure. It should be noted that in this embodiment, a synchronization technique between readers and writers to the database may be omitted. Data attributes and/or objects which are being written may be synchronized to prevent reading incomplete values. However, the data that is read may also not include all of the recently data reported. Write operations may be synchronized by the database server 508. Thus, the database within RTAP may operate without the additional overhead of using some synchronization techniques.

Figure 9:
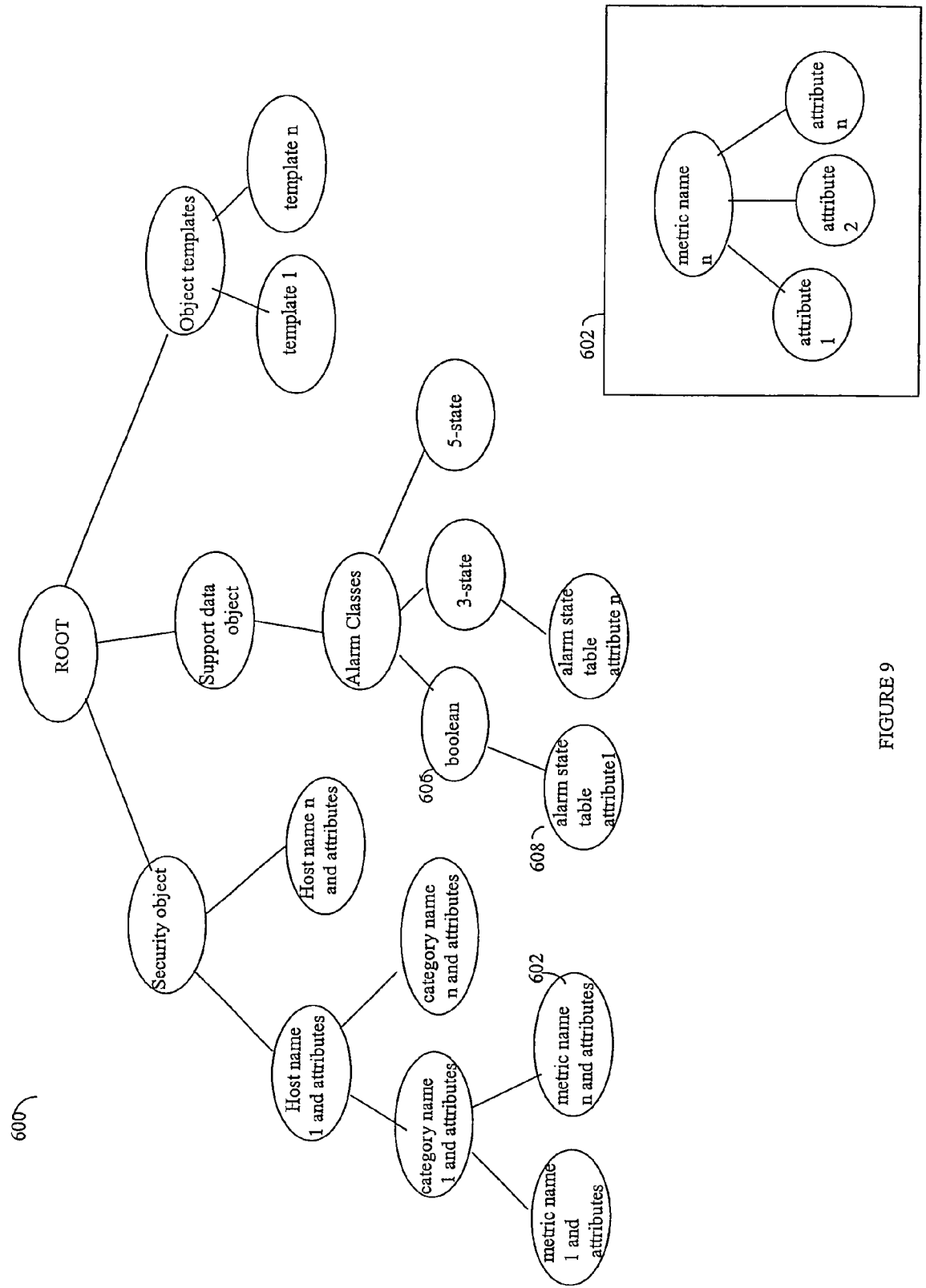
FIG. 9 is an example of a representation of a database schema used by an embodiment of RTAP.

The database objects may be represented using a tree-like structure. Referring now to FIG. 9, shown is an example of an embodiment 600 of one representation of a database tree or schema that may include the objects of the object oriented database of RTAP. In the representation 600, at level 0 is a root of the tree 600. A security object node and an object template node are children of the root located at level 1. The security object is referred to as the parent node with respect to all of the related metrics and other data stored within RTAP. The object templates may include one or more nodes that correspond to the different templates for each of the different object types. For example, in this embodiment there is a metric name object type, a category name object type, and a host name object type. There are child nodes of the object templates node at level 1 for each of these different types. When a new host is added to the system, an object of the type "host name" is created for that particular new host in accordance with the appropriate object template. Each host name object corresponds to one of the hosts or computer systems. Data associated with each particular host or computer system is organized by category name. A category name may refer to a particular category of metrics. For example, one category may be login information having associate metrics such as number of failed password attempts, and the like. Each of the different metrics associated with a particular category is a child node of a category node corresponding to that particular category. Referring back to the category of login data, for example, the failed password attempts may be one metric stored in a metric object which is a child node with respect to the category name object for login information. This 3-level tree of objects is only one possible embodiment of a database of metrics. Other embodiments that may also be implemented by one of ordinary skill in the art may include, for example: conventional relational database representations of metrics, as well as other tree structures for object-tree representations of metrics, such as metric objects as children of host objects without intervening category objects, multiple levels of category objects providing additional metric grouping information, and multiple levels of objects above the level of host objects, providing groupings for hosts, such as functional or geographic host groupings.

In this embodiment, there may be one or more object templates. Similarly, there may one or more different host objects. Associated with a single host object may be one or more category objects. Associated with a single category object may be one or more metric objects. Each of the objects shown in 600 may also have an associated one or more attributes. For sake of simplicity of illustration, all the attribute nodes of each object are not included in the tree 600. As an example, object 602 is shown in more detail in FIG. 9.

In connection with the object names included in the database schema or tree of objects, a particular metric may be referred to by including the name of all of the intervening objects in the path between the root and the particular node of interest.

Included in FIG. 9 is a support data object having one or more child objects which may be used to store information used primarily to configure standard components of the RTAP system. What will now be described are how the alarm state tables used by the calculation engine, as described elsewhere herein, may be stored within the representation 600. In this embodiment, one child node of the support data object is an alarm class object. The children of the alarm class object correspond to the different types of alarm classes. In this example, there are three alarm classes: Boolean or 2-state, 3-state, and 5-state. For each class, such as the Boolean class 606, a child node, such as 608, includes the alarm state table for that class. In this example, the number of states in an alarm class specifies the number of bins or alarm levels. An embodiment may include other alarm classes than as shown herein.

A host object may be created, for example, the first time a new agent reports to the Watch server. A new host may be determined by the receiver 210 of FIG. 4. On first notification of a new agent, an alert or alarm condition is raised. A notification message may be sent. A user or administrator may be presented with a list of one or more new agents and a selection may be made to authorize or reject each new agent. When a new agent is authorized/approved, data from the agent may be processed by the receiver 210. Otherwise, data from an unauthorized/unapproved agent is rejected. Note that the data from the agent is not stored or queued for later processing after approval since this may cause an overflow condition. An agent reports one or more metrics or other data to the receiver 210 which, upon successful authentication of the message, may perform a write operation to the database of RTAP. The RTAP database server 508 then writes the values to the objects and executes or runs the calculation engine in order to propagate all other values dependent on this new value written to the database. For example, a particular metric, such as the number of failed password attempts, may be referenced as a metric attribute. The first metric attribute may be the number of failed password attempts as a raw value. A second metric attribute may be the raw value used in a mathematical representation to calculate a percentage. Accordingly, when a new metric raw value of failed password attempts is written causing an update for the value of the first attribute, the calculation engine is then executed and updates any other values in the database dependent on this new raw value. In this instance, a revised percentage is determined as a revised second attribute value.

In this embodiment, the calculation engine 510 has a built-in alarm function which uses values from the alarm state table 520 to determine if a revised data value triggers an alarm condition. After writing a new data value to the database, the calculation engine determines revised data values as described above in accordance with data dependencies. Once the revised data values have been determined, alarm state table 520 may be consulted to determine if any of the revised values now trigger a new or revised alarm condition. In the event that the calculation engine determines that an alarm condition has been detected, a message is sent from the database server 508 to the alarm server 504 which subsequently sends a message to the one or more notification servers.

In one embodiment, an alarm state vector or alarm instance may be defined for an attribute of a metric object. In determining a value for this attribute, the alarm function described above may be invoked.

Figure 9A:
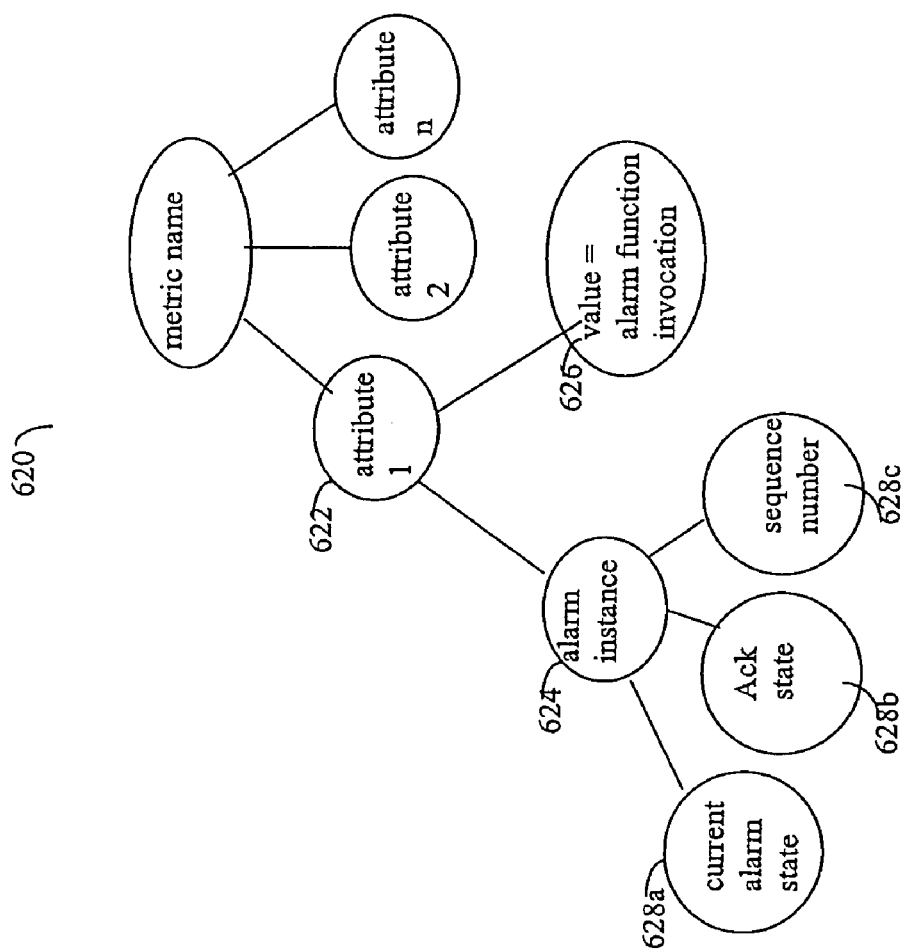
FIG. 9A is an example of representing an alarm function within an attribute with the database schema of FIG. 9.

Referring now to FIG. 9A, shown is an example 620 of more detail of a node in the tree 600 for a metric, using the alarm function. In this example, the attribute 1 622 has an associated alarm instance 624 and an alarm function whose result is assigned as the value of the attribute1 622. The alarm instance 624 includes one or more subvalues 628a-628c that may be used by the alarm function. In this example, the subvalues include a current alarm state 628a, a current acknowledged state (Ack state) 628b, and a sequence number 628c. It should be noted that other information may be included as one or more subvalues than as described herein in this example. Use of these subvalues 628a-628c is described in more detail in following paragraphs. In one embodiment, the subvalues may be included in a vector or other data structure.

In one embodiment, the alarm function may have a defined API of the following format:

Alarm (alarmclass, value, limits, other data . . . )

The limits in the above refer to the alarm limits vector, as described elsewhere herein. The alarm limits vector may include one or more levels associated with the different thresholds. Each level in the alarm limits vector above refers to an alarm level or threshold that may be associated with varying degrees of alarm conditions or severity levels such as, for example, warning, high, and the like. Each of these levels may be stored within another attribute, such as attribute 2 of FIG. 9A and may have a default value as specified in the original template. These values may be changed in an embodiment, for example, through a user specifying or selecting a new threshold level. The alarmclass may be used to specify a particular class of alarm (such as 2-, 3-, or 5-state) in order to determine the proper alarm class from the tree 600 to obtain the corresponding alarm state table for a particular alarm class.

It should be noted that state tables, as may be used in connection with alarm states, are known to those of ordinary skill in the art and may include one or more rows of input. Each row may specify a next state and action(s) based on a current state and given input(s). Using the alarm state table as input, the built in alarm function of the calculation engine may determine, in accordance with the revised data values, whether a predefined level associated with an alarm condition has been exceeded. The predefined levels may be default or user-specified alarm thresholds.

The foregoing is an example of how data gathered by an agent may be processed and stored within an embodiment of the Watch server including RTAP. Other embodiments may use other representations in accordance with the particular metrics and communication protocols used in an embodiment.

The RTAP component 212 may be characterized as described herein in one embodiment as an environment which is a set of cooperating processes that share a common communications infrastructure. In one embodiment, these processes may communicate using SysV UNIX messaging techniques, semaphores, shared messages, and the like. As known to those of ordinary skill in the art, an embodiment using SysV messaging techniques may experience problems due to insufficient memory allocated for message use, such as with RTAP communications. Messages that may be communicated between processes within RTAP, as well as between RTAP and other components, may use a prioritization scheme in which low priority activities involving message sending are suspended when the amount of memory in a message pool falls below a designated threshold. This particular designated threshold may vary in accordance with each particular embodiment. In connection with the techniques described herein, a portion of the memory for message use, such as 80%, may be designated as a maximum threshold for use in connection with requests. In the event that more than 80% of the message memory or pool has been consumed and used in connection with message requests, any new requests are blocked until conditions allow this threshold not to be exceeded. However, message responses are processed. The foregoing may be used to avoid a deadlock condition by blocking, a request in the event that the threshold portion of the message pool is consumed for use in connection with requests. In one embodiment, the foregoing special message management functionality may be included in one or more routines or functions of an API layer used by the different RTAP components when performing any messaging operation or function. These routines in the API layer may then invoke the underlying messaging routines that may be included in the operating system.

An embodiment may utilize what is referred to herein as "latching alerts" where a particular alarm level does not decrease until an acknowledgment of the current alarm state has been received. An acknowledgment may be made, for example, by an operator through a GUI. An embodiment may define an alarm state table 520 such that an alarm or an alert state may be raised or remain the same until an acknowledgement of the alarm or alert state has been received. Until an acknowledgment is received, the alarm state table does not provide for reducing the alarm or alert state. It should be noted that the foregoing latching alerts may be performed in connection with one or more of those metrics associated with an alert or an alarm state. The latching alerts may be used in an embodiment in connection with particular indicators or classes. Other classes of metrics, such as those associated with performance indicators, may not be subject to the latching condition. This may vary in accordance with each embodiment.

Referring now to FIG. 10, shown is an example of an embodiment of the alarm state table 520 that may be used in connection with implementing latching alerts. Included in the state table 520 is a line of information corresponding to a current level or state. Each line of information includes a current level or state, an acknowledgment, and input value or range, a next level or state, and an associated action. In this example 520, a normal level is associated with a level one indicator for a range of input values between 0 and 100, inclusively. An alarm condition is associated with a second level for a range of input values between 101 and 200, inclusively. Finally, a third alarm level is associated with an input range of values from 201 to 300, inclusively. Line 652 indicates that the current level or state of normal level one is maintained as long as the input is between the range of 0 and 100. Line 654 indicates that when the current level is normal (level 1) and a current input value is between the range of 101 to 200, level 2 is the next designated level or alarm condition. The action designates that an alarm condition is generated. In connection with line 652 and 654, it is not relevant whether an acknowledgment has been received because an acknowledgment does not apply in this example in connection with a normal alarm or level condition. Referring to line 656, when the system is in the second level of alarm and the input value drops down to the normal range between 0 and 100, but an acknowledgement of the alarm condition has not yet been received with respect to the level 2 alarm condition, the system remains in the level 2 state of alarm. With reference to line 658, in the event that the system is in the second level of alarm and acknowledgement of this alarm has been received, when the input value or range drops to the normal range between 0 and 100, the level of the current state decreases to level 1 and the alarm condition is cleared. Referring to 660, if the system is in the second level of alarm state and the input value increases to the third level between 201 and 300, an alarm condition is generated to signify this increase in alarm level to level 3. This is performed independent of whether an acknowledgement to the previous alarm state of level 2 has been acknowledged.

It should be noted that the different ranges or values specified in connection with the third column of 520 may be associated with threshold values or ranges. The thresholds may be specified using default values as well as in accordance with one or more user selected values or ranges. It should also be noted that although the table 520 shows specific numeric values for the ranges in the input column, these alarm range thresholds may be parameterized to use the input values (i.e., alarm LEVELs) of the alarm function described elsewhere herein.

Referring now to FIG. 11, shown is an example of another embodiment of an alarm state table 700 and an alarm limits vector 200. The elements of vector 200 identified in the lower left corner may be passed as input parameters when invoking the alarm function described herein specifying the LEVELs or thresholds for the different alarm states as described above. In this example, the table 700 represents a 3-state alarm (normal, warning, and alert) with 2 thresholds (100 and 200) forming three partitions or ranges (0-99, 100-199, 200 and greater). Each row of the table 700 corresponds to a state and includes:

a state identifier for the row in the table 704;
  a named identifier for the state 706;
  a color 708 as may be displayed, for example, by an illuminated light on a display panel or other indicator; and
  an indication as to whether an acknowledgement (ACK) is required for this state 710.

The portion 702 of this example includes the transition functions (beginning with & in this example) used in determining state transitions from one row of the table to another. Other embodiments of 700 may include information other than as described herein. State transitions occur as a result of evaluating transition functions. It should be noted that if a column name contains a space character (such as between RANGE and LEVEL in 712), the transition function name ends at the space character such that the remaining text (LEVEL) following the transition function (RANGE) is a modifier to the function, telling the function how to interpret the values in the column.

The alarm system determines the new state for an alarm by repeatedly evaluating transition functions in the context of the alarm state table for the alarm. The transition functions are evaluated in the order in which they appear from left to right as columns in the state table. Each transition function may take optional input parameters such as, for example, the current alarm state, values from the alarm state table and other optional values as arguments. As an output, the transition function returns a new state in accordance with the input parameters. Each function is evaluated repeatedly, until the new state returned is the same as indicated by the state value in 704 for a particular row, or until a transition that would loop is detected. Evaluation then proceeds to the transition function indicated by the next column moving from left to right.

In this example 700, two functions are illustrated, &ACK and &RANGE as described in more detail in following paragraphs. The &RANGE function takes an alarm limit vector like the one illustrated in FIG. 11, lower left corner 720, as an example, as well as the following and other possible suffixes in column names:

level—The level number corresponding to the current alarm state;
<—What new state to move to when the current value for the metric is in a range of values lower than the range for the current alarm state;
=—What new state to move to when the current value for the metric is in the range of values associated with the current alarm state; and
>—What new state to move to when the current value for the metric is in a range of values higher than the range associated with the current alarm state.

The alarm limit vector 720 in this example contains an integer (2 in this example) as the first vector element indicating what level number to assign to the highest range of values the metric can assume. The highest range of values includes all values greater than or equal to the limit specified as the second vector element, which is 200 in this example. The third vector element specifies another next-lower limit, which is 100 in this example. The fourth vector element specifies the final next-lower limit, which is 0 in this example. The three ranges or partitions of values are specified using the vector elements 2-4 for the following:

Range 0: values less than 100
  Range 1: values from 100 to 199
  Range 2: value 200 or more.

In connection with the foregoing, it should be noted that a fourth range is implied for values less than zero (0). In this example, values in this fourth implied range correspond to an error state and are not further described in connection with this example.

In this example, the &ACK function is a transition function that returns the current state (as indicated by column 704) when the alarm has not yet been acknowledged, otherwise returns the new state as indicated in column 714 when the alarm has been acknowledged.

Referring back to FIG. 9A, the current alarm state 628a and the ack state 628b may be used in determining the current state of the alarm and its corresponding row in the alarm state table. The sequence number 628c may be used in connection with race conditions that may be associated with alarm conditions and acknowledgments thereof. A unique sequence number is associated with each alarm state that caused a notification message to be sent to a user. Each such message contains a copy of that sequence number for the state causing the message to be sent. In one embodiment, a unique sequence number may be generated for each alarm condition associated with a single invocation of the alarm function. The single invocation of the alarm function may result in transitioning from a current input state to an output state, and may also transition through one or more other intermediate states to arrive at the output state. In this embodiment, a unique sequence number is not associated with the one or more intermediate states. Rather, a first unique sequence number is associated with the current input state and a second unique sequence number is associated with the output state. For example, a first alarm condition notification message having a first sequence number may be sent to a user and indicated on a user interface display. A second alarm condition, indicating a greater severity that the first alarm condition and having a second sequence number, may be determined during the same time period in which a user's acknowledgement of only the first alarm condition is received and processed. The user's acknowledgment is processed in accordance with the particular sequence number associated with the alarm condition being acknowledged. In this example, the acknowledgement indicates an acknowledgement of the first alarm condition, but not the second. Without the use of the sequence number, or some other equivalent known to those of ordinary skill in the art, the acknowledgment may also result in acknowledgement of the second alarm condition depending on whether the acknowledgement is processed before or after the second alarm condition is determined.

Figure 12:
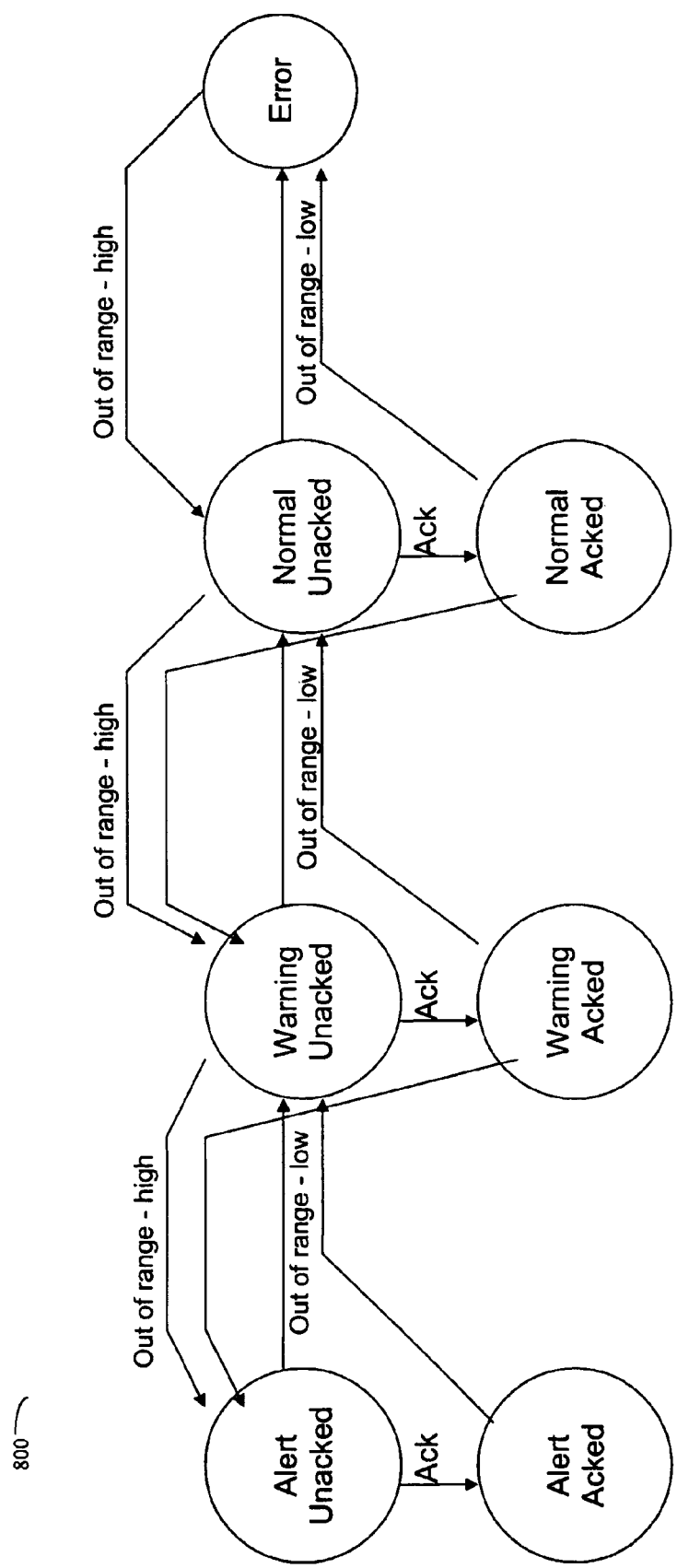
FIG. 12 is an example of a state transition diagram representing the states and transitions in the alarm state table of FIG. 11.

Referring now to FIG. 12, shown is a state transition diagram 800 illustrating the state transitions associated with the functions 702 of alarm state table 700. In the example 800, each state is represented as a node. The arrows between the nodes represent the transitions possible between the different states in accordance with the information in 702 of table 700. Note that the diagram does not indicate transitions causing a same state or a transition to a state A from a same state A.

What will now be described is an example of acknowledging an alarm illustrating the use of the table 700 in determining a new state from a current state. In an example, the alarm function is invoked including parameters indicating that the current state or initial state is Alert Unacked (6) with a metric value of 250. A human user or other agent acknowledges the alarm, causing the alarm state to be re-evaluated. Examining the row of table 700 for state 6, the &ACK function is evaluated with a state (6) as the current state. Since the alarm is now acknowledged, &ACK returns (5) as indicated in the &ACK column of row 6 of the table as the new state. As a result, the new state of the alarm becomes Alert Acked (5). &ACK is re-evaluated for state 5 using row 5 of the table 700. Since the alarm has been acknowledged, the &ACK function returns a 5 as the new state. Since the new state matches the current state, the evaluation of the &ACK function is complete and evaluation proceeds with the next transition function in state 5. The next transition function, is &RANGE. Recall that the metric value for which evaluation is being performed is 250. &RANGE uses the limits vector as described above, and determines that the current metric value of 250 is greater than the first limit of 200 classifying the current metric value as being within the highest range of 2 (greater than 200). The "&RANGE level" column indicates that range (2) corresponds to the current state (5) and so the &RANGE function returns the (5) which is contents of row 5 in the "&RANGE=" column as the new state. Since the new state (5) is identical to the current state (5), evaluation of the &RANGE function is complete. Since the &RANGE function is the last transition function in the state table in this example, the state change is complete and the alarm system proceeds to carry out whatever actions are configured for the new state and any other notifications or other controls that may be associated with the alarm. For example, the alarm color in the example changes from "Red Flashing" to "Red" as indicated by column 708. Column 708 may be characterized as an associated action to be taken when a transition completes after evaluation of all transitions functions. Other embodiments may include other actions.

Similar examples can be constructed to demonstrate that the state table illustrated in FIG. 11 embodies the following behavior for a latched alert or alarm:

When a metric value enters a value range associated with a "higher" or "more serious" alert state than the current state, the current state transitions to that higher alert state, unacknowledged.

If the metric enters a value range associated with a "lower" or "less serious" alert state, and the alarm has not been acknowledged, no state change takes place—the alarm is said to "latch" at the highest alert state represented by the metric while the alarm is unacknowledged.

If the alarm is acknowledged, the state changes to whatever state currently reflects the value of the alarm metric.

The state table in FIG. 11 illustrates an alarm that, if a metric associated with the alarm assumes a value corresponding to a lower alarm state while the alarm is latched at a higher state, and the alarm is acknowledged, the alarm transitions into the lower alarm state with an unacknowledged status. If the alarm is in a high-severity acknowledged state, and the underlying metric changes to reflect a lower-severity state, the alarm also changes to a lower-severity unacknowledged state. Comparable alarm tables can be constructed that preserve the latter behavior of the alarm while altering the former behavior to transition into an acknowledged state, rather than an unacknowledged state. Such transition tables however, may be characterized as more complex than the example described herein and may include additional states than as illustrated in FIG. 11. The table 700 of FIG. 11 models an "analog" or "floating point" metric. Comparable state tables can be constructed for digital metrics, boolean and other kinds of metrics.

It should be noted that an embodiment of the alarm state table may utilize values to implement hysteresis for one or more of the ranges. Hysteresis may be characterized as a behavior in which a metric value may transition from a first state into a second state in accordance with a first threshold value, and transition from the second state to the first state in accordance with a second threshold value that differs from the first threshold value. Such threshold values may be used in connection with a metric that may assume values at different points in time which hover near a boundary or range threshold. The use of the two different thresholds may be used in order to reduce constantly changing states for metric values hovering near a boundary condition. For example, a range threshold may be 100. It may be that the associated metric assumes a series of values: 98, 99, 101, 99, 101, 99, 102, etc. at consecutive points in time. The range threshold may be used to cause a transition from a first state to a second state (from 99-101). However, it may be undesirable to have an alarm state change associated with changes from 101 to 99 especially if the metric value may hover around the boundary of 100. An embodiment may determine that once the first threshold is reached causing a transition from a first range under 100 to a second range of 100 or more, a value of 95 or less is needed to cause a transition from the second back to the first range using 95 as the second threshold value. As will be appreciated by those of ordinary skill in the art, state tables as described herein may be modified to include the foregoing use of multiple thresholds to account for hysteresis conditions.

The foregoing is one example of an embodiment of how data may be managed within the system and how alarm conditions may be determined and generated. Other embodiments may store the data in one or more other types of data storage in accordance with one or more organizations and determine alarm conditions using techniques other than as described herein.

The XML messages or documents sent by the agents to the receiver may include data corresponding to objects and the tree-like structure as illustrated in FIG. 9. The XML document may include data represented as:

| | |
|---|---|
| host name | name of host sending the report |
| category name | name of a group of metrics |
| metric name | name of a metric |
| value | metric value |
| attr1 | other attribute/value |
| ... | |

It should be noted that an embodiment may use other formats, such as an alternative to XML, and protocols than as described herein for communications between agents and other components.

Attributes that may be associated with a metric include "value" and "units." Other kinds of metrics have other attributes. For example, the "Operating System Type" metric may have corresponding attributes unique to every platform. The attributes may include, for example, a version number, machine ID or other information that may be useful on that platform, but not exist on any other platform.

Other groups of metrics may share some additional "standard" or common attributes, for example:

log—used by the log agent 306 for all metrics derived from log files. The "log" attribute is a table of strings containing the complete text of the first three log messages of the type counted by the metric in the reporting interval. These log messages may provide additional detail, for example, to a network administrator who is trying to understand why an alert was raised on a particular metric; and summary—used by all agents that support the enhanced e-mail or enhanced reporting feature as described elsewhere herein. The "summary" attribute contains a human-readable summary of the "next level of detail" for the metric.

As described herein, data from the RTAP database may be combined using the calculation engine and elements from the tree-structure object oriented database to produce one or more inputs to the threat thermostat controller 218 previously described herein. The calculation engine as described above may process a data-flow language with a syntax and operation similar to a spreadsheet. A calculation engine expression may be defined as expressions attached to data attributes of objects in the database. When the calculation engine processes an object, all of the expressions in the object are evaluated and become the new values of the attributes to which they are attached. This evaluation process is repeated to reevaluate all objects dependent on changed values.

Expressions in an embodiment may reference other attributes using a relative pathname syntax based on the Apple Macintosh filesystem naming conventions. For example, '^' means the parent object ':' separates object names '.' separates an object path from an attribute name In one example, there may be 5 external threat thermostat values communicated by the threat agent 200 and stored in the RTAP database called E1, E2, E3, E4, and E5. An input to 218 may be determined as a weighted average of the foregoing five values. The threat agent 200 may monitor or poll the external data sources and write the threat thermostat level indicators to the five "E" external points. In the RTAP database, these five (5) points may be defined as child objects of a parent object representing the combined weighted average in an expression. The value of this expression may be assigned to the parent object having the following expression:

$$([E1.indicator]+3*[E2.indicator]+[E3.indicator]+[E4.indicator]+[E5.indicator])/7$$

In the foregoing, the ".indicator" operator obtains the value of the identified attribute referenced. In the foregoing, external indicator 2 is determined to be three times as valuable or relevant as the other indicators. Whenever an indicator is updated, the calculation engine calculates the tree of other points having expressions referencing the contents of any of the attributes of a changed point. The engine is executed to evaluate the expressions on all of those objects, similar to that of a spreadsheet. An embodiment may use any one or more known techniques in evaluating the expressions in an optimal order.

In one embodiment, an approach may be taken with respect to combining inputs with respect to the different metrics as may be reported by the different agents. A resulting combination may be expressed as a derived parameter used, for example, in connection with generating an alarm or alert condition, as an input to the threat thermostat 218, and the like. A derived value or signal indicating an attack may be produced by examining one of more of the following: one or more metrics from the NIDS agent, the ARPWatch agent, IPS, the number of bad logins and root user count exceeding some predetermined normal threshold tuned for that particular system. Once an initial set of one or more of the foregoing indicate an alert condition indicative of an attack or attempted attack, secondary condition(s) may be used as confirmation of the attack indication. The secondary information may include a resource usage alert on some machine that occurs simultaneous with, or very shortly after, a reliable indication of an attack on that machine, or on the network at large using the initial set of conditions. An embodiment may, for example, generate an alarm condition or produce an input to the threat thermostat 218 based on the foregoing. An alarm condition may be generated in connection with a yes or true attack indicator value based on the first set of one or more conditions. Once this has occurred, another subsequent alert or alarm condition may also be generated based on the occurrence of one or more of the second set of conditions occurring with the first set of conditions, or within a predetermined time interval thereof, for the network, or one or more of the same computers.

In connection with the foregoing, resource usage metrics may not be used as first level attack indicators or used without also examining other indicators. Resource usage may be characterized as a symptom of potential machine compromise rather than an attack on the machine. Usage metrics may be "noisy" causing false positive indicators of an attack if examined in isolation. However, if such an alert occurs in connection with resource usage simultaneously with, or very shortly after, another reliable "attack" indicator (as in the initial or first set of indicators above), the resource usage metric's credibility increases. Accordingly, the resource usage metrics may be consulted in combination with, or after the occurrence of, other attack indicators to determine, for example, if any one or more particular computers have been compromised. Based on the foregoing, an embodiment may define a derived parameter using an equation or formula that takes into account security metrics and combines them with one or more resource metrics. Such a derived parameter may be used, for example, in connection with producing an input to the threat thermostat controller. Such a derived parameter may be produced using the weighting technique described above.

An embodiment may include a form of enhanced reporting or notification as made by the Watch server to a user upon the detection of an alarm condition. As described herein, metrics and associated information may be reported by an agent. The values of the metrics may be one or more factors used in determining an alarm condition. The values of the metrics used to detect and report the occurrence of an alarm condition may be characterized as a first level of alarm or event notification information. Once an alarm condition has been detected, additional information that may have been gathered by the agent may also be useful in proceeding to take a corrective action or further diagnosing a problem associated with the alarm condition. This additional information that may be used in further diagnosing the problem or taking corrective action may be characterized as a second level of information.

An embodiment may provide an option for enabling/disabling notifications of alarm conditions to include this additional information. The additional information may be reported by the agents to the Watch server for optional incorporation into notification messages. An enable/disable option may also be associated with agents gathering the data. Whether an embodiment includes this feature or uses it for selective metrics may vary with each embodiment and its resource limits such as, for example, of the industrial network. Thus, the cost and feasibility of obtaining the second level of information may be balanced with the benefits to be gained in taking corrective actions using the second level of information from an alert message rather than obtaining the information some other way. For example, if a second level of information is not included in an alert notification, an administrator may use a user interface connected to the Watch server 50 to gain the additional information.

It should be noted that the particular additional information included in the second level of enhanced notification may vary with each metric. It may include additional information to assist in determining a problem source such as a user account, IP or other address, particular component(s) or process(es) consuming a resource and the associated percentage(s), and the like. Some of this second level of information is described above with associated metrics. In one embodiment, the enhanced notification feature may be optionally enabled for use with one or more metrics of the SNMP Guard agent 203 and the Guard log agent 209 described herein. For example, the agent 203 may report the following additional information with each of the metrics for enabled enhanced reporting:

Communications status—In the event there is a problem indicated by this metric, corrective action includes determining the reason for the communication failure. A message such as the component is not responding, its IP address and the time of the failure may help.

Login failures—Identify the most frequent type of connection, such as a VPN, remote dial-in, or other connection, a percentage of the failures on this connection, one or more of the user IDs associated with the top number of failures and the percentage and originating IP address or other communication channel associated with each user ID.

Administrative user count, dialup user count VPN user count—identify the IP or other addresses from which the most recent administrative users have logged on.

Memory usage, CPU usage, disk space, other resource usage—The top consumers of the resource are identified along with an associated percentage along with which process or user or other information to identify the consumer as appropriate for the resource.

Open session count—identifies the number of open communication sessions between any two points. Additional information may include two or more IP addresses, host names, and the like, identified as being included as a connection endpoint.

Agent 209 may include the following additional enhanced reporting or notification information for the following metrics:

Configuration—In the event that there has been a change to the configuration as monitored by 209, it may be helpful to know what changed such as whether there is a change to the threat thermostat rule sets, such as included in 220, and/or the current firewall configuration, and what portion of the rules changed. Additionally, for any such change, what was the state change (previous state to what current state), from what user account, address, process and the like, made this change.

Threat thermostat change—An embodiment may indicate an alarm condition when a change occurs to the threat thermostat setting. The change may be the result of a manual change, an automated change in accordance with the functionality included in an embodiment. Additional detail for enhanced reporting may include what user made the change, what was the status changed to/from, the frequency that such changes have been made within a reporting period, identify the uses that most frequently changed the setting and what percentage of the time each user changed the setting.

NIDS and IPS reports—An address or other identifying source of the most frequent alerted NIDS/IPS conditions, an associated percentage of these conditions attributed to a particular source, information about the type of attack, and the target of the attack (what machine by host name, IP address and the like).

Antivirus events—The metric may identify a total number of antivirus events. Additional information may include a break down by type of event within a reporting period to identify what viruses (virus signatures) have been removed from a communication streams with an associated frequency or percentage, what source and/or destinations (such as source and destination networks) appeared most frequently for each type, and a frequency or percentage associated with each of the source and destinations.

Other activity—This metric identifies other activity that does not belong in any other category. Additional information may include the text of the first one or more messages of this type detected.

Figure 13:
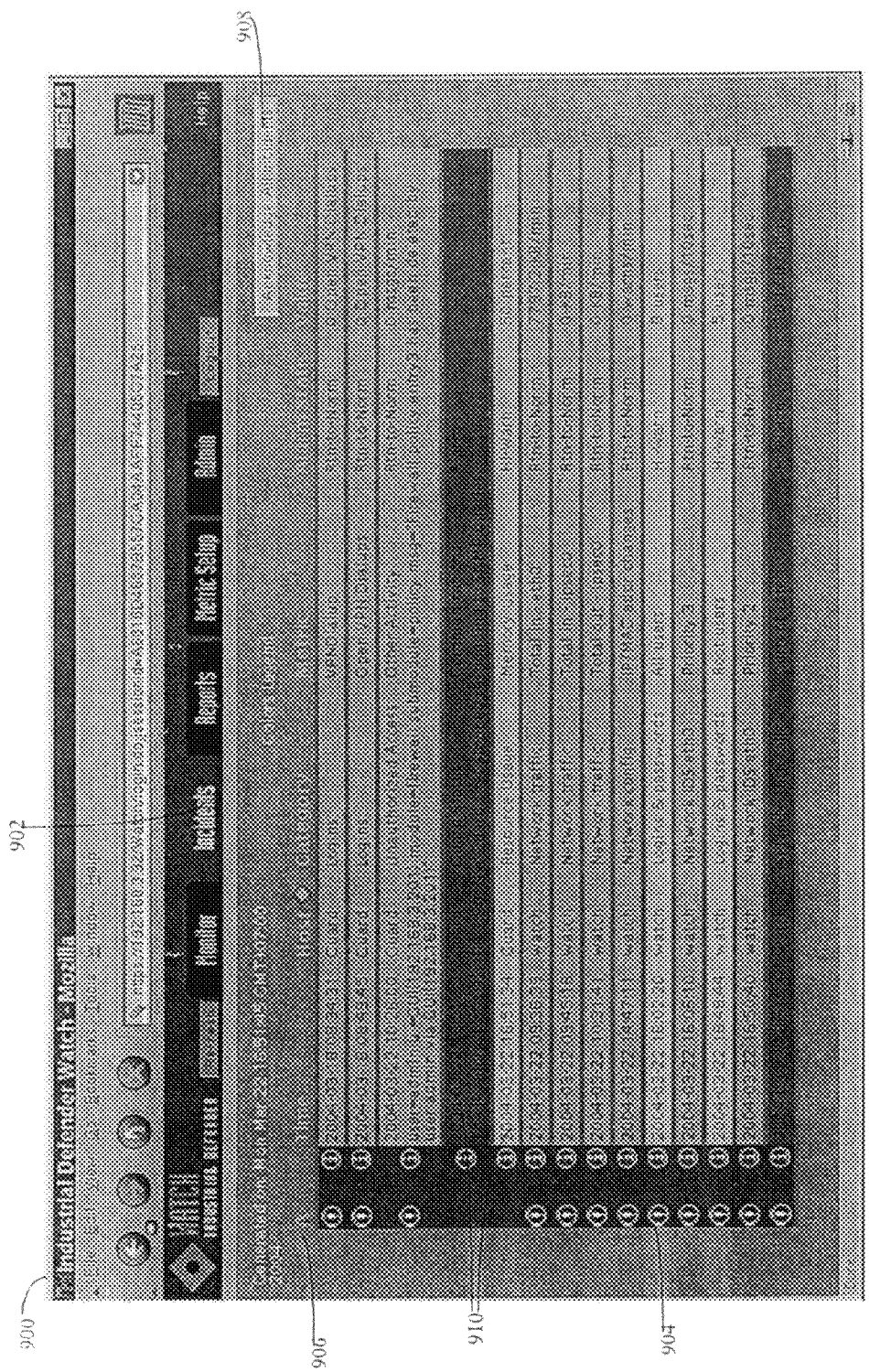
FIG. 13-14 are examples of user interface displays that may be used in an embodiment of the system of FIG. 1.

Referring now to FIG. 13, shown is an example 900 of a graphical user interface display. The example 900 may be displayed, for example, using a web browser to view alarm incident reports resulting from notification messages sent in accordance with alarm conditions determined. The example 900 may be used to view and acknowledge one or more of the alarm conditions in an embodiment. In one embodiment, this display of 900 may be viewed when tab 902 for incidents is selected from one of multiple user interface tabs. Each tab may be selected in connection with different viewing and/or processing. In one embodiment, the tab 902 may flash if a new alarm condition is detected from that which is displayed in 900 at a point in time to a user. In other words, this embodiment may not automatically update the display 900 with additional information for alert conditions detected since the user selected tab 902. Rather, this embodiment flashes coloring on tab 902 to indicate such additional alert conditions detected while the user is in the process of using an instance of display 900. The inventors believe that the flashing tab is less disruptive of user concentration during alarm burst conditions than other notification techniques such as, for example, redrawing the display 900 with updated alarm information as available.

The display 900 may indicate in column 906 (labeled "A") whether a particular condition indicated by a line of displayed data has been acknowledged. An incident or alarm condition associated with a line of displayed data in 900 may be acknowledged, as by selecting the exclamation point icon to the left of a particular line of data, selecting the option 908 to acknowledge all displayed incidents, or some other option that may be provided in an, embodiment. The status in 906 for each incident may be updated in accordance with user acknowledgement. For example, 904 indicates that the associated incident has not been acknowledged (e.g., exclamation point notation in column 906). The two incidents as indicated by 910 have been acknowledged (e.g., no exclamation point notation in column 906).

Figure 14:
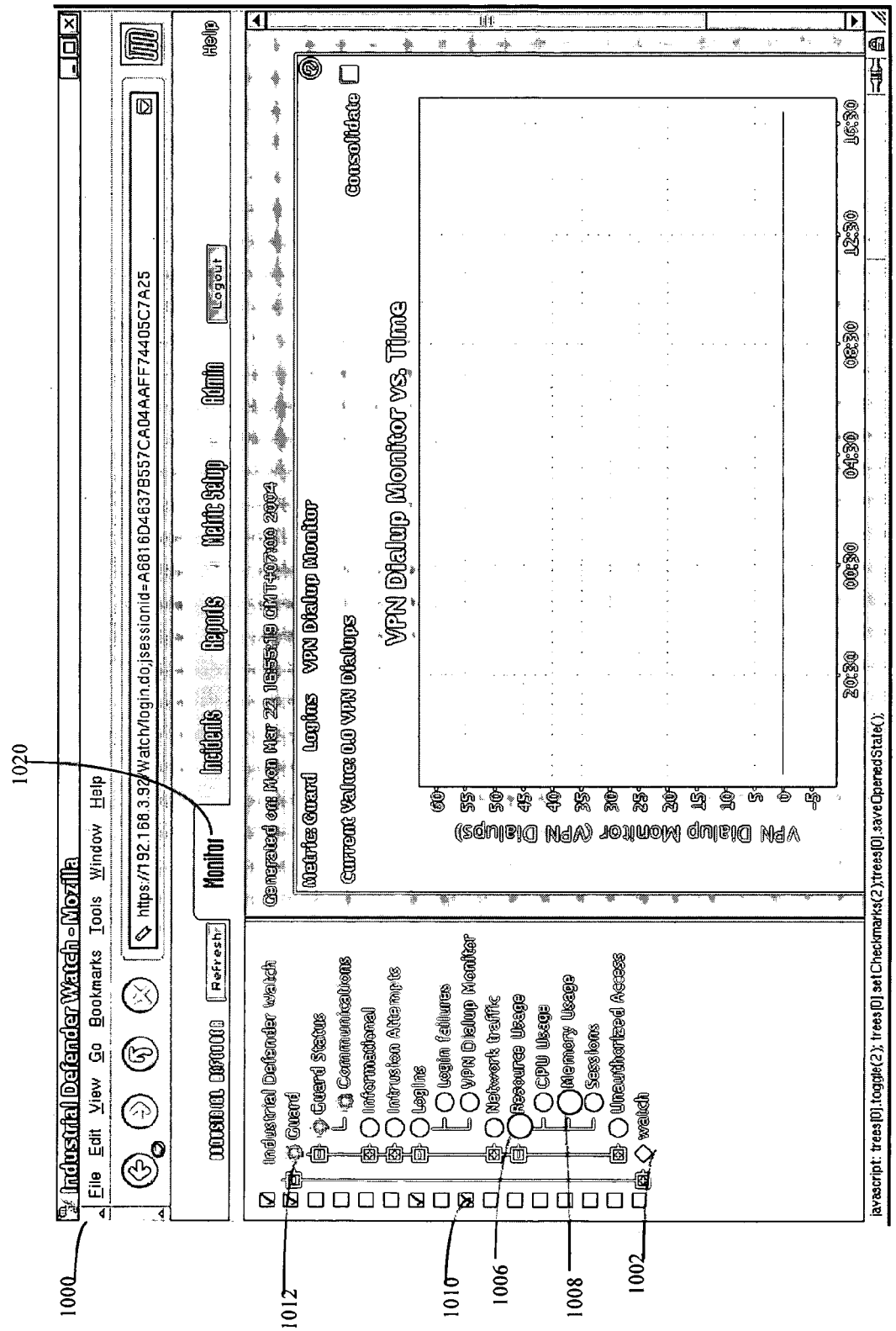

Referring now to FIG. 14, shown is an example of a user interface display 1000. The example 1000 may be displayed when the monitor tab 1020 is selected to view a metric tree. With reference to FIG. 9, the information displayed in 1000 is that information included in a portion of 600—the subtree formed with the security object as its root including all child nodes. The display 1000 shows an aggregate view of the different metrics and associated alarm conditions. The display 1000 reflects the hierarchical representation in the subtree by showing a nesting of hosts (Guard and Watch), categories for each host (such as Intrusion attempts, Resource Usage, and the like), and metrics (such as CPU Usage, Memory Usage and Sessions) associated within each category (such as Resource Usage). In the subtree, these metrics may be defined as leaf nodes having a parent node (category name) defined as Resource Usage.

Associated with each of the metrics is a level indicator. The level indicator may indicate a color or other designation associated uniquely with each alarm state within an embodiment. For example, in one embodiment, the indicator may be green when the metric level is in the normal range, yellow when the metric level is in the warning range, and red when in the highest severity range.

The elements in 1000 representing the parent node of one or more other nodes may have a color or other designation corresponding to the aggregate condition of all the child nodes. For example, the indicator for Resource Usage may represent an aggregate of each of the indicators associated with metrics for CPU Usage, Memory Usage, and Sessions. In one embodiment, the aggregate indicator of a parent node may be determined to be the maximum indicator value of its one or more child nodes. For example, a parent node indicator, such as 1006, is yellow if any one or more of its child node indicators, such as 1008, are yellow but none are red.

In 1000, the user may select to view a graph of a particular metric in the right portion of 1000 by selecting an option in the left portion of 1000 as indicated by selection 1010. In one embodiment, it should be noted that the graph portion is not immediately updated in response to a user selection. Rather, the graph may be updated when the web page is refreshed in accordance with the one or more selections made at that point in time. Note that in 1000 the icon or indicator displayed for Watch 1002 has a different shape than other machines, such as the Guard machine or host. The different shape makes it easier for users to find the Watch server in the list of hosts since many of the important network monitoring metrics are found in the Watch server branch of the metric tree.

The foregoing 900 and 1000 are examples of user interface displays that may be included in an embodiment and displayed, such as using a web browser on the web server 214 of FIG. 4. Other embodiments may user other interface displays than as described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of event notification comprising:
receiving a first report of a condition;
sending a first notification message about said first report of said condition;
sending a second notification message about said condition at a first notification interval;
receiving subsequent reports at fixed time intervals;
sending a subsequent notification message at a second notification interval if said condition is still ongoing during said second notification interval, wherein said second notification interval has a length which is a multiple of said first notification interval, wherein said condition is one of a plurality of conditions used in determining a derived parameter having a value based on a first set of one or more of said plurality of conditions and a second set of one or more of said plurality of conditions, wherein said derived parameter has a value indicating an attack when an occurrence of said first set of one or more conditions is followed by an occurrence of said second set of one or more conditions within a predetermined time interval;
and
sending a third notification message when said derived parameter indicates an attack.

2. The method of claim 1, wherein said first report is sent from a reporting agent on a first computer system reporting about one of: said first computer system and a network including said first computer system, and said notification messages are sent from a notification server on a second computer system.

3. The method of claim 1, wherein notification messages are sent to a notification point at successive notification intervals wherein each of said successive notification intervals increases approximately exponentially with respect to an immediately prior notification interval.

4. The method of claim 2, wherein said condition is associated with an alarm condition and an alarm condition is set when a current level of a metric is not in accordance with a predetermined threshold value.

5. The method of claim 1, wherein each of said notification messages includes a first level of information about said condition and a second level of information used to perform at least one of the following: determine a cause of said condition, and take a corrective action for said condition.

6. The method of claim 5, wherein an option is included in a reporting agent to enable and disable reporting of said second level of information to a notification server from said agent sending said first report.

7. The method of claim 5, wherein an option is used to enable and disable condition notification messages including said second level of information.

8. The method of claim 4, wherein an alarm condition is associated with a first level alarm and an alarm state of said first level is maintained when a current level of a metric is in accordance with said predetermined threshold value until an acknowledgement of said alarm state at said first level is received by said notification server.

9. The method of claim 8, wherein said alarm condition transitions to a second level alarm when said current level is not in accordance with said predetermined threshold and another threshold associated with a second level, and said second level alarm is maintained when a current level of a metric is in accordance with one of: said predetermined threshold and said other threshold until acknowledgement of said second level alarm is received by said notification server.

10. The method of claim 1, wherein reports are sent from a reporting agent executing on a computer system in an industrial network to an appliance included in said industrial network and each of said reports includes events occurring within said industrial network.

11. The method of claim 4, wherein an alarm condition is determined in accordance with a plurality of weighted metrics, said plurality of weighted metrics including at least one metric about: a network intrusion detection, a network intrusion prevention, a number of failed login attempts, a number of users with a level of privileges greater than a level associated with a user-level account.

12. A method of event notification comprising:
receiving a first report of a condition at a reporting destination;
sending a first notification message from said reporting destination to a notification destination when a derived parameter indicates an attack, said derived parameter having a value based on a first set of one or more conditions and a second set of one or more conditions, wherein said derived parameter has a value indicating an attack when an occurrence of said first set of one or more conditions is followed by an occurrence of said second set of one or more conditions within a predetermined time interval; and
sending a second notification message from said reporting destination to said notification destination, said second notification message including a summary of information about events occurring in a fixed time interval, said summary identifying at least one of: a source and a target associated with an attack occurring within said fixed time interval, and a percentage of events associated with said at least one of said source and said target.

13. The method of claim 12, wherein said summary identifies at least one source associated with an attack, wherein said source is one of: a user, a machine, and an application, said percentage indicating a percentage of events associated with said at least one source for a type of attack.

14. The method of claim 12, wherein said summary identifies at least one target associated with an attack, wherein said target is one of: a user, a machine, an application, and a port, said percentage indicating a percentage of events associated with said at least one target for a type of attack.

15. The method of claim 12, wherein said summary identifies a portion of a type of attack represents with respect to all attacks in said fixed time interval.

16. A computer program product for event notification comprising code that:
receives a first report of a condition;
sends a first notification message about said first report of said condition;
sends a second notification message about said condition at a first notification interval;
receives subsequent reports at fixed time intervals;
sends a subsequent notification message at a second notification interval if said condition is still ongoing during said second notification interval, wherein said second notification interval has a length which is a multiple of said first notification interval, wherein said condition is one of a plurality of conditions used in determining a derived parameter having a value based on a first set of one or more of said plurality of conditions and a second set of one or more of said plurality of conditions, wherein said derived parameter has a value indicating an attack when an occurrence of said first set of one or more conditions is followed by an occurrence of said second set of one or more conditions within a predetermined time interval; and
sends a third notification message when said derived parameter indicates an attack.

17. The computer program product of claim 16, wherein said first report is sent from a reporting agent on a first computer system reporting about one of: said first computer system and a network including said first computer system, and said notification messages are sent from a notification server on a second computer system.

18. The computer program product of claim 16, wherein notification messages are sent to a notification point at successive notification intervals wherein each of said successive notification intervals increases approximately exponentially with respect to an immediately prior notification interval.

19. The computer program product of claim 17, wherein said condition is associated with an alarm condition and an alarm condition is set when a current level of a metric is not in accordance with a predetermined threshold value.

20. The computer program product of claim 16, wherein each of said notification messages includes a first level of information about said condition and a second level of information used to perform at least one of the following: determine a cause of said condition, and take a corrective action for said condition.

21. The computer program product of claim 20, wherein an option is included in a reporting agent to enable and disable reporting of said second level of information to a notification server from said agent sending said first report.

22. The computer program product of claim 20, wherein an option is used to enable and disable condition notification messages including said second level of information.

23. The computer program product of claim 19, wherein an alarm condition is associated with a first level alarm and an alarm state of said first level is maintained when a current level of a metric is in accordance with said predetermined threshold value until an acknowledgement of said alarm state at said first level is received by said notification server.

24. The computer program product of claim 23, wherein said alarm condition transitions to a second level alarm when said current level is not in accordance with said predetermined threshold and another threshold associated with a second level, and said second level alarm is maintained when a current level of a metric is in accordance with one of: said predetermined threshold and said other threshold until acknowledgement of said second level alarm is received by said notification server.

25. The computer program product of claim 16, wherein reports are sent from a reporting agent executing on a computer system in an industrial network to an appliance included in said industrial network and each of said reports includes events occurring within said industrial network.

26. The computer program product of claim 19, wherein an alarm condition is determined in accordance with a plurality of weighted metrics, said plurality of weighted metrics including at least one metric about: a network intrusion detection, a network intrusion prevention, a number of failed login attempts, a number of users with a level of privileges greater than a level associated with a user-level account.

27. A computer program product for event notification comprising code that:
   receives a first report of a condition at a reporting destination; and
   sends a first notification message from said reporting destination to a notification destination when a derived parameter indicates an attack, said derived parameter having a value based on a first set of one or more conditions and a second set of one or more conditions, wherein said derived parameter has a value indicating an attack when an occurrence of said first set of one or more conditions is followed by an occurrence of said second set of one or more conditions within a predetermined time interval;
   sends a second notification message from said reporting destination to said notification destination, said second notification message including a summary of information about events occurring in a fixed time interval, said summary identifying at least one of: a source and a target associated with an attack occurring within said fixed time interval, and a percentage of events associated with said at least one of said source and said target.

28. The computer program product of claim 27, wherein said summary identifies at least one source associated with an attack, wherein said source is one of: a user, a machine, and an application, said percentage indicating a percentage of events associated with said at least one source for a type of attack.

29. The computer program product of claim 27, wherein said summary identifies at least one target associated with an attack, wherein said target is one of: a user, a machine, an application, and a port, said percentage indicating a percentage of events associated with said at least one target for a type of attack.

30. The computer program product of claim 27, wherein said summary identifies a portion of a type of attack represents with respect to all attacks in said fixed time interval.

31. The method of claim 1, wherein said first set includes conditions based on security metrics.

32. The method of claim 31, wherein said security metrics include a network intrusion detection metric, a metric based on a number of failed login attempts, and a metric based on a number of users with privileges greater than a level associated with a user-level account.

33. The method of claim 1, wherein said second set of one or more conditions including resource usage metrics, wherein said resource usage metrics are used as confirmation of an occurrence of initial alert condition of an attack specified by said first set.

34. The method of claim 33, wherein said derived parameter is determined using a plurality of reports received from a plurality of agents executing on a plurality of different computers, said derived parameter indicating an attack when the second set of conditions confirms an occurrence of an attack as indicated by the first set of conditions for a same set of one or more computers.

* * * * *